(12) United States Patent
Wang

(10) Patent No.: US 11,094,067 B2
(45) Date of Patent: Aug. 17, 2021

(54) METHOD AND SYSTEM FOR IMAGE PROCESSING

(71) Applicant: SHANGHAI UNITED IMAGING HEALTHCARE CO., LTD., Shanghai (CN)

(72) Inventor: Ce Wang, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 172 days.

(21) Appl. No.: 16/247,080

(22) Filed: Jan. 14, 2019

(65) Prior Publication Data

US 2019/0164291 A1 May 30, 2019

Related U.S. Application Data

(63) Continuation of application No. 15/323,035, filed as application No. PCT/CN2015/093506 on Oct. 31, 2015, now Pat. No. 10,181,191.

(30) Foreign Application Priority Data

Dec. 2, 2014 (CN) .......................... 201410720069.1
Dec. 29, 2014 (CN) .......................... 201410840692.0
(Continued)

(51) Int. Cl.
G06T 7/11 (2017.01)
G06T 7/136 (2017.01)
(Continued)

(52) U.S. Cl.
CPC .................. *G06T 7/11* (2017.01); *G06T 1/20* (2013.01); *G06T 1/60* (2013.01); *G06T 7/0012* (2013.01);
(Continued)

(58) Field of Classification Search
CPC ......... G06K 2209/05; G06K 2209/055; G06K 9/4642; G06T 7/136; G06T 1/60;
(Continued)

(56) References Cited

U.S. PATENT DOCUMENTS 6,714,925 B1 3/2004 Barnhill et al.
10,467,757 B2 * 11/2019 Wang .................... G06K 9/627
(Continued)

FOREIGN PATENT DOCUMENTS

CN 1795825 A 7/2006
CN 1912927 A 2/2007
(Continued)

OTHER PUBLICATIONS

Sim, K. S., C. P. Tso, and Y. Y. Tan. "Recursive sub-image histogram equalization applied to gray scale images." Pattern Recognition Letters 28.10 (2007): 1209-1221. (Year: 2007).*
(Continued)

Primary Examiner — Pinalben Patel
(74) Attorney, Agent, or Firm — Metis IP LLC

(57) ABSTRACT

A method and system for image processing is provided. The technique incudes acquiring data related to the processing, performing a pre-processing of the data, performing a segmentation of a subject, performing a post-processing of the result of the segmentation and managing storage of the data. The post-process incudes a calibrating and a rendering of the data.

19 Claims, 28 Drawing Sheets

(30) Foreign Application Priority Data

| | | | |
|---|---|---|---|
| Apr. 30, 2015 | (CN) | ............. | 201510216037.2 |
| May 5, 2015 | (CN) | ............. | 201510224781.7 |
| Jun. 8, 2015 | (CN) | ............. | 201510310371.4 |
| Jun. 9, 2015 | (CN) | ............. | 201510313660.X |
| Jul. 6, 2015 | (CN) | ............. | 201510390970.1 |
| Aug. 25, 2015 | (CN) | ............. | 201510526053.1 |

(51) Int. Cl.
  *G06T 1/20* (2006.01)
  *G06T 1/60* (2006.01)
  *G06T 7/00* (2017.01)

(52) U.S. Cl.
  CPC .... *G06T 7/136* (2017.01); *G06T 2207/10081* (2013.01); *G06T 2207/20104* (2013.01); *G06T 2207/30012* (2013.01)

(58) Field of Classification Search
  CPC .............. G06T 7/11; G06T 7/0012; G06T 2207/10081; G06T 1/20; G06T 2207/30012; G06T 2207/20104
  See application file for complete search history.

(56) References Cited

U.S. PATENT DOCUMENTS

| | | | | |
|---|---|---|---|---|
| 2003/0099385 | A1* | 5/2003 | Zeng | G06T 7/149 382/128 |
| 2003/0103664 | A1* | 6/2003 | Wei | G06T 7/0012 382/131 |
| 2004/0252870 | A1* | 12/2004 | Reeves | G06T 7/0012 382/128 |
| 2008/0118136 | A1 | 5/2008 | Cai et al. | |
| 2008/0298657 | A1* | 12/2008 | Shiraishi | G06T 7/32 382/130 |
| 2009/0122060 | A1 | 5/2009 | Porat et al. | |
| 2010/0128954 | A1 | 5/2010 | Ostrovsky-Berman et al. | |
| 2011/0052018 | A1 | 3/2011 | Blaffert et al. | |
| 2011/0184290 | A1 | 7/2011 | Yoo et al. | |
| 2012/0207366 | A1 | 8/2012 | Liu | |
| 2012/0308110 | A1 | 12/2012 | Kim et al. | |
| 2014/0046169 | A1 | 2/2014 | Liu et al. | |
| 2014/0079309 | A1 | 3/2014 | Huo et al. | |
| 2014/0307847 | A1 | 10/2014 | Schmidt et al. | |
| 2014/0341426 | A1 | 11/2014 | Wu et al. | |
| 2015/0235085 | A1 | 8/2015 | Goto | |
| 2019/0139223 | A1* | 5/2019 | Nie | G16H 30/40 |

FOREIGN PATENT DOCUMENTS

| | | | |
|---|---|---|---|
| CN | 101138498 | A | 3/2008 |
| CN | 101373541 | A | 2/2009 |
| CN | 101393644 | A | 3/2009 |
| CN | 101558999 | A | 10/2009 |
| CN | 101814193 | A | 8/2010 |
| CN | 101853509 | A | 10/2010 |
| CN | 102034232 | A | 4/2011 |
| CN | 102243759 | A | 11/2011 |
| CN | 102411795 | A | 4/2012 |
| CN | 102521833 | A | 6/2012 |
| CN | 102622750 | A | 8/2012 |
| CN | 102903103 | A | 1/2013 |
| CN | 102982531 | A | 3/2013 |
| CN | 103021008 | A | 4/2013 |
| CN | 103489198 | A | 1/2014 |
| CN | 103617626 | A | 3/2014 |
| CN | 103679810 | A | 3/2014 |
| CN | 103700123 | A | 4/2014 |
| CN | 103810363 | A | 5/2014 |
| CN | 103871057 | A | 6/2014 |
| CN | 104063876 | A | 9/2014 |
| CN | 104091331 | A | 10/2014 |
| CN | 104143101 | A | 11/2014 |
| CN | 104504737 | A | 4/2015 |
| CN | 104766340 | A | 7/2015 |
| CN | 104809740 | A | 7/2015 |
| CN | 104851107 | A | 8/2015 |
| CN | 104851108 | A | 8/2015 |
| EP | 2336972 | A1 | 6/2011 |
| WO | 2006114003 | A1 | 11/2006 |
| WO | 2010024985 | A1 | 3/2010 |

OTHER PUBLICATIONS

Wu, Jie, et al. "Texture feature based automated seeded region growing in abdominal MRI segmentation." 2008 International Conference on BioMedical Engineering and Informatics. vol. 2. IEEE, 2008. (Year: 2008).*
Written Opinion in PCT/CN2015/093506 dated Jan. 26, 2016, 5 pages.
International Search Report in PCT/CN2015/093506 dated Jan. 26, 2016, 4 pages.
First Office Action in Chinese Application No. 201410720069.1 dated Jul. 4, 2018, 19 pages.
First Office Action in Chinese Application No. 201410840692.0 dated Jul. 4, 2018, 15 pages.
First Office Action in Chinese Application No. 201510216037.2 dated Mar. 8, 2017, 21 pages.
First Office Action in Chinese Application No. 201510224781.7 dated Nov. 28, 2016, 12 pages.
Second Office Action in Chinese Application No. 201510224781.7 dated Jun. 15, 2017, 12 pages.
First Office Action in Chinese Application No. 201510310371.4 dated Apr. 5, 2017, 11 pages.
First Office Action in Chinese Application No. 201510313660.X dated May 31, 2017, 21 pages.
First Office Action in Chinese Application No. 201510390970.1 dated Nov. 28, 2016, 18 pages.
Second Office Action in Chinese Application No. 201510390970.1 dated Jun. 15, 2017, 16 pages.
First Office Action in Chinese Application No. 201510526053.1 dated May 25, 2017, 12 pages.
Third Office Action in Chinese Application No. 201510526053.1 dated Aug. 13, 2018, 13 pages.
Examination Report in UK Application No. 1719333.5 dated May 22, 2018, 5 pages.
Extended European search report in Europen Application No. 15865201.6 dated Oct. 10, 2017, 10 pages.
Yong Wan et al., An interactive visualization tool for multi-channel confocal microscopy data in neurobiology research, IEEE Transactions on Visualization&Computer Graphics, 2009, 15(6):1489-1496.
Fabio F. Bemardon et al., GPU-Based Tiled Ray Casting Using Depth Peeling. Journal of Graphics Gpu&Game Tools, 2006, 11(4): 1-16.
Gisle Nes, Mixed ray caster/mesh renderer, announced 2007, Available from Internet, JRL:<http://www.ii.uib.no/vis/teaching/vis-project/2007-fall/nes/_files/mesh.pdf>.
C. Pisupati et al., Segmentation of 3-D pulmonary trees using mathematical morphology, Proc. Math. Morphol. Appl. Image Signal Process, p. 409-416(1996).
Xu, Hairong et al., An Improved Region Growing Algorithm Used in Medical Image Segmentation, Journal of Biomedical Engineering Research. 2005(140):187-190.
Ke Wang, Nuclear Magnetic Resonance Image Segmentation Based on Support Vector Machine and Level Set Method, China Masters' theses Full-test Database, Information Science and Technology, 2011, S1, pp. 1138-1538.
Aiying Lin et al., The Combination of Local Fuzzy-Entropy-Based Transition Region Extraction with Otsu Thresholding Method for Image Segmentation, 2009 2nd International Congress on Image and Signal Processing, p. 1-4(2009).
Am. Mharib et al., Survey on liver CT image segmentation methods. Artificial Intelligence Review, 2011, 37(2): 83-95.

(56) References Cited

OTHER PUBLICATIONS

Lin, D. T. et al., Computer-aided kidney segmentation on abdominal CT images, IEEE Transaction on Information Technology in Biomedicine, 2006, 10(1): 59-65.
Gao, Yaozong, Fully Automatic Hepatic Portal Vein Segmentation, Chinese Master's Theses Full-text Database Information Science and Technology, 2011(7), pp. 135-455.
Liu Jiamin et al., Computer aided detection of epidural masses on computed tomography scans, Computerized Medical Imaging and Graphics; Pergamon Press, 38 (7): pp. 606-612.
Kilinder et al., Automated model-based vertebra detection, identification, and segmentation in CT images. Medical image analysis 13.3 (2009): 471-482.
Rangaraj M. Rangayyan, Biomedical Image Analysis, pp. 449-453 (2004), Retrived from the Internet, URL<https://www.crcpress.com/Biomedical-Image-Anaiysis/Rangayyan/p/book/9780203492543> retrived on Sep. 26, 2017.
Sun, Hao et al., A Segmentation Method of Aorta in CT image, Modern Scientific Instruments, 2013 (2):45-48.
Cenzi Yuan, Medical Image Volume Rendering Research Based on CPU, Chinese Master's Theses Full-text Database Information Science and Technology, 2014 (1), pp. 1-65.
An Qing et al., Fastmedical Image ROI Volume Rending Based on Lit Spheres, Application Research of Computers; 2010, 27(1): 348-349, 379.
Jiangnong Cao, Study on Approach of Image Segmentation Based on Decomposable Markov Networks, China Doctoral Dissertations Full-text Database Information Science and Technology, 2006(7), pp. 37-107.
Ning He, Sea and land edge detection, Key technologies of remote sensing image processing, pp. 47-49(2015).
Zhang, Yu et al., Co-OLAP: Research on cooperated OLAP with star schema benchmark on hybrid CPU&GPU platform. Journal of East China Normal University (Natural Science Edition). 5: 240-251, 2014.
Li, Shidan et al , A method of Speeding image rendering based on OpenGL, Computer knowledge and technology, 8 (1): 194-196, 2012.
James Davis et el., Filling holes in complex surfaces using volumetric diffusion, First International Symposium on 3D Data Processing Visualization and Transmission Proceedings, 1-11, 2002.
Second Office Action in Chinese Application No. 201410720069 1 dated Mar. 7, 2019, 19 Pages.
Third Office Action in Chinese Application No. 201410720069.1 dated Jul. 16, 2019, 19 Pages.
Third Office Action in Chinese Application No. 201410840692.0 dated Sep. 3, 2019, 14 Pages.

* cited by examiner

METHOD AND SYSTEM FOR IMAGE PROCESSING

CROSS-REFERENCE TO RELATED APPLICATIONS

This application is a continuation application of U.S. patent application Ser. No. 15/323,035, filed on Dec. 29, 2016, which is a U.S. National Stage entry under 35 U.S.C. § 371 of International Application No. PCT/CN2015/093506, filed on Oct. 31, 2015, which claims priority of Chinese Patent Application No. 201510526053.1 filed on Aug. 25, 2015, Chinese Patent Application No. 201510224781.7 filed on May 5, 2015, Chinese Patent Application No. 201510216037.2 filed on Apr. 30, 2015, Chinese Patent Application No. 201510390970.1 filed on Jul. 6, 2015, Chinese Patent Application No. 201410720069.1 filed on Dec. 2, 2014, Chinese Patent Application No. 201410840692.0 filed on Dec. 29, 2014, Chinese Patent Application No. 201510310371.4 filed on Jun. 8, 2015, and Chinese Patent Application No. 201510313660.X filed on Jun. 9, 2015, the entire contents of each of which are hereby incorporated by reference.

TECHNICAL FIELD

The present disclosure generally relates to image processing, and more particularly, to a method and system for image segmentation.

BACKGROUND

Image processing has a significant impact in medical filed, such as Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. An image segmentation (or "recognition," "classification," "extraction," "identification," etc.) may be performed to establish a realistic subject model by dividing or partitioning a medical image into one or more sub-regions. Segmentation is a procedure of image processing and a means to extract quantitative information relating to a target subject from a medical image. Different subjects may be segmented in different ways to improve the accuracy of the segmentation. The accuracy of an image segmentation may affect the accuracy of a disease diagnosis. Thus, it is desirable to improve the accuracy of image segmentation.

SUMMARY

In one aspect of the present disclosure, an image segmentation method and apparatus are provided. The image segmentation method may include one or more of the following operations. Volume data of a medical image may be acquired. Seed points for bone growing may be acquired. One or more parameters for bone growing may be initialized or updated. The parameters may include, for example, a first threshold, a second parameter, a boundary parameter. The first threshold may be fixed. The second threshold and the boundary parameter may be variable. Bone growing may be performed based on, for example, the first threshold, the second parameter, and the boundary parameter to acquire the pixels that may belong to or are associated with a bone tissue. The first threshold may be used to perform a preliminary determination of a bone tissue. The second threshold may be used to determine a suspicious bone tissue. The boundary parameter may be used to determine the boundary of a bone tissue. The increment of pixels of the nth bone growing and the (n−1)th bone growing in a bone tissue may be assessed, if the increment exceeds a predefined threshold. The parameters used in the (n−1)th bone growing may be used to perform a new bone growing. Otherwise, the parameters may be updated. The n may be an integer greater than or equal to 2.

In some embodiments of the image segmentation, the bone growing performed based on the first threshold, the second threshold, and the boundary parameter to acquire the pixels that may belong to the bone tissue may include one or more of the following operations. A seed point may be put into a growing point sequence. A growing point may be removed from the growing point sequence and the growing point may be determined as a bone tissue. The pixels in the vicinity of the growing point may be identified based on, for example, the first threshold, the second threshold, and/or the boundary parameter. The pixels that satisfy all the three parameters may be put into the growing point sequence. The pixels that satisfy only the first threshold may be determined as a bone tissue. It may be determined whether the growing point in the growing point sequence is exhausted. If the growing point is not exhausted, the bone may continue to grow. If the growing point is exhausted, the bone may stop growing and all the pixels belong to the bone tissue may be acquired.

In some embodiments of the image segmentation, the pixels that meet the first threshold may be determined as a bone tissue, and the pixels that only meet the first threshold may be determined as a suspicious bone tissue. The pixels that meet the first threshold and the second threshold may be determined as a decided bone tissue. The pixels that meet the first threshold and the boundary parameter, but the second threshold, may be determined as a boundary of a bone tissue.

In some embodiments, the second threshold may be greater than the first threshold, and the second threshold may decrease as the iteration proceeds.

In some embodiments, the boundary parameter may decrease as the iteration process.

In some embodiments, the parameters used in the nth bone growing may be used to perform a new bone growing.

In another aspect of the present disclosure, an image segmentation apparatus is provided. In some embodiments, the image segmentation apparatus may include a processing unit, a storage unit and a display unit. The storage unit may be configured to store computer executable command. The processing unit may be configured to performing one or more of the following operations based on the commands stored in the storage unit. Volume data of a medical image may be acquired. Seed points for bone growing may be acquired. The parameters for bone growing may be initialized or updated. The parameters may include a first threshold, a second parameter, a boundary parameter. The first threshold may be fixed. The second threshold and the boundary parameter may be variable. A bone growing may be performed based on the first threshold, the second parameter and the boundary parameter to acquire all pixels that belong to a bone tissue. The first threshold may be used to perform a preliminary determination of a bone tissue. The second threshold may be used to determine a suspicious bone tissue. The boundary parameter may be used to determine the boundary of a bone tissue. The increment of pixels of the nth bone growing and the (n−1)th bone growing in a bone tissue may be assessed, if the increment exceeds a predefined threshold, the parameters used in the (n−1)th bone growing may be used to perform a new bone growing. Otherwise, the parameters may be updated. n may be an integer greater than or equal to 2.

In still another aspect of the present disclosure, a bronchus extracting method is provided. The bronchial tree may be labeled as or divided into different levels from trachea and primary bronchus to lobar bronchi and segmental bronchi, et al. For example, the trachea may be 0-level, the primary bronchi may be 1-level, and do on. Firstly, a low-level bronchus may be extracted from a breast CT image. Then a terminal bronchiole may be extracted based on the low-level bronchus by an energy-based 3D reconstruction method. The low-level bronchus and the terminal bronchiole may be fused together to generated a bronchus.

In still another aspect of the present disclosure, a bronchus extracting system is provided. The bronchus extracting system may include a first module, a second module, and a third module. The first module may be configured to extract a low-level bronchus. The second module may be configured to extract a terminal bronchiole based on the extracted low-level bronchus by an energy-based 3D reconstruction method. The third module may be configured to fuse the low-level bronchus and the terminal bronchiole together to generate a bronchus.

In some embodiments, the method of extracting a low-level bronchus may include a region growing based method and a morphology based method.

In some embodiments, the energy-based 3D reconstruction method may include assessing whether a voxel belong to a terminal bronchiole according to its growing potential energy in different states.

In some embodiments, the energy-based 3D reconstruction method may include adjusting a weighted value controlling the growing within a bronchus to guarantee a convergent iteration in each growing potential energy computing process.

In some embodiments, the energy-based 3D reconstruction method may include comparing the volume or radius of a connected region in the terminal bronchiole with a threshold. In some embodiments, if the volume or radius exceed the threshold, the connected region may be removed from the result of the present iterative process.

In still another aspect of the present disclosure, a method for image segmentation of tumors is provided. The method for image segmentation of tumors may include one or more of the following operations. A region of interest (ROI) where the tumor may be located may be determined. A coarse segmentation of a tumor based on a feature classification method may be performed. A fine segmentation of the tumor may be performed on the result of the coarse segmentation using a level set method (LSM).

In some embodiments of the present disclosure, a positive seed point may be sampled randomly among the voxels in the ROI, where a tumor may be located. A negative seed point may be also sampled randomly among the voxels in the ROI, where the tumor may be absent. Training may be performed using the positive seed point and/or the negative seed point, a linear or nonlinear classifier may be acquired. The classification of each voxel may be performed to acquire the result of the coarse segmentation.

In some embodiments of the present disclosure, the method of determining where a tumor may be located may include the following operations: a line segment of length d1 on a slice of tumor may be drawn by the user, which may traverse the tumor. In some embodiments, the line segment may be drawn on the slice which has a relatively larger cross-section compared with other slices. A line segment may be a part of a line that is bounded by two distinct end points. A cube of edge length $d_2$ ($d_2=d_1 \cdot r$, $1<r<2$), centered at the midpoint of the line segment may be formed. The region within the cube may be deemed as the ROI, where the tumor may be located. Merely by way of example, the region where the tumor may be located may be completely within the ROI defined by the cube.

In some embodiments of the present disclosure, the result of the coarse segmentation may be used to initialize a distance function. Multiple iterations of the distance function may be performed to acquire the fine segmentation of the tumor.

In still another aspect of the present disclosure, a method for image segmentation of lung is provided. The method for image segmentation of lung may include one or more of the following operations. A coarse segmentation of the lung may be performed, and a target region may be acquired. The target region may be divided into a central region, and a boundary region surrounding the central region. The voxels located in the central region may be identified as part of one or more nodules; the voxels located in the boundary region may need to be further identified whether they are part of one or more nodules. The voxels located outside of the target region may not be identified as part of a nodule. A fine segmentation of the lung may be performed using a classifier to classify and label each voxel, acquiring a parting segmentation region, which may be separated from the boundary region. The target region and the parting segmentation region may be fused together.

In some embodiments of the present disclosure, the shape of the boundary region may be an annulus.

In some embodiments of the present disclosure, the coarse segmentation of lung may be based on a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. Merely by way of example, the coarse segmentation of the lung may be performed based on region growing segmentation, which may include the following operations. A long axis may be determined by a user, which may be on the slice with maximum cross-section of groundglass nodules (GGN) of the lung image. An ROI may be determined based on the long axis. Filtering may be performed in an ROI to acquire a filtered image. A first region growing on the filtered image may be performed. A dynamic segmentation region may be acquired. Gray-scale histogram in the ROT may be calculated to acquire a histogram vector image. A second region growing on the histogram vector image may be performed to acquire a static segmentation region. The dynamic segmentation region and the static segmentation region may be fused together to acquire the target region.

In some embodiments of the present disclosure, the fine segmentation of the lung may be based on the result of the coarse segmentation of lung. Merely by way of example, the fine segmentation of the lung may be performed using a classifier to classify and label the voxels in the boundary region, which may include the following operations. An ROI may be determined. Filtering may be performed to the images within the ROI to acquire a feature vector image. The feature vector image may be combined with the weights of a feature vector, which may have been trained offline. A linear discriminant analysis (LDA) probability field image may be acquired. Region growing on the LDA probability field image may be performed. Parting segmentation regions with labels of the classifier may be acquired. In addition, the parting segmentation region may be fused together with the target region.

In still another aspect of the present disclosure, an image data processing method is provided. In some embodiments, the image data processing method may include one or more of the following operations. A data set of a three-dimensional image may be acquired. Different components in the data set may be identified. The different components may be stored in different storages. A rendering instruction may be provided by a user. The data in different storages may be rendered by corresponding image processors. The rendered data may be displayed. The data set may include a plurality of voxels.

In some embodiments, the identification of the different components in the data set may include at least one of the one dimensional feature information or multi-dimensional feature information of the voxels.

In some embodiments, the data set of the three-dimensional image may include medical scanning data of an object. The different components may include a removable region and a reserved region based on an instruction, for example, a rendering instruction, provided by a user.

In some embodiments, after receiving the rendering instruction data may be rendered accordingly. The data may include establishing thread controls corresponding to the CPU task queue and the GPU task queue respectively, parsing the rendering instruction of the user, rendering after distributing the rendering task to the task queue of CPU or GPU.

In another aspect of the present disclosure, an image data processing system is provided. The image data processing system may include an acquisition module, a segmentation module, a storage control module, a rendering control module, and a display module. The acquisition module may be configured to acquire data set of the three-dimensional image. The data set may be comprised of voxels. The segmentation module may be configured to identify different components in the data set. The storage control module may be configured to control the data of different components into different storages. The rendering control module may be configured to receive the rendering instruction of the user's input, control the rendering the data in corresponding storages by corresponding image processors. The display module may be configured to display the data after rendering.

In some embodiments, the segmentation module may include an identification block. The identification block may be configured to identify at least one of the one dimensional feature information and multi-dimensional feature information of the voxels.

In some embodiments, the data set of the three-dimensional image may include medical scanning data of an object; the different components may include a removable region and a reserved region based on requirement of the user.

In some embodiments, the rendering control module may include a thread control block, a distribution block. The thread control block may be configured to establish control thread corresponding to the task queue of CPU and GPU, respectively. The distribution block may be configured to parse rendering instructions of user, distribute the rendering task according to instructions of user to the task queue of CPU or GPU, and execute image rendering.

In still another aspect of the present disclosure, an image data processing method is provided. The image data processing method may include providing volume data and segmentation information of the volume data, rendering the volume data. In some embodiments, the segmentation information of the volume data may be pre-processed before the rendering. The pre-process of the volume data may include generating boundary data corresponding to the spatial boundary structure of each tissue, loading the boundary data and the volume data into an image processing unit, and rendering iteratively.

In some embodiments, the boundary structure may be a two-dimensional boundary line, or a three-dimensional boundary surface.

In some embodiments, the boundary structure may be mesh grid structure.

In some embodiments, the iterative rendering may be based on depth information. Each iterative rendering may be based on the depth information of last iterative rendering.

In some embodiments, the image data processing method may further include providing an observation point, and observation light of different directions from the observation point. The observation light may intersect the boundary structure at several intersection points. The intersection points in a same depth may be located in a same depth surface. The depth may be the distance between the intersection point and the observation point.

In still another aspect of the present disclosure, an image processing method is provided. The image processing method include one or more of the following operations. Partitioning a region of interest into three regions, a first region, a second region, and a third region. The characteristic value $T_i$ of the pixels of the third region may be calculated based on a first method. Assessing the characteristic value $T_i$ of the pixels of the third region based on a second method to generate a filled image.

In some embodiments, the first region may be the region whose pixel values are 1. The characteristic value of the first region may be set as $T_{high}$. The second region may be the boundary region of the ROI, the characteristic value of the second region may be set as $T_{low}$. $T_{high}-T_{low}>100$.

In some embodiments, the second method may include one or more of the following operations. Acquiring the characteristic value of the $T_i$ pixel in the third region. If B<Ti<Thihg, the pixel may be extracted. Otherwise, the value of the pixel may be set as the background color.

In a second aspect of the present disclosure, an image processing apparatus is provided. The image processing unit may include a distribution unit, a first determination unit, and a second determination unit. The distribution unit may be configured to partition a region of interest into three regions, a first region, a second region, and a third region. The first determination unit may be configure to calculate the characteristic value $T_i$ of a pixel i in the third region. The second determination unit may be configured to assess the characteristic value $T_i$ of a pixel i in the third region to generate a filled image.

In still another aspect of the present disclosure, a spine position method is provided. The spine method may include one or more of the following operations. A CT image sequence may be loaded and the CT image sequence may include a plurality of CT images. The bone regions of every CT image in the CT image sequence may be segmented. In every CT image, the bone region with the maximum area may be determined as a spine region. An anchor point of the spine region in every CT image may be determined, the anchor point may be validated based on some known information. The anchor point may be calibrated.

In some embodiments, the load of the CT image sequence may include one or more of the following operations. A preliminary spine region may be selected after the CT image sequence is loaded. The preliminary region may be preprocessed to segment one or more bone regions.

In some embodiments, the validation of the anchor point may include one or more of the following operations. If the y coordinate of the anchor point is greater than H/4, and the shift of the x coordinate from the central position is less than H/4, the anchor point may be valid. Otherwise, the anchor point may be invalid.

In some embodiments, the calibration of the anchor point may include one or more of the following operations. Calibrating the anchor points whose coordinate are abnormal. Calibrating the anchor points that lack coordinate.

In still another aspect of the present disclosure, an image segmentation method is provided. The image segmentation method may include one or more of the following operations. A first image may be transformed into a first 2D image. The pixel values of the 2D image may correspond to those of the first image. The first image may be a binary image that is generated based on an ROI of a first CT image. A first region may be acquired based on the 2D image. The first region may be the highlighted part of the first 2D image. A second region may be acquired based on the first CT image. The second region may be the highlighted part of each 2D slice of the first CT image corresponding to the first region spatially. A second CT image may be calibrated based on the second region to generated a calibrated second CT image. The first CT image and the second CT image are both 3D CT images, and have the same size and number of 2D slices.

In some embodiments, the first CT image may be an original CT image of a lung, and the second CT image may be a segmented CT image based on the original CT image of a lung.

In some embodiments, the transformation of the first image into the first 2D image may include one or more of the following operations. In some embodiments, the first image may be projected along the human body to generate the 2D image. The pixel values of the 2D image may correspond to those of the first image. In some embodiments, the highlighted part of the 2D image may be acquired based on clustering, or threshold segmentation.

In some embodiments, the first region may be the highlighted part that has the most pixels among multiple highlighted parts.

In some embodiments, the regions corresponding to the first region in the slices of the first image may have the same spatial position with the first region.

In some embodiments, the second region may be acquired by performing threshold segmentation on the region of every 2D slice corresponding to the first region of the first CT image.

In some embodiments, the calibration of the second CT image may include setting the pixels of the regions corresponding to the second region in every 2D slice of the second CT image as the background color of the second CT image.

In still another aspect of the present disclosure, an image segmentation apparatus is provided. The image segmentation apparatus may include a transformation unit, a first acquisition unit, a second acquisition unit, a calibration unit. The transformation unit may be configured to transform the first image into a first 2D image. The pixel values of the 2D image may correspond to those of the first image. The first acquisition unit may be configured to acquire a first region, the first region may be the highlighted part of the 2D image. The second acquisition unit may be configured to acquire a second region, the second region may be the highlighted part of each 2D slice of the first CT image corresponding to the first region spatially. The calibration unit may be configured to calibrate the second CT image based on the second region to generate a calibrated second CT image. The first CT image and the second CT image are both 3D CT images, and have the same size and number of 2D slices.

In some embodiments, the image segmentation apparatus may further include a determination unit. The determination unit may be configured to determine the highlighted part that has the most pixels among multiple highlighted parts as the first region.

In some embodiments, the calibration unit may further include pixel value reset unit. The pixel value reset unit may be configured to set the pixels of the regions corresponding to the second region in every 2D slice of the second CT image as the background color of the second CT image.

In still another aspect of the present disclosure, a hepatic artery segmentation method is provided. In some embodiments, a CT data including a CT image and a corresponding liver mask may be acquired. Then a seed point of the hepatic artery may be selected. A first binary volume data and a second binary volume data may be generated by a segmentation method. The segmentation may be performed by segmenting the CT image data based on the CT value of the seed point. The first binary volume data may include a backbone and a rib connected therewith. The second binary volume data may include a backbone, a rib connected therewith and a hepatic artery. A third binary volume data may be generated by removing a part same with the first binary volume data from the second binary volume data. The hepatic artery may be generated through a 3D region growing in the third binary volume data based on the seed point selected before.

In some embodiments, the first binary volume data may be generated by performing a threshold segmentation for backbone on the CT image data. The second binary volume data may be generated by performing a threshold segmentation for hepatic artery on the CT image data.

In some embodiments, the seed point selecting method may further include: S11. Determining the slices to select the seed point of the hepatic artery; S12. Selecting the seed point and computing its CT value.

In some embodiments, the generating method of the first binary volume data may further include: performing a coarse segmentation on the original CT image data and acquiring a bone binary volume data including a bone and other tissue; subdividing the bone binary volume data into region slice and re-segmenting the region slice by using a superposition strategy and acquiring the first binary volume data including a backbone and a rib connected therewith.

In some embodiments, the hepatic artery segmentation method may further include post-pressing the hepatic artery. In some embodiments, the post-processing method may include an artery repair.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
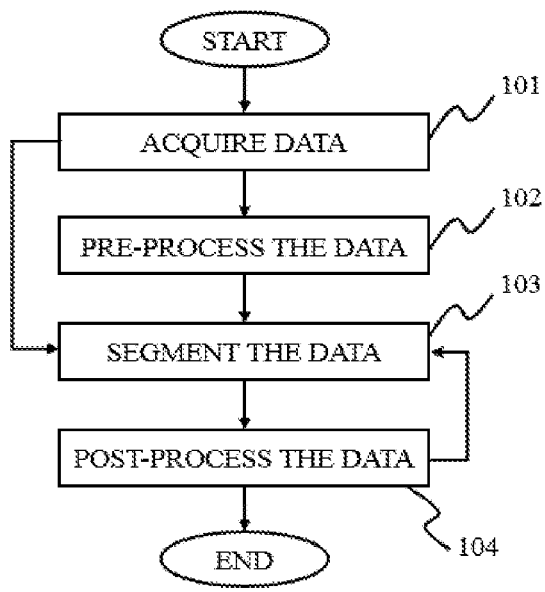
FIG. 1 is a flowchart illustrating a method for image processing according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirits and scope of the present disclosure. Thus, the present disclosure is not limited to the embodiments shown, but to be accorded the widest scope consistent with the claims.

It will be understood that the term "system," "unit," "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an" and "the" may be intended to include the plural forms as well, unless the context clearly indicates otherwise. It will be further understood that the terms "include," and/or "comprising," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In a medical imaging process, an image segmentation (or "recognition," "classification," "extraction," etc.) may be performed to establish a realistic subject models by dividing or partitioning a medical image into one or more constituent sub-regions. In some embodiments, the medical imaging system may be various modalities including Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. In some embodiments, the subject may be an organ, a texture, a region, an object, a lesion, a tumor, or the like, or any combination thereof. Merely by way for example, the subject may include a head, a breast, a lung, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. In some embodiments, the medical image may include a 2D image and/or a 3D image. In the 2D image, its tiniest distinguishable element may be termed as a pixel. In the 3D image, its tiniest distinguishable element may be termed as a voxel ("a volumetric pixel" or "a volume pixel"). In some embodiments, the 3D image may also be seen as a series of 2D slices or 2D layers.

The segmentation process is usually performed by recognizing one or more similar information of a pixel and/or a voxel in the image. In some embodiments, the similar information may be characteristics or features including gray level, mean gray level, intensity, texture, color, contrast, brightness, or the like, or any combination thereof. In some embodiments, some spatial properties of the pixel and/or voxel may also be considered in a segmentation process.

For illustration purposes, the following description is provided to help better understanding a segmentation process. It is understood that this is not intended to limit the scope the present disclosure. For persons having ordinary skills in the art, a certain amount of variations, changes and/or modifications may be deducted under guidance of the present disclosure. Those variations, changes and/or modifications do not depart from the scope of the present disclosure.

FIG. 1 is a flowchart illustrating a method for image processing according to some embodiments of the present disclosure. As described in the figure, the image processing method may include steps such as acquiring data, pre-processing the data, segmenting the data 130 and/or post-processing the data.

In step 101, data may be acquired. In some embodiments, the data may be information including data, a number, a text, an image, a voice, a force, a model, an algorithm, a software, a program, or the like, or any combination thereof. Merely by way for example, the data acquired in step 101 may include an image data, an image mask and a parameter. In some embodiments, the image data may be an initial image data or an image data after treatment. Merely by way for example, the treatment may be a pre-processing, an image segmentation, or a post-processing. The image may be a two dimensional (2D) image or a three dimensional (3D) image. The image may be acquired from any medical imaging system as described elsewhere in the present disclosure. In some embodiments, the image mask may be a binary mask to shade a specific area of an image. The image mask may be used to supply a screen, extract an area of interest, and/or make a specific image. In some embodiments, the parameter may be some information input by a user or an external source. For example, the parameter may include a threshold, a characteristic, a CT value, a region of interest (ROI), a number of iteration times, a seed point, an equation, an algorithm, or the like, or any combination thereof.

It should be noted that the above embodiments are for illustration purposes and not intended to limit the scope of the present disclosure. The data acquired in step 110 may be variable, changeable, or adjustable based on the spirits of the present disclosure. For example, the data may also be a mode, a priori information, an expert-defined rule, or the like, or any combination thereof for specific subject. These information may be trained or self-studied before or during an image segmentation. However, those variations and modifications do not depart from the scope of the present disclosure.

In step 102, the data acquired may be pre-processed according to some embodiments of the present disclosure. The pre-processing step 102 may be used to make the data adaptive to segment. For example, the pre-processing of data may include suppressing, weakening and/or removing a detail, a mutation, a noise, or the like, or any combination thereof. In some embodiments, the pre-processing of data may include performing an image smoothing and an image enhancing. The smoothing process may be in a spatial domain and/or a frequency domain. In some embodiments, the spatial domain smoothing method may process the image pixel and/or voxel directly. The frequency domain smoothing method may process a transformation value firstly acquired from the image and then inverse transform the transformation value into a space domain. The imaging smoothing method may include a median smoothing, a Gaussian smoothing, a mean smoothing, a normalized smoothing, a bilateral smoothing, or the like, or any combination thereof.

It should be noted that the above embodiments are for illustration purposes and not intended to limit the scope of the present disclosure. The pre-processing step 102 may be variable, changeable, or adjustable based on the spirits of the present disclosure. For example, the pre-processing step 102 may be removed or omitted in some embodiments. For another example, the pre-processing method may also include some other image processing techniques including, e.g., an image sharpening process, an image segmentation, a rigid regulation, a non-rigid registration, or the like, or any combination thereof. However, those variations and modifications do not depart from the scope of the present disclosure.

In step 103, the data with pre-processing may be segmented. It should be noted that the pre-processing step 102 may be not a necessary and the original data may be segmented directly without a pre-processing. In some embodiments, the method of a segmentation may include a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the segmentation method may be performed in a manual type, a semi-automatic type or an automatic type. The three types may provide different choices to a user or an operator and allow the user or the operator participate in the image process in various degrees. In some embodiments of the manual type, a parameter of the segmentation may be determined by the user or the operator. The parameter may be a threshold level, a homogeneity criterion, a function, an equation, an algorithm, a model, or the like, or any combination thereof. In some embodiments of the automatic type, the segmentation may be incorporated with some information about a desired subject including, e.g., a priori information, an optimized method, an expert-defined rule, a model, or the like, or any combination thereof. The information may also be updated by training or self-learning. In some embodiments of the semi-automatic type, the user or the operator may supervise the segmentation process in a certain level.

For illustration purposes, an automatic segmentation will be described below and not intended to limit the scope of the present disclosure. In some embodiments, there may be some pre-existing models of a region of interest (ROI) to be selected before, during, and/or after the segmentation in an automatic segmentation process. Each model may include some characteristics that be used to determine whether it is adaptive to a patient. The characteristics may include a patient information, an operator information, an instrument information, or the like, or any combination thereof. In some embodiments, the patient information may include ethnicity, citizenship, religion, gender, age, matrimony, height, weight, medical history, job, personal habits, organ, tissue, or the like, or any combination thereof. The operator information may include a department, a title, an experience, an operating history, or the like, or any combination thereof. The instrument information may include model, running status, etc. of the imaging system. When an image segmentation need to be performed, one or more of the characteristics described above may be checked and fitted to a proper pre-existing model.

It should be noted that the above embodiments are for illustration purposes and not intended to limit the scope of the present disclosure. The segmentation step 103 may be variable, changeable, or adjustable based on the spirits of the present disclosure. In some embodiments, the segmentation step may have more than one segmenting operation. For example, the segmenting operation may include a coarse segmentation and a fine segmentation in one segmentation process. For another example, two or more segmentation methods may be used in one segmentation process. However, those variations, changes and modifications do not depart from the scope of the present disclosure.

In step 104, the data segmented may be post-processed in some embodiments. It should be noted that the post-processing step 104 may be not necessary and the original data may be segmented directly without a post-processing. The post-processing technique may include a 2D post-processing technique, a 3D post-processing technique and other technique. In some embodiments, the 2D post-processing technique may include a multi-planar reformation (MPR), a curved planar reformation (CPR), a computed volume reconstruction (CVR), a volume rendering (VR), or the like, or any combination thereof. In some embodiments, the 3D post-processing technique may include a 3D surface reconstruction, a 3D volume reconstruction, a volume intensity projection (VIP), a maximum intensity projection (MIP), a minimum intensity projection (Min-IP), an average intensity projection (AIP), an X-ray simulation projection, a volume rendering (VR), or the like, or any combination thereof. In some embodiments, there may be other post-processing technique. The other technique may include a repair process, a render process, a filling process, or the like, or any combination thereof.

It should be noted that the above embodiments are for illustration purposes and not intended to limit the scope of the present disclosure. The post-processing step 104 may be variable, changeable, or adjustable based on the spirits of the present disclosure. Merely by way for example, the post-processing step may be omitted. For another example, the data post-processed may be returned to the step 103 and performed by a segmentation. For still another example, the post-processing step may be divided into more than one steps. However, those variations, changes and modifications do not depart from the scope of the present disclosure.

It also should be noted that the above embodiments are for illustration purposes and not intended to limit the scope of the present disclosure. For persons having ordinary skill in the art, the image processing method may be variable, changeable, or adjustable based on the spirits of the present disclosure. In some embodiments, the steps may be added, deleted, exchanged, replaced, modified, etc. For example, the pre-processing and/or post-processing may be deleted. For another example, the order of the steps in the image processing method may be changed. For still another example, some steps may be executed repeatedly. However, those variations, changes and modifications do not depart from the scope of the present disclosure.

Figure 2:
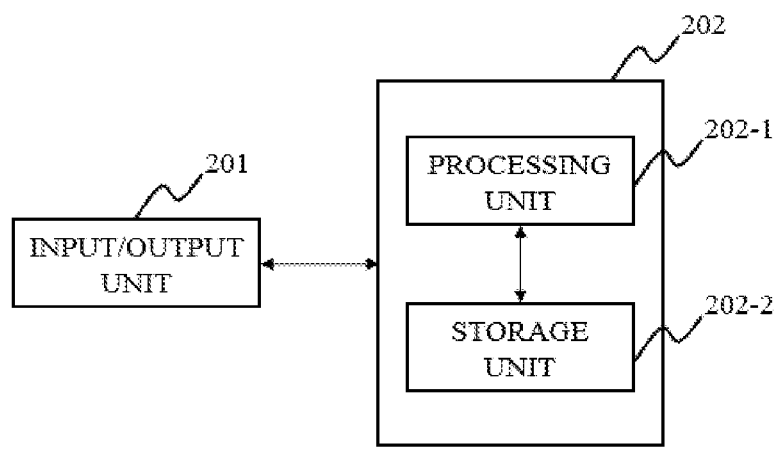
FIG. 2 is a block diagram depicting an image processing system according to some embodiments of the present disclosure.

FIG. 2 is a block diagram illustrating an image processing system according to some embodiments of the present disclosure. As described in the figure, the image processing system 202 may include a processing unit 202-1, a storage unit 202-1. In some embodiments, the imaging system 202 may be also integrated, connected or coupled to an input/output unit 201. The image processing system 202 may be a single component or integrated with the imaging system as described elsewhere in the present disclosure. The image processing system 202 may also be configured to process different kinds of data acquired from the imaging system as described elsewhere in the present disclosure. It should be noted that the assembly or the components of the image processing system 202 may be variable in other embodiments.

The input/output unit 201 may be configured to perform an input and/or an output function in the image processing system 202. Some information may be input into or output from the processing unit 202-1 and/or the storage unit 202-2. In some embodiments, the information may include data, a number, a text, an image, a voice, a force, a model, an algorithm, a software, a program, or the like, or any combination thereof. Merely by way for example, the model may be a pre-existing model of a region of interest (ROI) as described elsewhere in the present disclosure. In some embodiments, the input/output unit 201 may include a display, a keyboard, a mouse, a touch screen, an interface, a microphone, a sensor, a wireless communication, a cloud, or the like, or any combination thereof. Merely by way for example, the wireless communication may be a Bluetooth, a Near Field Communication (NFC), a wireless local area network (WLAN), a WiFi, a Wireless a Wide Area Network (WWAN), or the like, or any combination thereof. In some embodiments, the information may be input from by or output to an external subject. The external subject may be a user, an operator, a patient, a robot, a floppy disk, a hard disk, a wireless terminal, a processing unit, a storage unit, or the like, or any combination thereof.

It also should be noted that the above embodiments are for illustration purposes and not intended to limit the scope of the present disclosure. For persons having ordinary skill in the art, the input/output unit may be variable, changeable, or adjustable based on the spirits of the present disclosure. In some embodiments, the input/output unit 201 may be subdivided into an input module and an output module. In some embodiments, the input/output unit 201 may be integrated in one module. In some embodiments, the input/output unit 201 may be more than one. In some embodiments, the input/output unit 201 may be omitted. However, those variations, changes and modifications do not depart from the scope of the present disclosure.

The image processing system may include a processing unit 202-1 and a storage unit 202-2. In some embodiments, the processing unit 202-1 may be configured or used to process the information as described elsewhere in the present disclosure from the input/output 201 and/or the storage unit 202-2. In some embodiments, the processing unit 202-1 may be a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The processing unit 202-1 may perform a pre-processing operation, a co-processing operation, a post-processing operation. In some embodiments, the pre-processing operation may include suppressing, weakening and/or removing a detail, a mutation, a noise, or the like, or any combination thereof. In some embodiments, the co-processing operation may include an image reconstruction, an image segmentation, etc. In some embodiments, the post-processing operation may include a 2D post-processing technique, a 3D post-processing technique and other technique. The apparatus used in different process may be different or the same. Merely by way for example, the image smoothing in the pre-processing step may be executed by an apparatus including, e.g., a median filter, a Gaussian filter, a mean-value filter, a normalized filter, a bilateral filter, or the like, or any combination thereof.

For illustration purposes, an exemplary processing unit performing an image segmentation will be described in detail below. The processing unit 202-1 may include a parameter, an algorithm, a software, a program, or the like, or any combination thereof. In some embodiments, the parameters may include a threshold, a CT value, a region of interest, a number of iteration times, a seed point, or the like, or any combination thereof. In some embodiments, the algorithm may include some algorithms used to perform a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmenta-tion, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the software for image segmentation may include Brain Imaging Center (BIC) software toolbox, BrainSuite, Statistical Parametric Mapping (SPM), FMRIB Software Library (FSL), Eikona3D, FreeSurfer, Insight Segmentation and Registration Toolkit (ITK), Analyze, 3D Slicer, Cavass, Medical Image Processing, Analysis and Visualization (MI-PAV), or the like, or any combination thereof.

The storage unit 202-2 may be connected or coupled with the input/output unit 201 and/or the processing unit 202-1. In some embodiments, the storage unit 202-2 may acquire information from or output information to the input/output unit 201 and/or the processing unit 202-1. The information may include data, a number, a text, an image, a voice, a force, a model, an algorithm, a software, a program, or the like, or any combination thereof. Merely by way for example, the number acquired from or output to the processing unit 202-1 may include a threshold, a CT value, a number of iteration times, or the like, or any combination thereof. The algorithm acquired from or output to the processing unit 202-1 may include a series of image processing methods. Merely by way for example, the image processing method for segmentation may include a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. The image acquired from or output to the processing unit 202-1 may include a pre-processing image, a co-processing image, a post-processing image, or the like, or any combination thereof. The model acquired from or output to the processing unit 202-1 may include pre-existing model corresponding to different ethnicity, citizenship, religion, gender, age, matrimony, height, weight, medical history, job, personal habits, organ, tissue, or the like, or any combination thereof.

The storage unit 202-2 may also be an external storage or an internal storage. In some embodiments, the external storage may include a magnetic storage, an optical storage, a solid state storage, a smart cloud storage, a hard disk, a soft disk, or the like, or any combination thereof. The magnetic storage may be a cassette tape, a floppy disk, etc. The optical storage may be a CD, a DVD, etc. The solid state storage may be a flash memory including a memory card, a memory stick, etc. In some embodiments, the internal storage may be a core memory, a Random Access Memory (RAM), a Read Only Memory (ROM), a Complementary Metal Oxide Semiconductor Memory (CMOS), or the like, or any combination thereof.

It also should be noted that the above embodiments are for illustration purposes and not intended to limit the scope of the present disclosure. For persons having ordinary skill in the art, the image processing system may be variable, changeable, or adjustable based on the spirits of the present disclosure. In some embodiments, the processing unit 202-1 and/or the storage unit 202-2 may be a single unit or a combination with two or more sub-units. In some embodiments, one or more components of the image processing system may be simplified or integrated. For example, the storage unit 202-2 may be omitted or integrated with the processing unit 202-1, i.e., the storage unit and the processing unit may be a same device. However, those variations, changes and modifications do not depart from the scope of the present disclosure.

Figure 3:
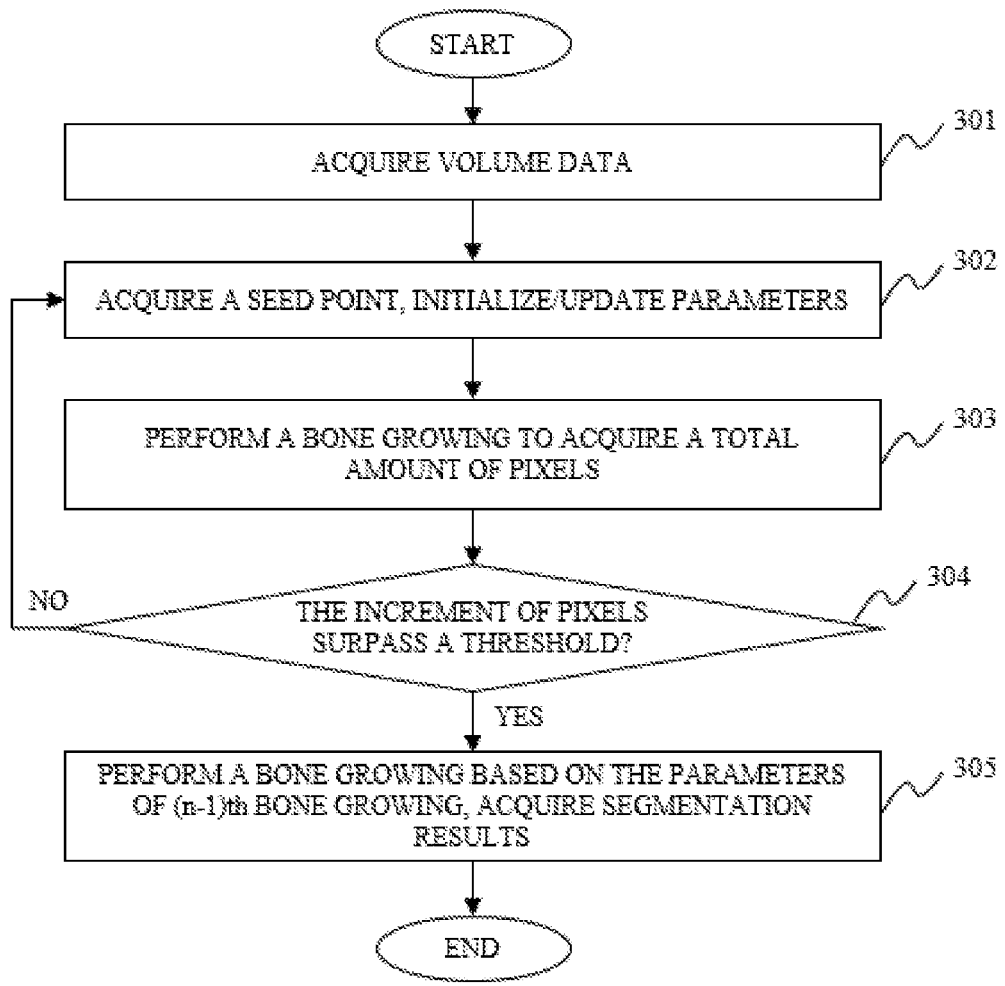
FIG. 3 is a flowchart illustrating a process for image segmentation according to some embodiments of the present disclosure.

FIG. 3 is a flowchart illustrating a process of image segmentation according to some embodiments of the present disclosure.

In step 301, volume data may be acquired. The volume data may be corresponding to medical images, and may comprise a group of 2D slices that may be acquired by techniques including DSA (digital subtraction angiography), CT (computed tomography), CTA (computed tomography angiography), PET (positron emission tomography), X-ray, MRI (magnetic resonance imaging), MRA (magnetic resonance angiography), SPECT (single-photon emission computerized tomography), US (ultrasound scanning), or the like, or a combination thereof. In some embodiments of the present disclosure, multimodal techniques may be used to acquire the volume data. The multimodal techniques may include CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof.

In step 302, at least a seed point may be acquired, and at least a parameter may be initialized or updated. The seed point may be acquired based on criterion including pixels in a certain grayscale range, pixels evenly spaced on a grid, etc.

In some embodiments of the present disclosure, the parameters may include a first threshold, a second threshold, and a boundary threshold. The parameters may be iteratively updated until a certain criteria is meet, for example, a threshold. The first threshold may be configured to determine a bone tissue in a CT image, the second threshold may be configured to determine a suspicious bone tissue in a CT image, and the boundary threshold may be configured to determine a boundary tissue of a bone in the CT image. Merely by way of example, the first threshold may be fixed during an iteration, the second threshold and the boundary threshold may be variable during the iteration. The second threshold and the boundary threshold may be initialized so that a relatively stable restriction may be achieved. They may be optimized in the iteration.

In some embodiments of the present disclosure, the first threshold and the second threshold may both refer to CT value. The first threshold may be set as 80 HU and the second threshold may be set as 305 HU. The boundary threshold may be calculated based on the threshold of a mathematical operator, for example, Laplace operator. The Laplace threshold may be set as 120.

$$L = \nabla^2 \varphi = \frac{\varphi_{i+1,j,k} + \varphi_{i-1,j,k} + \varphi_{i,j+1,k} + \varphi_{i,j-1,k} + \varphi_{i,j,k+1} + \varphi_{i,j,k-1} - 6*\varphi_{i,j,k}}{\Delta x^2} \approx$$

$$\varphi_{i+1,j,k} + \varphi_{i-1,j,k} + \varphi_{i,j+1,k} + \varphi_{i,j-1,k} + \varphi_{i,j,k+1} + \varphi_{i,j,k-1} - 6*\varphi_{i,j,k}$$

(Equation 1)

In step 303, a region growing may be performed on the seed point iteratively base on the parameters described in step 302. In some embodiments of the present disclosure, the region meet the first threshold may be determined as a bone tissue. The region meet the first threshold may be determined based on the second threshold as well. The region meet both the first threshold and the second threshold may be determined as a definite bone tissue. The region meet the first threshold solely but the second threshold may be determined as a suspicious bone tissue. The region meet the first threshold but second threshold may be further determined based on the boundary threshold as well. If the boundary threshold is meet, the region may be determined as a boundary tissue. The parameters may be used to determine a growing point. Merely by way of example, the region meet all the three parameters may be determined as a growing point. The region meet first threshold solely may be determined as a bone tissue.

In step 304, the increment of pixels in two adjacent iterations may be assessed based on a threshold. In some embodiments of the present disclosure, the number of pixels in the nth iteration may be compared with the number of pixels in the (n−1)th iteration. If the increment of pixels surpass a threshold, the iteratively performed region growing may be terminated and step 305 may be performed. If the increment of pixels is within the threshold, step 302 may be performed and the parameters may be updated. Merely by way of example, n may be an integer that is greater than or equal to 2.

In some embodiments of the present disclosure, the increment of the pixels may be used to eliminate the influence of adjacent tissues of the bone that is under region growing, and determine the boundary of the bone. Taking the nth operation as an example, the number of pixels in the nth iteration may be denoted as Sum(n), and the number of pixels in the (n−1)th iteration may be denoted as Sum(n−1), and the increment of pixels may be denoted as [Sum(n)−Sum(n−1)]/Sum(n−1). When the increment of pixels surpass a threshold, for example, 15%, step 305 may be performed. Otherwise, step 302 may be performed and the parameters may be updated.

In step 305, a new region growing may be performed based on the parameters generated in step 304. Referring to the example described in step 304, when the increment of pixels surpass a threshold, the parameters of the (n−1)th (n may be greater than or equal to 2) iteration may be used to performed the new bone growing in step 305. The parameters may include a first threshold, a second threshold, a boundary threshold, etc. In some embodiments of the present disclosure, the first threshold may be fixed. The second threshold and the boundary threshold may keep decreasing during the iteration.

It should be noted that the flowchart depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure. A mechanism of multi-level parameter that may include a number of parameters may be iteratively optimized to perform a region growing.

Figure 4:
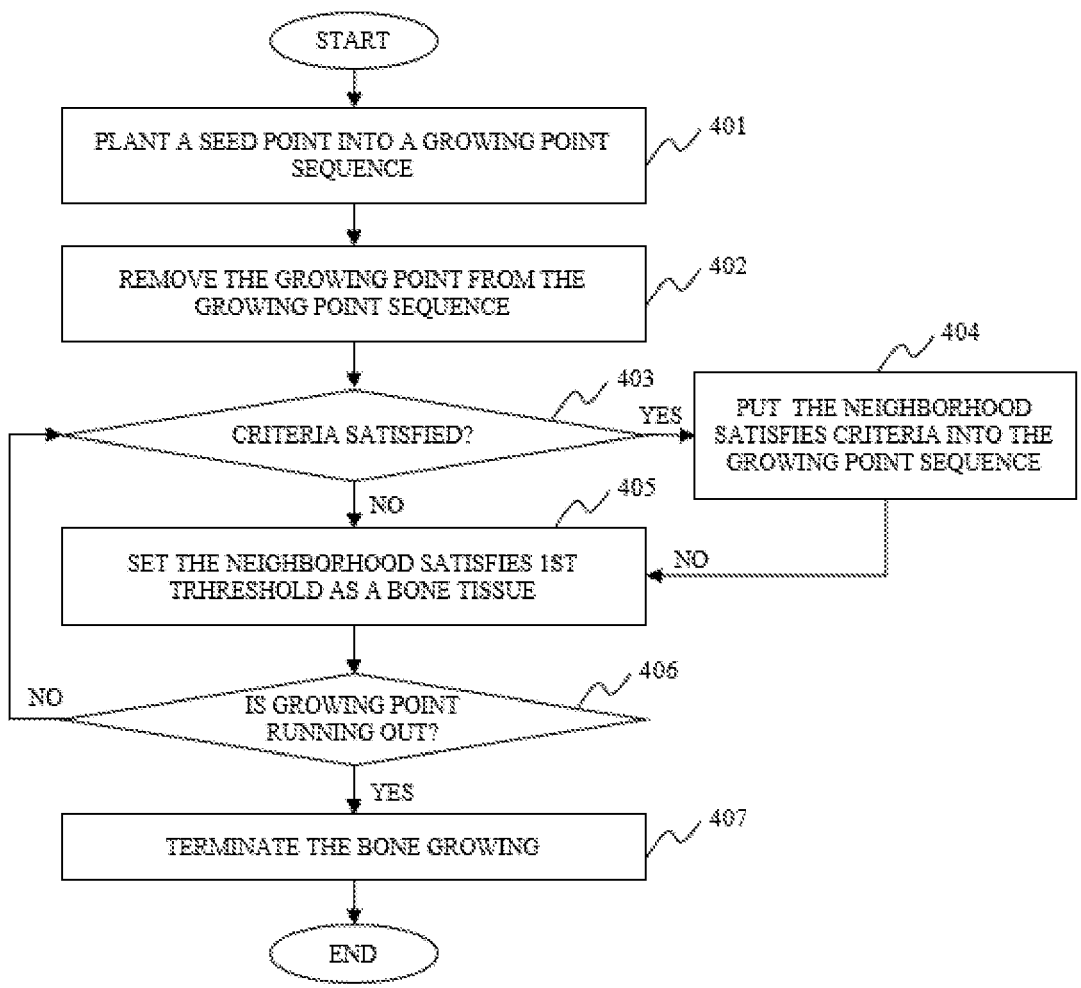
FIG. 4 illustrates a process for region growing according to some embodiments of the present disclosure.

FIG. 4 illustrates a process of region growing according to some embodiments of the present disclosure. In step 401, a seed point may be put into a growing point sequence. Taking the bone growing as an example, the seed point may be put into a bone growing point sequence. The seed point may be acquired based on criterion including pixels in a certain grayscale range, pixels evenly spaced on a grid, etc.

In step 402, a growing point may be removed from the growing point sequence, for example, a bone growing point sequence, and determined as a bone tissue.

In step 403, the pixels in the neighborhoods of the growing point may be assessed based on the parameters mentioned in FIG. 3. The parameters may include a first threshold, a second threshold, a boundary threshold, etc. If the pixels in the neighborhoods of the growing point meet the parameters, step 404 may be performed and the neighborhoods meet the parameters may be put into the growing point sequence. If the neighborhood meet the first threshold solely, step 405 may be performed and the neighborhoods may be determined as bone tissues. Step 406 may be performed to determine if the growing point has been exhausted. If the growing point is exhausted, step 407 may be performed and the region growing may be terminated. The number of pixels of the tissue may be acquired. The tissue may be a bone tissue. If the growing point is not exhausted. Step 402 may be performed again.

It should be noted that the flowchart depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure.

For illustration purposes, some image processing embodiments about a bronchus extracting method will be described below. It should be noted that the bronchus extracting embodiments are merely for better understanding and not intended to limit the scope of the present disclosure.

Figure 5:
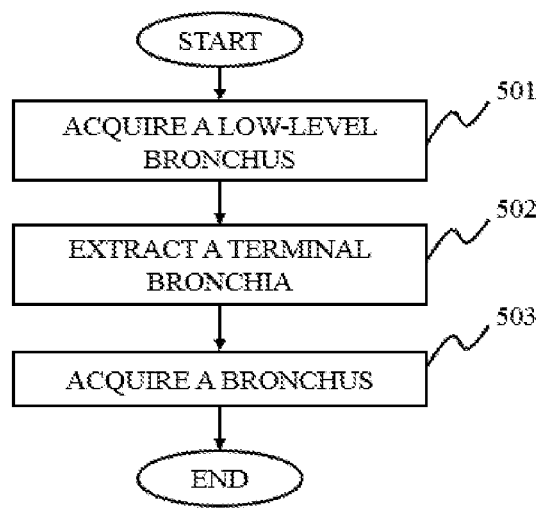
FIG. 5 is a flowchart illustrating a bronchus extracting method according to some embodiments of the present disclosure.

FIG. 5 is a flowchart illustrating a bronchus extracting method according to some embodiments of the present disclosure. As described in the figure, the bronchus extracting process may include acquiring a low-level bronchus, extracting a terminal bronchiole and acquiring a trachea. In some embodiments, some steps may be removed, displaced or added in the bronchus extracting process as described elsewhere in the present disclosure.

In some embodiments, a bronchial tree may provide a system for a trachea (or windpipe) to service a lung with transporting inhaling oxygen and exhaling dioxide. The bronchial tree may include a bronchus, a bronchiole, and an alveoli. The bronchus may be one of the two main bronchi of the trachea. The trachea may have a long tube structure and descend from a throat down to a thoracic cavity. For each main bronchus, it may subdivide into a secondary bronchus and the secondary bronchus may divide further into a tertiary bronchus. The tertiary bronchus may divide into a terminal bronchiole. The alveoli including a duct and an air sac may allow exchange of the gas in the blood. In some embodiments, the bronchial tree may be divided into several levels according to its division conduction. Merely by way for example, the number of levels may be any value chosen from 10 to 24. For example, in an image segmentation, the number of levels may be set according to some specific demands. In some embodiments, the bronchial tree may also be divided into a low-level bronchi and a terminal bronchiole. For illustration purposes, an exemplary embodiments of a 13 level bronchial tree may be described below. In the embodiments, the low-level bronchus may include one or more relative primary levels, e.g., 1 to 3 levels, 1-4 levels, 1-5 levels or other variations. The terminal bronchiole may include one or more relative terminal levels, e.g., 4-13 levels, 5-13 levels, 6-13 levels or other variations. It should be noted that the division of the low-level bronchus and the terminal bronchiole is not limited here and the above embodiments are merely for illustration purposes and not intended to limit the scope of the present disclosure.

In step 501, the bronchial tree with low-level bronchi may be acquired according to some embodiments of the present disclosure. The low-level bronchus may be extracted by an image segmentation. In some embodiments, the method of an image segmentation may include a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. For illustration purposes, a region growing based method and a morphology based method will be described below, it should be noted that it is not intended to limit the scope of the present disclosure.

In some embodiments of the region growing based method, one or more seed points may be deposited in a great airway by an automatic method or an interactive method to perform an initialization. In some embodiments, the airway may be a trachea. The region growing may include judging whether an adjacent point (a pixel or a voxel) meet a fused standard under a fixed or a self-adaptive threshold. In some embodiments, the region growing method may be based on a characteristic or a feature including a gray level, a mean gray level, an intensity, a texture, a color, a contrast, a brightness, or the like, or any combination thereof. Merely by way for example, the region growing method based on the gray characteristic will be described in detail below. The method may include searching a seed point according to the tube-like structure property of the trachea and performing region growing. In some embodiments, a voxel may be determined as belonging to a bronchus if it meet one or more thresholds. For example, the thresholds may include a first threshold and a second threshold. The first threshold may be applied to judge whether a voxel belong to a bronchus. For example, the first threshold may be an upper limit of HU value for a voxel in a bronchus and termed as a MaxAirwayHUThreshold. The second threshold may be used to distinguish a voxel in a bronchus and a voxel in a bronchus wall. For example, the second threshold may be an upper limit of difference of a HU value between the voxel in a bronchus and the voxel out a bronchus. And the second threshold may be termed as a MaxLunmenWallDiffThreshold. For example, if the two thresholds are satisfied synchronously, i.e., the HU value of a voxel V is lower than the first threshold and the difference between each HU value of all 26 voxels adjacent to the voxel V and the HU value of the voxel V is lower than the second threshold, then the voxel V may be determined as belonging to a bronchus. It should be noted that the 26 voxels are merely for exemplary purposes, the number of the adjacent voxels may be any natural number, e. g., 1, 2, 3, 4, etc.

In some embodiments of the morphology based method, the bronchus region may be extracted by a series of filters. See C. Pisupati, L. Wolff, W. Mitzner, and E. Zerhouni, "Segmentation of 3-D pulmonary trees using mathematical morphology," in Proc. Math. Morphol. Appl. Image Signal Process, May 1996, pp. 409-416, of which are hereby incorporated by reference in their entirety.

It should be noted that the above embodiments are for illustration purposes and not intended to limit the scope of the present disclosure. For persons having ordinary skills in the art, the image segmentation method may be variable, changeable, or adjustable based on the spirits of the present disclosure. In some embodiments, the low-level bronchus may be extracted by any image segmentation method as described elsewhere in the present disclosure. The image segmentation method may be a single method or any combination of the known methods as described elsewhere in the present disclosure. However, those variations, changes and modifications do not depart from the scope of the present disclosure.

In step 502, a terminal bronchiole may be extracted based on the low-level bronchus. The extracting method may be an energy-based 3D reconstruction method. The energy-based 3D reconstruction is a growing method based on a constraint condition of local energy minimization. According to the Markov Random Field Theory, the energy function may be relative to a growing potential energy. For each voxel, the growing potential energy of two states may be calculated. The two states may include a state that the voxel belongs to a terminal bronchiole and a state that the voxel doesn't belong to a terminal bronchiole. If the latter growing potential energy were bigger than the former, the voxel may be determined as belonging to a terminal bronchiole, and vice versa. The energy-based 3D reconstruction method will be described in detail later.

In step 503, the low-level bronchus and the terminal bronchiole may be fused together through an image fusion method to generate a bronchus extraction result. In some embodiments, the fusion method may be divided into a spatial domain fusion and a transform domain fusion. In some embodiments, the fusion method may include a high pass filtering technique, a HIS transform based image fusion, a PCA based image fusion, a wavelet transform image fusion, a pair-wise spatial frequency matching, or the like, or any combination thereof.

It should be noted that the above embodiments are for illustration purposes and not intended to limit the scope of the present disclosure. For persons having ordinary skills in the art, the bronchus extracting method may be variable, changeable, or adjustable based on the spirits of the present disclosure. In some embodiments, a data acquiring step may be added to FIG. 5. In some embodiments, the bronchia acquired after step 503 may also be post-processed by a method as described elsewhere in the present disclosure. However, those variations, changes and modification do not depart from the scope of the present disclosure.

For better understanding the present disclosure, some embodiments of extracting a terminal bronchiole will be described in detail below. It should be noted that these embodiments are not intended to limit the scope of the present disclosure. The energy-based 3D reconstruction is a growing method based on a constraint condition of local energy minimization. According to the Markov Random Field Theory, the energy function e may be relative to the growing potential energy $V_{prop}$, which may be calculated by:

$$\varepsilon = \exp\left(\frac{V_{prop}}{kT}\right) \quad \text{(Equation 2)}$$

Wherein kT is a fixed value.

The growing potential energy $V_{prop}$ in different states $st_x$ may be calculated for a voxel x. For example, if the voxel does not belong to a terminal bronchus, the $st_x$ is assigned by 0. If the voxel belongs to a terminal bronchus, the $st_x$ is assigned by 1. In some embodiments, if $V_{prop}(x,1) - V_{prop}(x,1) > 0$, the voxel x may be determined as belonging to a terminal bronchiole. Given the topology and density information of the terminal bronchiole, the $V_{prop}$ may include a first weighted term $V_{radial}$, a second weighted term $V_{distal}$ and a third weighted term $V_{control}$, i.e., $V_{prop} = V_{radial} + V_{distal} + V_{control}$. In some embodiments, the $V_{radial}$ may be used to support a growth in a radial direction, the $V_{distal}$ may be used to support a growth in a distal direction and the $V_{control}$ may be used to limit the growth in a bronchus tube. The former three weighted terms may be calculated by the following equations:

$$V_{radial}(x, st_x) = \frac{\sum_{y \in v_{26}(x)/st_y = st_x}(F(x) - F(y))}{\sum_{y \in v_{26}(x)} 1_{\{st_y = st_x\}}} + \sum_{y \in v_{26}(x)} 1_{\{st_y = st_x\}} \quad \text{(Equation 3)}$$

$$V_{distal}(x, st_x) = k_{x,v} \cdot \left(1 + \sum_{y \in v_{n,v}(x)} 1_{\{st_y = st_x\}}\right) \cdot \left(1 + \sum_{y \in v_{f,v}(x)} 1_{\{st_y \neq st_x\}}\right) \quad \text{(Equation 4)}$$

$$V_{control}(x, st_x) = -\sqrt{\frac{\sum_{y \in v_{26}(x)/st_y = 1}(F(x) - F(y))^2}{\sum_{y \in v_{26}(x)} 1_{\{st_y = 1\}}}} + F(x)_{\{st_x = 0\}} \quad \text{(Equation 5)}$$

Wherein x and y are voxel variables, v may be a voxel set, $v_{26}(x)$ may represent the 26 adjacent voxels of the voxel x, $v_{n,v}(x)$ may be a set of voxel adjacent to the voxel x, $v_{f,v}(x)$ may be a set of voxel apart from the voxel x, st represents a state. K may be a normalizing factor that guarantee the growing anisotropy in a terminal bronchiole. F is a HU value of the voxel x.

Figure 6:
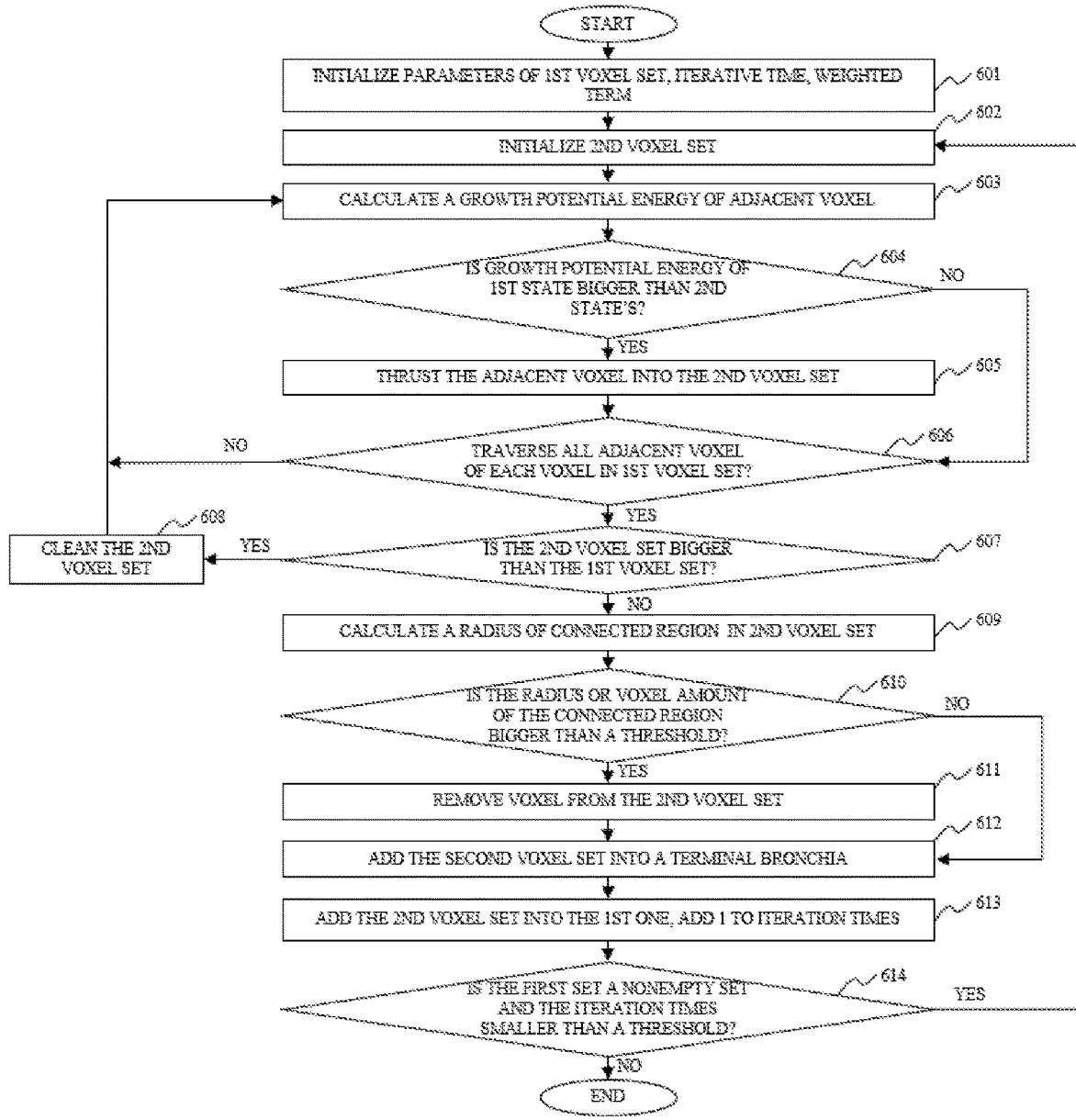
FIG. 6 is a flowchart illustrating a terminal bronchiole extracting method according to some embodiments of the present disclosure.

FIG. 6 illustrates a terminal bronchiole extracting method based on an energy-based 3D reconstruction process according to some embodiments of the present disclosure.

As illustrated in the figure, in step 601, some parameters may be initialized. The parameters may include a first voxel set, an iteration times, a weight assigned to the weighted term, or the like, or any combination thereof. For example, the first voxel set may be initialized as $S_1 = I_s$, the iteration times may be initialized as N=0, and the weights of the $V_{radial}$, $V_{distal}$, and $V_{control}$ may be assigned by $w_1$, $w_2$, and $w_3$, respectively.

In step 602, a second voxel set $S_2$ may be initialized as $S_2 = \Phi$, wherein $\Phi$ is a non-null set.

In step 603, the growing potential energy of each voxel p adjacent to each voxel in the first voxel set $S_1$ may be calculated, i.e., $V_{prop} = w_1 \cdot V_{radial} + w_2 \cdot V_{distal} + w_3 \cdot V_{control}$.

In step 604, the growing potential energy in two states may be compared. If $V_{prop}(p,1) > V_{prop}(p,0)$, it will enter into step 605, otherwise it will enter into step 606. $V_{prop}(p,1)$ is the growing potential energy in the first state ($st_x = 1$) that the voxel p belongs to a terminal bronchiole, and $V_{prop}(p,0)$ is the growing potential energy in the second state ($st_x = 0$) that the voxel p doesn't belong to a terminal bronchiole.

In step 605, the voxel p may be thrusted into the second voxel set $S_2$.

In step 660, whether all voxels p that adjacent to every voxel x in the first voxel set $S_1$ are traversed or not may be judged. If the answer is yes, it will enter into step 607, otherwise it will return to step 603.

In step 607, the number of the voxels in the first voxel set $S_1$ and in the second voxel set $S_2$ may be compared. If the number of the voxels in S1 is bigger than the number of the voxels in $S_2$, it will enter into step 608, otherwise it will return to step 609.

In step 608, the second voxel set $S_2$ will be cleaned off, i.e., the condition that the growing terminal bronchus is bigger than the original bronchus may be determined as not correct and abandoned.

In step 609, all the connected regions D in the second voxel set $S_2$ may be searched. The searching method may be through a calculation. Then a radius r of each connected region d may be calculated.

In step 610, the voxel amount $n_d$ and/or the radius r of the connected region d may be compared to a threshold respectively. For example, $n_T$ may be used to represent a threshold of the voxel amount $n_d$ and $r_T$ may be used to represent a threshold of the radius r. In some embodiments, if the voxel amount $n_d$ is bigger than $n_T$ or the radius r is bigger than $r_T$, it will enter into step 611, otherwise it will enter into step 612.

In step 611, the voxel x in the connected region that does not satisfy the demand in step 610 may be removed from the second voxel set $S_2$.

In step 612, the voxel in the second voxel set $S_2$ satisfying the demand in step 610 may be added into the results $I_f$ of the terminal bronchiole.

In step 613, the second voxel set $S_2$ may be assigned to the first voxel set $S_1$ and the number of iteration may be added with 1, i.e., $S_1=S_2$ and N+=1.

In step 614, if the first voxel set $S_1$ is a non-null set and the number of iteration is no bigger than $N_T$, it will return to step 602, otherwise it will end the iteration process. A terminal bronchiole segmentation result $I_f$ may be acquired after the iteration process.

In some embodiments, a weighted terms self-adjusting method may be added in the energy-based 3D reconstruction process. The weight value chosen to self-adjust may be $w_1$, $w_2$, $w_3$ or any combination thereof. For example, the weight value $w_3$ of $V_{control}$ may be self-adjusted to control the terminal bronchus's growing in a bronchus tube. In step 602, the weight value $w_3$ of $V_{control}$ may be initialized at the same time. In step 608, the weight value $w_3$ of $V_{control}$ may be adjusted simultaneously, for example, $w_3+=\Delta w$. It should be noted that $w_1$ and/or $w_2$ may also be self-adjusted in other embodiments.

It should be noted that the above embodiments are for illustration purposes and not intended to limit the scope of the present disclosure. For persons having ordinary skill in the art, the energy-based 3D reconstruction process method may be variable, changeable, or adjustable based on the spirits of the present disclosure. In some embodiments, one or more steps in FIG. 6 may be exchanged, added or removed. For example, the steps extracting a bronchial tree may be added before an energy-based 3D reconstruction process, and/or an image fusion process may be added after the energy-based 3D reconstruction process. In some embodiments, the parameters in some step may be changed or replaced. For example, thresholds such as $n_T$, $r_T$, or $N_T$ and parameters such as $w_1$, $w_2$, or $w_3$ may be varied or changed according to specific implementation scenarios. However, those variations, changes and modifications do not depart from the scope of the present disclosure.

Figure 7:
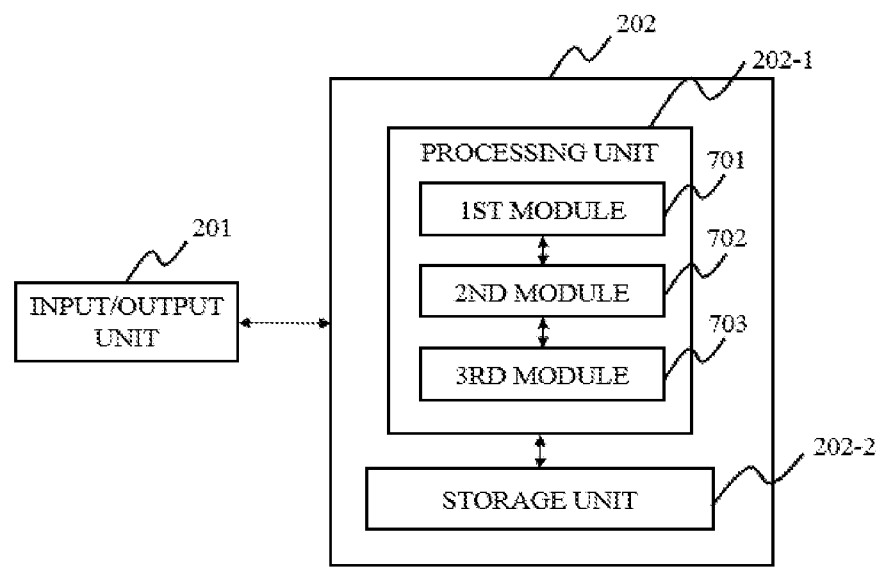
FIG. 7 is a block diagram depicting an image processing system for extracting a bronchus according to some embodiments in the present disclosure.

FIG. 7 illustrates a diagram of an image processing system for extracting a bronchus according to some embodiments of the present disclosure. As shown in FIG. 7, an image processing system 202 may include a processing unit 202-1, and a storage unit 202-2. In some embodiments, the imaging processing system 202 may also be integrated, connected or coupled to an input/output unit 201 as described elsewhere in the present disclosure. It should be noted that the image system is merely for exemplary purposes and not intended to limit the scope of the present disclosure.

The processing unit 202-1 may be configured to process some information. Mere by way for example, the information may include data, a number, a text, an image, a voice, a force, a model, an algorithm, a software, a program, or the like, or any combination thereof. In some embodiments, the processing unit 202-1 may be a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

In some embodiments, the processing unit 202 may further include a first module 701, a second module 702 and a third module 703. The three modules may work cooperatively or independently. For example, the first module 701 may be configured to extract a low-level bronchus, the second module 702 may be configured to extract a terminal bronchiole and the third module may be configured to fuse the low-level bronchus and the terminal bronchiole. For another example, one single module chosen from the above three modules may also perform all the functions independently without help from the other modules. In some embodiments, each module of 701, 702 and 703 may include a processer, a hardware, a software, an algorithm, a memory, or the like, or any combination thereof. The categories, amount, size, or type of the components in different module may be different or may be identical according to specific implementation scenarios. In some embodiments, the module 701, 702 and 703 may also share a same component such as a processer, a hardware, a software, an algorithm, a memory, or the like, or any combination thereof. For example, module 701, 702 and 703 may share the same input/output unit 201 and the storage unit 202-2 in FIG. 6.

It should be noted that the above embodiments are for illustration purposes and not intended to limit the scope of the present disclosure. For persons having ordinary skill in the art, the image processing system may be variable, changeable, or adjustable based on the spirits of the present disclosure. In some embodiments, some components may be exchanged, added or removed in the image processing. For example, the input/output unit may be integrated into the image processing system. For another example, the three modules in the processing unit may be integrated into one module or divided into more than three modules. However, those variations, changes and modifications do not depart from the scope of the present disclosure.

Figure 8:
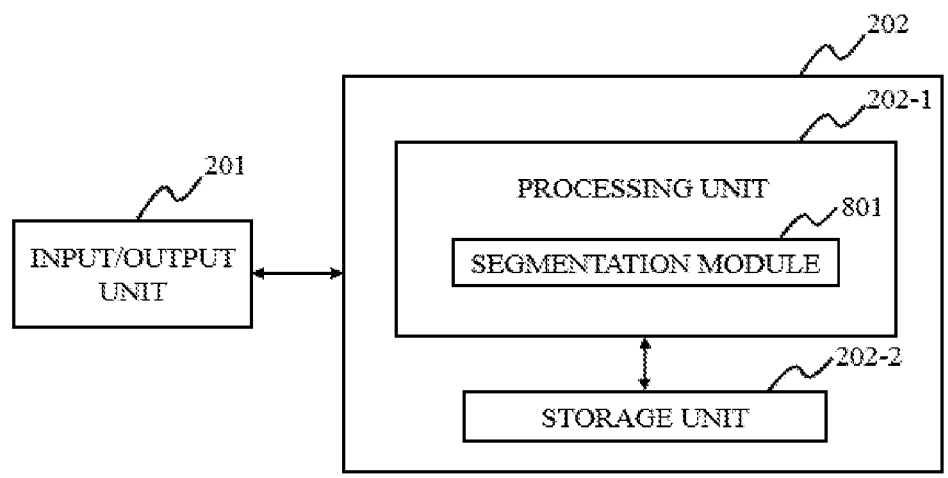
FIG. 8 is a block diagram illustrating a processing unit of image processing according to some embodiments of the present disclosure.

FIG. 8 is a block diagram illustrating an exemplary processing unit of image processing system according to some embodiments of the present disclosure. The processing unit 202-1 may be configured or used to process the information as described elsewhere in the present disclosure form the input/output 201 and/or the storage unit 202-2. The processing unit 202-1 may be configured to perform a pre-processing operation, a co-processing operation, a post-processing operation. In some embodiments, the pre-processing operation may include suppressing, weakening and/or removing a detail, a mutation, a noise, or the like, or any combination thereof. In some embodiments, the co-processing operation may include an image reconstruction, an image segmentation, etc. In some embodiments, the post-processing operation may include a 2D post-processing technique, a 3D post-processing technique and other technique. In some embodiments, the processing unit 202-1 may be a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

For illustration purposes, the processing unit 202-1 may include a segmentation module 801. The segmentation module 801 may include a pre-process block, a recognition block, a coarse segmentation block, a fine segmentation block, a fusion block and a post-process block. The pre-process block may be configured or used to perform one or more pre-processing operations. The recognition block may be configured or used to recognize or/and determine one or more regions of interest (ROI). The coarse segmentation block may be configured or used to perform a coarse segmentation. The fine segmentation block may be configured or used to perform a fine segmentation. The fusion segmentation block may be configured or used to fuse the results of the coarse segmentation block and the fine segmentation block or process the result of fine segmentation block. The post-process block may be configured or used to perform one or more post-processing operations.

In some embodiments of the present disclosure, the recognition block may be configured or used to recognize and/or determine an ROI wherein a tumor located; the coarse segmentation block may be configured or used to perform a coarse segmentation of tumor based on a feature classification method; the fine segmentation block may be configured or used to perform a fine segmentation of tumor based on level set method (LSM); the fusion segmentation block may be configured or used to process the result of the fine segmentation block in which the result of the coarse segmentation block is utilized.

In some embodiments of the present disclosure, the recognition block may be configured or used to recognize or/and determine one or more ROIs wherein a lung may locate; the coarse segmentation block may be configured or used to perform a coarse segmentation of the lung, acquiring one or more target regions, which is/are divided into one or more central regions and one or more boundary regions; the fine segmentation block may be configured or used to perform a fine segmentation of the lung by making use of one or more classifiers, acquiring one or more parting segmentation regions, which is/are separated from the boundary regions; the fusion segmentation block may be configured or used to fuse the result of the fine segmentation block and the result of the coarse segmentation block, merely by way of example, to fuse the target regions and the parting segmentation regions. The post-process block may be configured or used to performing image smoothing, the methods of image smoothing may include a median smoothing, a Gaussian smoothing, a mean smoothing, a normalized smoothing, a bilateral smoothing, smoothing with mathematical morphology or the like, or any combination thereof.

It should be noted that the above description of the processing unit 202-1 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the assembly and/or function of the processing unit 202-1 may be varied or changed. The assembly and/or function of the segmentation module 801 may be varied or changed. Merely by way of example, The pre-process block, the recognition block and the post-process block may not exist in the segmentation module 801; the function of recognizing or/and determining one or more ROIs may be performed in other module(s) or blocks; the coarse segmentation and the fine segmentation may be performed in one module block or may be performed in more blocks; the fusion segmentation block may be configured or used to process the result of coarse segmentation block; the function of each blocks described in the segmentation module 801 may be performed one or more times.

Figure 9:
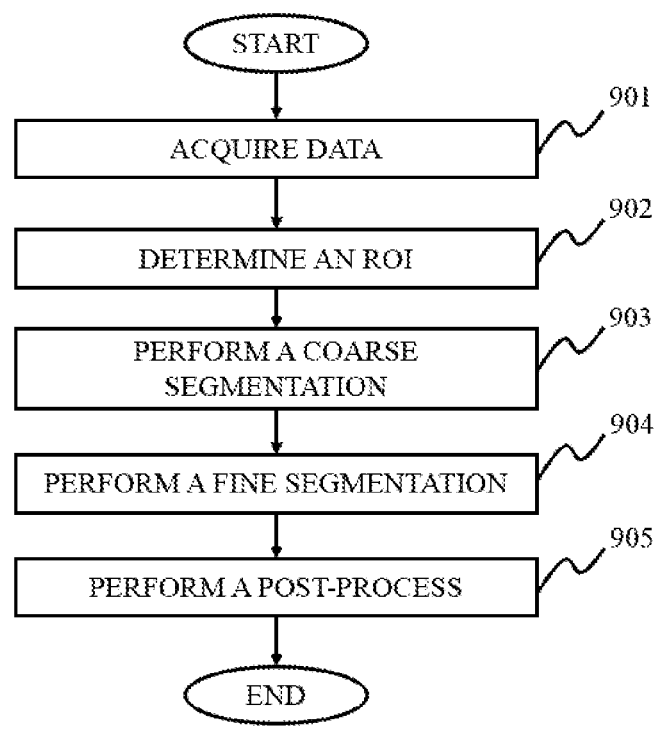
FIG. 9 is a flowchart illustrating a process for image segmentation according to some embodiments of the present disclosure.

FIG. 9 is a flowchart illustrating an exemplary process of image segmentation according to some embodiments of the present disclosure. In step 901, one or more kinds of data may be acquired. In some embodiments, the data may be image data, image mask data, parameter, or the like, or any combination thereof. In some embodiments, the image data may be initial image data or processed data. Merely by way of example, the processing may be an image segmentation. The image may be a 2D image or a 3D image. The image may be a CT image, an MR image, an Ultrasound image, a PET image, or the like, or any combination thereof. In some embodiments, the image mask may be a binary mask extracted from a specific area of an image. The image mask may be used to supply a screen, extract a region of interest, and/or make a specific image. The parameter may be some information input by a user or an external source. For example, the parameter may include a threshold, a CT value, a region of interest (ROT), a number of iterations, a seed point, an equation, an algorithm, or the like, or any combination thereof.

It should be noted that the above embodiments are for illustration purposes and not intended to limit the scope of the present disclosure. The data acquired in step 901 may be variable, changeable, or adjustable based on the spirits of the present disclosure. For example, the data may also be a mode, a prior information, an expert-defined rule, or the like, or any combination thereof for specific subject. These information may be trained or self-study before or during an image segmentation. However, those variations and modifications do not depart from the scope of the present disclosure.

In step 902, one or more ROIs may be determined by means including an automatic identification, a semi-automatic identification, or a manual marking by user. The automatic identification may refer to an automatic identification of different tissues, organs, normal regions, abnormal regions, or the like, or any combination thereof. The semi-automatic identification may refer to a semi-automatic identification of different tissues, organs, normal regions, abnormal regions, or the like, or any combination thereof. The user may perform one or more operations, in addition to some processing performed automatically by the system, before one or more ROIs are determined. The manual marking may refer to one or more ROIs determined or located by the user based on manual marking.

The coarse segmentation may be performed in step 903. The fine segmentation may be performed in step 904. In some embodiments, the coarse segmentation and the fine segmentation may be performed in a single step. The methods of segmentation may include a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof.

The post-process may be performed in step 905. The post-processing techniques may include a 2D post-processing technique, a 3D post-processing technique and other technique. In some embodiments, the 2D post-processing technique may include a multi-planar reformation (MPR), a curved planar reformation (CPR), a computed volume reconstruction (CVR), a volume rendering (VR), or the like, or any combination thereof. In some embodiments, the 3D post-processing technique may include a 3D surface reconstruction, a 3D volume reconstruction, a volume intensity projection (VIP), a maximum intensity projection (MIP), a minimum intensity projection (Min-IP), an average intensity projection (AIP), an X-ray simulation projection, a volume rendering (VR), or the like, or any combination thereof. The other technique may include a repair process, an image filling process, etc.

For illustration purposes, in some embodiments of the present disclosure, one or more ROIs, wherein a tumor locate, may be detected or recognized in step 902. The detection or the recognition may be based on an automatic identification, a semi-automatic identification, or a manual marking; the coarse segmentation of tumor based on feature classification method may be performed in step 903; the fine segmentation of tumors based on level set method may be performed in step 904; the post-process, which may be performed in step 905, may include the processing of the result of the fine segmentation.

For illustration purposes, in some embodiments of the present disclosure, an ROI wherein a lung locate may be recognized or detected in step 902. The detection or the recognition may be based on an automatic identification, a semi-automatic identification, or a manual marking; the coarse segmentation of lung may be performed in step 903 to acquire one or more target regions, which is/are divided into one or more central regions and one or more boundary regions; the fine segmentation of lung may be performed in step 904, which may make use of one or more classifiers to acquire one or more parting segmentation regions that is/are separated from the boundary region; the post-process, which may be performed in step 905, may include the processing of fusing the result of step 903 and the result of step 904, more specifically, fusing the target region and the parting segmentation region.

It should be noted that the flowchart described above is provided for the purposes of illustration, and not intended to limit the scope of the present disclosure. For persons having ordinary skills in the art, multiple variations and modifications may be reduced under guidance of the present disclosure. Those variations and modifications do not depart from the scope of the present disclosure. For example, step 901, step 902, step 903, step 904 and step 905 may be performed sequentially at an order other than that described above in FIG. 9. Step 901, step 902, step 903, step 904 and step 905 may be performed concurrently or selectively. Step 901, step 902, step 903, step 904 and step 905 may be merged into a single step or divided into a number of steps. In addition, one or more other operations may be performed before/after or in performing step 901, step 902, step 903, step 904 and step 905. Merely by way of example, a pre-process may be performed after step 901 and before step 902; the pre-process may also be performed after step 902 and before step 903.

Figure 10:
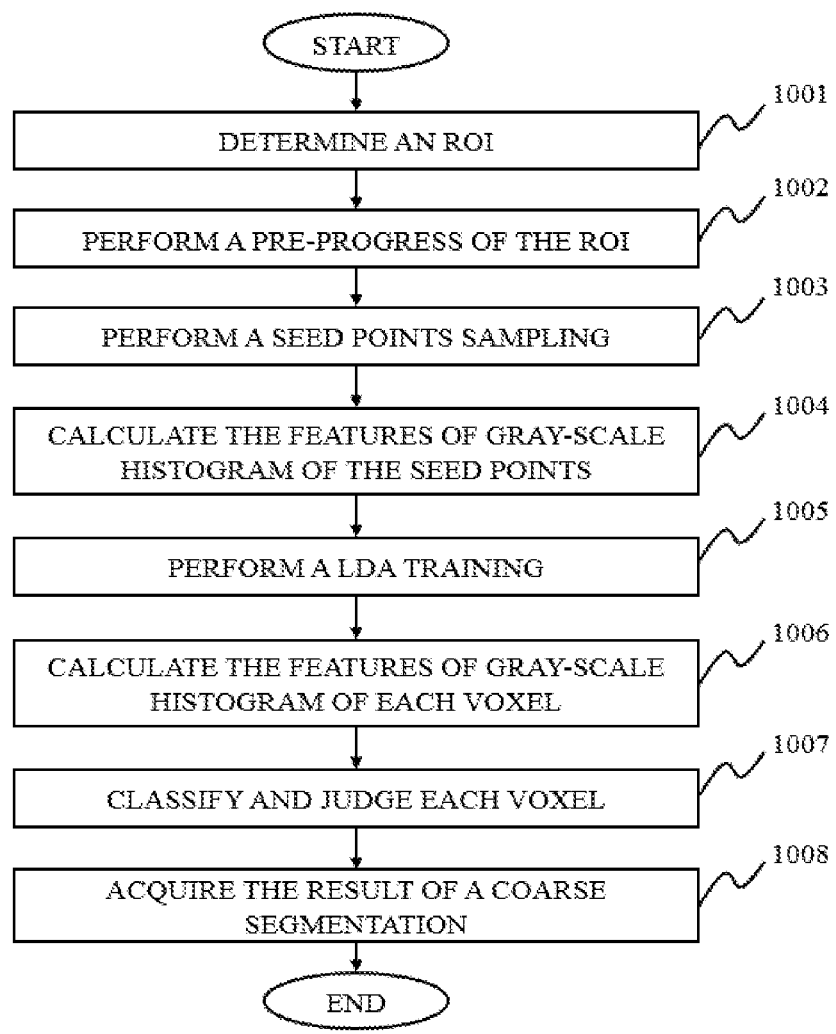
FIG. 10 is a flowchart illustrating a process for coarse segmentation of tumors according to some embodiments of the present disclosure.

FIG. 10 is a flowchart illustrating an exemplary process of a coarse segmentation of tumors according to some embodiments of the present disclosure. In some embodiments of the present disclosure, an ROI wherein a tumor locate may be determined in step 1001. In some embodiments, a number of 2D slices corresponding to a tumor may be acquired, and each 2D slice may indicate a cross section of the tumor. Merely by way of example, a tumor region in which a tumor locate may be recognized by a user in each 2D slice. A line segment of length $d_1$ on a slice of tumor may be drawn by the user, which may traverse the tumor. In some embodiments, the line segment may be drawn on the slice which has a relatively larger cross-section compared with other slices. A line segment may be a part of a line that is bounded by two distinct end points. A cube of edge length $d_2$ ($d_2=d_1 \cdot r$, $1<r<2$), centered at the midpoint of the line segment may be shaped. The region within the cube may be deemed as the ROI, wherein the tumor locate. Merely by way of example, the region wherein the tumor locate may be completely within the ROI, which determined by the cube.

In step 1002, a pre-processing may be performed on the ROI. Merely by way of example, the pre-processing may include resolution normalization in each direction of the image, such as X axis, Y axis and Z axis, enhancing the contrast of the image, as well as reducing the noise of the image, acquiring a new image, etc.

In step 1003, one or more seed points may be sampled. Merely by way of example, one or more positive seed points may be sampled from the ROI. The positive seed points may be sampled randomly among the voxels in ROI determined in step 1002, wherein the tumor locate. The positive seed points may be taken as sampling seed points of target tumor region. One or more negative seed points may be also sampled from ROI. The negative seed points may be sampled randomly among the voxels in ROI determined in step 1002, wherein the tumor do not locate. The negative seed points may be taken as sampling seed points of normal region.

In some embodiments of the present disclosure, given the straight line $d_1$ drawn by the user, an internal region centered at the midpoint of the straight line $d_1$ with a radius of $d_3$ ($d_3=d_1/3$) may be created, m positive seed points may be sampled in the internal region. The positive seed points may be part of the tumor. In some embodiments, $d_3=d_1/l$, l may be an integer greater than 1. In some embodiments, the internal region may be completely restricted in the tumor region.

In some embodiments of the present disclosure, given the straight line d1 drawn by the user, an external region centered at the midpoint of the straight line $d_1$ with a radius ranging from $d_1 \cdot t$ to $d_1 \cdot r$ ($1<t<r$). n negative seed points may be sampled in the external region. The negative seed points may be part of normal tissues surrounding the tumor.

In step 1004, features of gray-scale histogram of the seed points may be calculated. The gray-scale histogram of an image represents the distribution of the pixels in the image over the gray-level scale. The features of gray-scale histogram may be used to training and/or to classifying.

In some embodiments of the present disclosure, the gray-scale of each image corresponded to each seed point may be normalized as a fixed value, denoted by S. Normalized S-dimensional feature of gray-scale histogram in a spherical neighborhood, centered of each seed point with a radius of j, may be calculated. Training and classifying based on S-dimensional feature of gray-scale histogram to acquire parameters of classifier may be performed, acquiring parameters of classifier. Merely by way of example, j may be an integer greater than 1, such as 7.

In step 1005, a linear discriminant analysis (LDA) training may be performed to acquire one or more linear or nonlinear classifiers. The LDA training may be based on the gray-scale histograms of the positive seed points and the negative seed points acquired in the step 1004. Merely by way of example, the linear classifier C may be showed in Equation 6:

$$C = \begin{cases} 1, y > T \\ 0, y < T \end{cases}, y = w_1 \cdot v_1 + w_2 \cdot v_2 + \ldots + w_S \cdot v_S \qquad \text{(Equation 6)}$$

Wherein T is the threshold of classifier, y is the feature of weighted value, $w_1$, $w_2$ ... $w_S$ are weighted values, $v_1$, $v_2$ ... $v_S$ are features of the gray-scale histograms, S may denote the grayscale, T and $w_1$, $w_2$ ... $w_S$ may be generated based on the LDA training.

In step 1006, features of the gray-scale histograms of one or more voxels in the image I may be calculated. In some embodiments, the linear classifier C may be used to traverse every voxel in the image I.

In step 1007, the linear classifier C, which is trained in step 1005, may be used to assess each voxel of the image I to determine whether the voxel is part of tumor or not.

In step 1008, the result of the coarse segmentation may be acquired. Merely by way of example, the result of the coarse segmentation may be shown in Equation 7:

$$\theta_0(x) = \begin{cases} 1, x \in \text{tumor} \\ 0, x \in \text{else} \end{cases} \qquad \text{(Equation 7)}$$

Wherein x may denote one voxel in the image I.

Note that the above exemplary equations for assessment or comparison are merely for illustration and not intended to limit the scope of the present disclosure. Some variations or modifications of the comparison equations may be obvious to persons having ordinary skills in the art.

It should be noted that the flowchart described above is provided for the purposes of illustration, and may not intended to limit the scope the present disclosure. For persons having ordinary skills in the art, a certain amount of variations and modifications may be reduced under guidance of the present disclosure. Those variations do not depart from the scope of the present disclosure. For example, step 1001, step 1002, step 1003, step 1004, step 1005, step 1006, step 1007, and step 1008 may be performed sequentially at an order other than that described in FIG. 10. Step 1001, step 1002, step 1003, step 1004, step 1005, step 1006, step 1007, and step 1008 may be performed concurrently or selectively. Step 1001, step 1002, step 1003, step 1004, step 1005, step 1006, step 1007, and step 1008 may be merged as a single step or divided into a number of steps. Merely by way of example, step 1003 and step 1004 may be merged as a single step. In addition, one or more other operations may be performed before/after or in step 1001, step 1002, step 1003, step 1004, step 1005, step 1006, step 1007, and step 1008.

In some embodiments of the present disclosure, a fine segmentation may be performed after acquiring the result of the coarse segmentation. Merely by way of example, the fine segmentation of the tumor may be performed based on level set method (LSM). LSM utilize dynamic variational boundaries for an image segmentation, embedding active contours into a time-dependent partial differential equations (PDE) function ϕ. It is then possible to approximate the evolution of active contours implicitly by tracking the zero level set Γ(t). The implicit interface Γ may be comprised of a single or a series of zero isocontours. The evolution of ϕ is totally determined by the numerical level set equation, which is shown in Equation 8.

$$\begin{cases} \frac{\partial \phi}{\partial t} + F|\nabla \phi| = 0 \\ \phi(x, t = 0) = \phi_0(x) \end{cases} \qquad \text{(Equation 8)}$$

Wherein $|\nabla \phi|$ denotes the normal direction, $\phi_0(x)$ represents the initial contour and F represents the comprehensive forces, including the internal force from the inter face geometry (e.g., mean curvature, contour length and area) and the external force from image gradient and/or artificial momentums.

The level set function ϕ converts the 2D image segmentation problem in to a 3D problem. There are other constraints for stable level set evolution, too. For instance, the time step and the grid space should comply with the Courant-Friedreichs-Lewy (CFL) condition, and the level set function ϕ should be re-initiated periodically as a signed distance function. In order to overcome these challenges, a fast level set formulation was proposed as shown in Equation 9.

$$\begin{cases} \frac{\partial \phi}{\partial t} = \mu \zeta(\phi) + \xi(g, \phi) \\ \zeta(\phi) = \Delta \phi - div\left(\frac{\nabla \phi}{|\nabla \phi|}\right) \\ \xi(g, \phi) = \lambda \delta(\phi) div\left(g \frac{\nabla \phi}{|\nabla \phi|}\right) + vg\delta(\phi) \end{cases} \qquad \text{(Equation 9)}$$

Wherein ζ(ϕ) is a penalty momentum of ϕ, deviating from the signed distance function, ξ(g, ϕ) incorporates an image gradient information, δ(ϕ) denotes the Dirac function, the constants μ, λ and v control the individual contributions of $f(\phi)$ and ξ(g, ϕ).

The result of the coarse segmentation, shown in Equation 7, may be as initial values of $\phi_0(x)$. The initial contour of $\phi_0(x)$ may be seen as the contour acquired after performing the coarse segmentation of tumor. Then $\phi_0(x)$ may be shown in Equation 10:

$$\phi_0(x) = \begin{cases} +d, \theta_0(x) = 1 \\ -d, \theta_0(x) = 0 \end{cases} \qquad \text{(Equation 10)}$$

Wherein d may denote a predefined distance.

If a voxel is judged as a part of the tumor after the coarse segmentation, the voxel may be located inside of the initial contour, and the initial value of $\phi_0(x)$ may be plus d. If the voxel is judged as a part of the normal tissues after the coarse segmentation, the voxel may be located outside of the initial contour, and the initial value of $\phi_0(x)$ may be minus d. Iterative calculations may be performed based on Equation 11 until the number of iterations K is meet.

$$\phi^{i+1}(x) = \phi^i(x) + \tau[\mu\zeta(\phi^i) + \xi(g,\phi^i)] \qquad \text{(Equation 11)}$$

The result of the fine segmentation based on level set method, more specifically, the final result of the segmentation of the tumor may be shown in Equation 12.

$$\theta_1(x) = \begin{cases} 1, & \phi^K(x) \geq 0 \\ 0, & \phi^K(x) < 0 \end{cases} \quad \text{(Equation 12)}$$

$\phi^K(x)$ may be used to indicate a distance function, when $\phi^K(x)$ is greater than or equal to 0, it may indicate that the voxel x may be located on the contour or inside the contour, the voxel x may be deemed to be a part of the tumor; when $\phi^K(x)$ is smaller than 0, it may indicate that the voxel x may be located outside of the contour, the voxel x may be deemed not to be a part of the tumor.

Note that the above exemplary equations for assessment or comparison are merely for the purposes of illustration and not intended to limit the scope of the present disclosure. Some variations and/or modifications of the comparison equations may be obvious to the persons have ordinary skills in the art.

It should be noted that the segmentation method provided herein may be used for the segmentation of liver tumor. However, for persons having ordinary skills in the art, the segmentation method provided herein may be used for tumors located in other parts of human body. Alternatively, the method provided herein may also be used to segment a tissue or an organ, for example, a spherical tissue. Merely by way of example, the method provided herein may be used for the segmentation of a lung tumor.

It should be noted that the above embodiments are for illustration purposes and not intended to limit the scope of the present disclosure. For persons having ordinary skills in the art, multiple variations and modifications may be made under the teachings of the present disclosure. However, those variations and modifications do not depart from the scope of the present disclosure.

Figure 11:
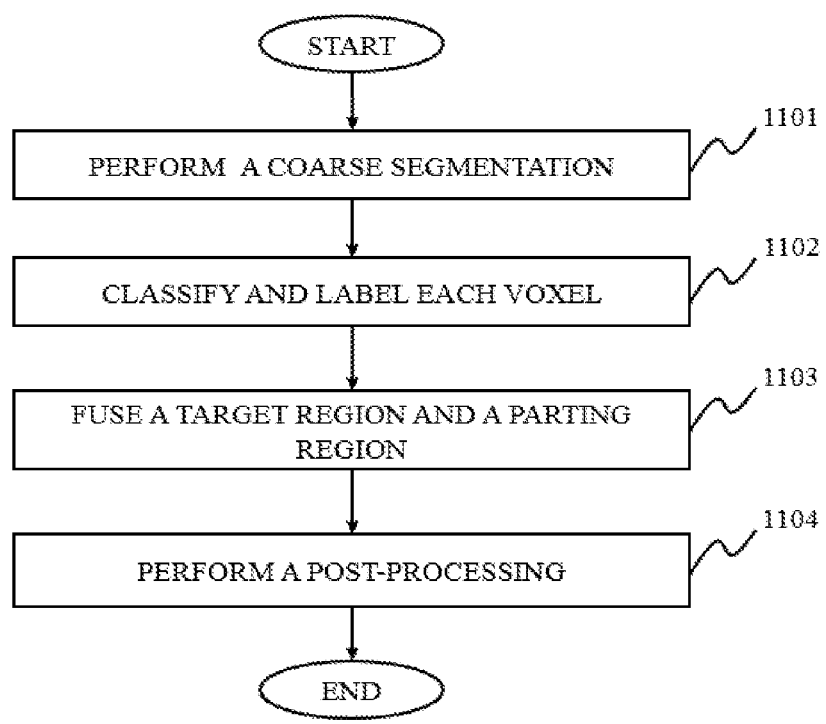
FIG. 11 is a flowchart illustrating a process for lung segmentation according to some embodiments of the present disclosure.

FIG. 11 is a flowchart illustrating an exemplary process of lung segmentation according to some embodiments of the present disclosure. In some embodiments of the present disclosure, a coarse segmentation of lung may be performed in step 1101, a target region may be acquired. The target region may be divided into a central region and a boundary region, which may be surrounding the central region. The voxels in the central region may be identified as part of nodules; the voxels in the boundary region may need to be further identified whether they are parts of nodules. The voxels located outside of the target region may be not identified as part of one or more nodules. Merely by way of example, the shape of the boundary region may be a regular annulus.

In step 1102, each voxel in the boundary region may be classified and labelled by making use of one or more classifiers, acquiring a parting segmentation region, which may be separated from the boundary region.

In step 1103, the central region acquired in step 1101 and the parting segmentation region acquired in step 1102 may be fused together. The segmentation result acquired in step 1103 may be comprised of all of the voxels in the central regions and part of voxels in the boundary region.

Post-processing may be performed in step 1104 to further improve the result acquired in the step 1103. The post-processing may include performing image smoothing. The methods of image smoothing may include a median smoothing, a Gaussian smoothing, a mean smoothing, a normalized smoothing, a bilateral smoothing, smoothing with mathematical morphology or the like, or any combination thereof.

It should be noted that the flowchart described above is provided for the purposes of illustration, and may not intended to limit the scope the present disclosure. For persons having ordinary skills in the art, a certain amount of variations and/or modifications may be reduced under guidance of the present disclosure. Those variations and/or modifications do not depart from the scope of the present disclosure. For example, step 1101, step 1102, step 1103, and step 1104 may be performed sequentially at an order other than that described in FIG. 11. Step 1101, step 1102, step 1103, and step 1104 may be performed concurrently or selectively. Step 1101, step 1102, step 1103, and step 1104 may be merged as a single step or divided into a number of steps. One or more other operations may be performed before/after or in step 1101, step 1102, step 1103, and step 1104. Merely by way of example, pre-process may be performed after step 1101 and before step 1102. In addition, the shape of the boundary region may be an annulus, regular or irregular other shapes, or the like, or any combination thereof. The boundary regions may completely or partially surround the central region.

Figure 12:
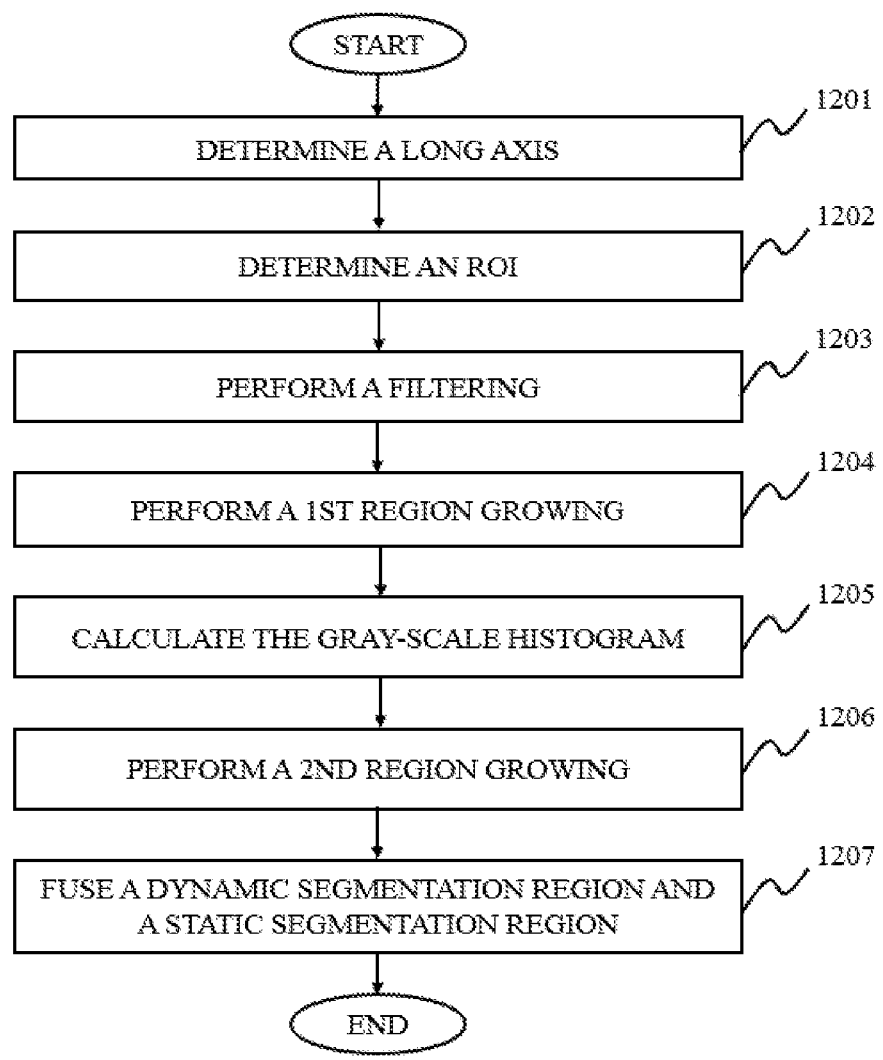
FIG. 12 is a flowchart illustrating a process for coarse segmentation of lung according to some embodiments of the present disclosure.

FIG. 12 is a flowchart illustrating a process of a coarse segmentation of lung according to some embodiments of the present disclosure. In some embodiments of the present disclosure, the coarse segmentation of lung may be performed based on region growing segmentation. In step 1201, a long axis may be determined by a user, which may be on the slice with maximum cross-section of ground-glass nodules (GGN) of the lung image. The long axis may be a straight line segment and traverse abnormal regions as many as possible.

An ROI may be determined based on the long axis in step 1202. Merely by way of example, assuming the length of the long axis is 1, the ROI may be determined by the diagonals of a cube with an edge length of 1.

In step 1203, a filtering may be performed on the ROI, acquiring a filtered image. The filtering may be a mean filtering, a median filtering, or the like, or any combination thereof. Merely by way of example, if a mean filtering is performed, a window, calculated based on the mean filtering and the gray-scale histogram, may be proportional to the length of long axis. The filtering may be automatically adjusted in accordance with the different volume of the nodules.

In step 1204, a first region growing may be performed on the filtered image, acquiring a dynamic segmentation region. Merely by way of example, if the first region growing on the filtered image acquired after mean filtering is performed, the operations of the first region growing based on distance function may be performed as following: the points of long axis determined by the user may be taken as seed points, performing region growing with one or more relatively restrictive initial thresholds; a segmentation region grown based on the mean filtered image may cover at least partial of the long axis, the length of the long axis covered by the segmentation region may be assessed based on the initial thresholds; if the assessment fails, the thresholds may be eased and the assessment may continue: if the assessment succeeds, an expansion operation with restricted thresholds may be performed and a dynamic segmentation region may be acquired.

In step 1205, the gray-scale histogram of the ROI may be calculated, histogram vector image may be acquired.

In step 1206, a second region growing on the histogram vector images may be performed, a static segmentation region may be acquired. Merely by way of example, if the second region growing on the histogram vector image is performed, the operations of the second region growing based on distance function may be performed as following: the points of long axis determined by the user may be taken as seed points, performing region growing with one or more relatively restrictive initial thresholds; a segmentation region grown based on the histogram vector image may cover at least partial of the long axis, the length of the long axis covered by the segmentation region may be assessed based on the initial thresholds; if the assessment fails, the thresholds may be eased and the assessment may continue; if the assessment succeeds, an expansion operation with restricted thresholds may be performed and a static segmentation region may be acquired.

In step 1207, the dynamic segmentation region acquired in step 1204 and the static segmentation region acquired in step 1206 may be fused together, the target region may be acquired. The overlapping region of the dynamic segmentation region with the static segmentation region may be determined as the central region of the target region. The central region may be determined as the nodule region. The region located inside of the dynamic segmentation region but outside of the static segmentation region may be determined as the boundary region, wherein nodules need to be further identified. The region located outside of the dynamic segmentation region may not be determined as the target region.

It should be noted that the above embodiments are for illustration purposes and not intended to limit the scope of the present disclosure. For persons having ordinary skills in the art, a certain amount of variations and/or modifications may be reduced under guidance of the present disclosure. Those variations and/or modifications do not depart from the scope of the present disclosure. For example, the coarse segmentation of lung may be based on a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In addition, step 1201, step 1202, step 1203, step 1204, step 1205, step 1206 and step 1207 may be performed sequentially at an order other than that described above in FIG. 12. Step 1201, step 1202, step 1203, step 1204, step 1205, step 1206 and step 1207 may be performed concurrently or selectively. Step 1201, step 1202, step 1203, step 1204, step 1205, step 1206 and step 1207 may be merged as a single step or divided into a number of steps. One or more other operations may be performed before/after or in performing step 1201, step 1202, step 1203, step 1204, step 1205, step 1206 and step 1207. Merely by way of example, a pre-process may be performed after the step 1201 and before the step 1202.

Figure 13:
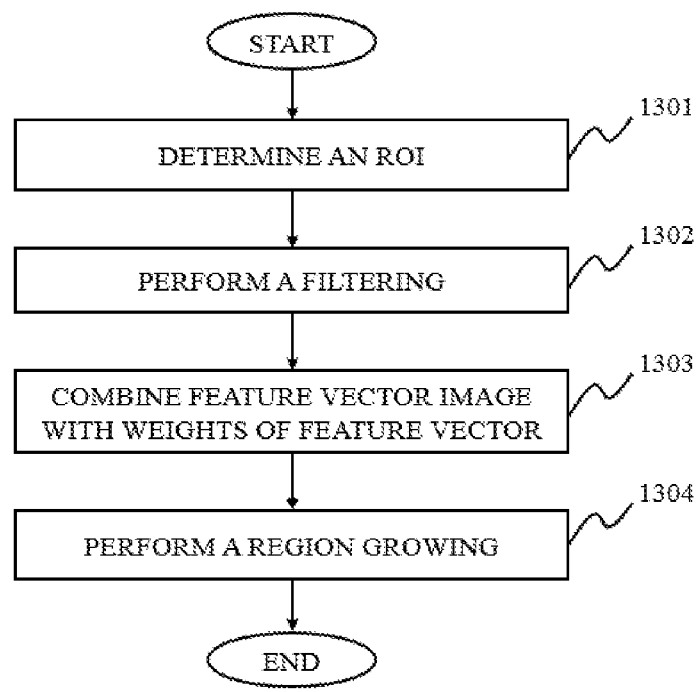
FIG. 13 is a flowchart illustrating a process for fine segmentation of a lung image according to some embodiments of the present disclosure.

FIG. 13 is a flowchart illustrating a process of a fine segmentation of lung according to some embodiments of the present disclosure. In some embodiments of the present disclosure, the fine segmentation of lung may be performed by making use of one or more classifiers to classify and label each voxel in the boundary regions. An ROI may be determined in step 1301. In some embodiments, the ROI may have been determined in the processing of the coarse segmentation that is described elsewhere in the present disclosure, or be determined again.

In step 1302, filtering may be performed to the images in the ROI, a feature vector image may be acquired. The window of the filter may be proportional to the length of the long axis. The filtering may include Butterworth filter, gradient filter, Gabor filter, Volterra filter, Hessian filter, Chebyshev filter, Bessel filter, Elliptic filter, Constant k filter, m-derived filter, filter based on histogram, or the like, or any combination thereof.

In step 1303, the feature vector image may be combined with the weights of the feature vector, which may have been trained offline, a LDA probability field image may be acquired.

In step 1304, a region growing on the LDA probability field image may be performed, acquiring a parting segmentation region with labels of classifiers. Merely by way of example, the region growing may be based on the LDA probability field, which may be performed as following: the points of long axis determined by the user may be taken as seed points, performing region growing with one or more relatively restrictive initial thresholds; a segmentation region grown based on the LDA probability field image may cover at least partial of the long axis, the length of the long axis covered by the segmentation region may be assessed based on the initial thresholds; if the assessment fails, the thresholds may be eased and the assessment may continue; if the assessment succeeds, an expansion operation with restricted thresholds may be performed and a segmentation region with the labels of the classifier may be acquired.

It should be noted that the above embodiments are for illustration purposes and not intended to limit the scope of the present disclosure. For persons having ordinary skills in the art, a certain amount of variations and/or modifications may be reduced under guidance of the present disclosure. Those variations and/or modifications do not depart from the scope of the present disclosure. For example, step 1301, step 1302, step 1303 and step 1304 may be performed sequentially at an order other than that described above in connection with FIG. 13. Step 1301, step 1302, step 1303 and step 1304 may be performed concurrently or selectively. Step 1301, step 1302, step 1303 and step 1304 may be merged as a single step or divided into a number of steps. One or more other operations may be performed before/after or in step 1301, step 1302, step 1303 and step 1304. Merely by way of example, the parting segmentation regions acquired in step 1304 may be fused together with the target region, which may be part of process of the fine segmentation of lung.

Figure 14:
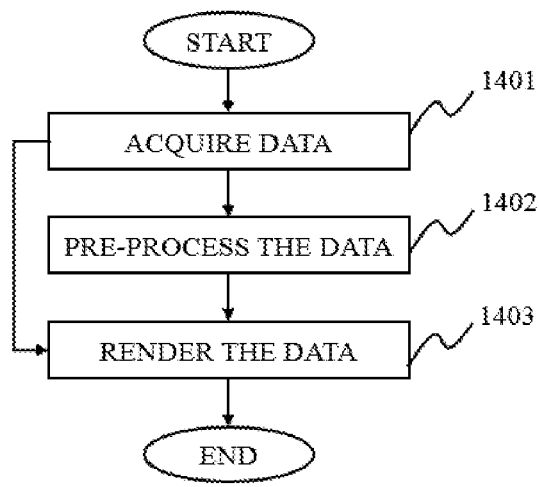
FIG. 14 is a flowchart illustrating a method for image processing according to some embodiments of the present disclosure.

FIG. 14 illustrates a flowchart of an image processing method according to some embodiments of the present disclosure. As illustrated in FIG. 14, the processing method may include an acquisition process 1401, a pre-processing process 1402, and a rendering process 1403. In some embodiments of the present disclosure, one or more steps may be omitted. In some other embodiments, one or more steps may be executed repeatedly.

In step 1401, the image data may be acquired from the input/output unit 201 as described elsewhere in the present disclosure. In some embodiments, the data may be an image data, an image mask, a parameter data, or the like, or any combination thereof. In some embodiments, the image data may be an initial image data or an image data after treatment. Merely by way of example, the treatment may be an image segmentation. The image may be a 2D one or a 3D one. The image may be acquired from any medical imaging system as described elsewhere in the present disclosure. In some embodiments, the image mask may be a binary mask to shade a specific area of an image needed to be processed. The image mask may be used to supply a screen, extract an area of interest, and/or make a specific image. In some embodiments, the parameter may be some information input by a user or an external source. For example, the parameter may include a threshold, a CT value, a region of interest, a number of iteration times, a seed point, an equation, an algorithm, an instruction, or the like, or any combination thereof.

In step 1402, the image data may be pre-processed before rendering in some embodiments. The pre-processing step 1402 may include a segmentation, a storage, a processing after segmentation, or the like, or any combination thereof. In some embodiments, the method of a segmentation may include a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the segmentation method may be performed in a manual type, a semi-automatic type or an automatic type. In some embodiments, different components may be stored in different storage modules, and then be rendered. The storage module may include a CPU memory, a GPU video memory, a RAM, a ROM, a hardware, a software, a tape, a CD, a DVD, or the like, or any combination thereof. Merely by way for example, the processing after segmentation may include generating a boundary data of the segmentation information. In some embodiments, the pre-processing step 1402 may be not necessary, the rendering step 1403 may be executed after the acquiring step 1401 directly.

In step 1403, the image date after pre-processing may be rendered. In some embodiments of the present disclosure, the rendering strategy may include a direct volume rendering, a volume intensity projection (VIP), a maximum intensity projection (MIP), a minimum intensity projection (Min-IP), a hardware-accelerated volume rendering, an average intensity projection (AIP), or the like, or any combination thereof.

It should be noted that the above description about the image processing method is merely an example according to some embodiments of the present disclosure. Obviously, to those skilled in the art, after understanding the basic principles of the image processing method, the form and details of the image processing method may be modified or varied without departing from the principles of the present disclosure. For example, the image data acquired in step 1401 may be three-dimensional data, two-dimensional data, one-dimensional data, or the like, or any combination thereof. For another example, the pre-processing step 1402 may include any processing method to improve the image. For still another example, different components or tissues may be rendered according to different specific implementation scenarios. The modifications and variations are still within the scope of the present disclosure described above.

Figure 15:
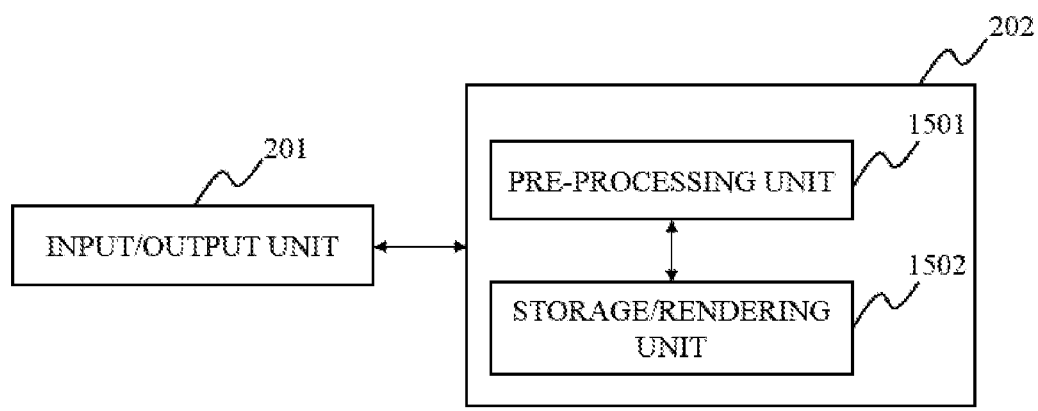
FIG. 15 is a block diagram depicting an image processing system according to some embodiments of the present disclosure.

FIG. 15 illustrates an image processing system according to some embodiments of the present disclosure. The image processing system 202 may include a pre-process unit 1501, and a storage/rendering unit 1502 In some other embodiments, the image processing system 202 may be also integrated, connected or coupled to an input/output unit 201, a data processing system 202.

The input/output unit 201 may be configured to input an image data, input a user instruction, output an image and/or data, display an image, or the like, or any combination thereof. In some embodiments, the input/output unit 201 may include a data acquisition module, a display module, a user input module, or the like, or any combination thereof. Merely by way for example, the input/output unit 201 may include a mouse, a keyboard, a stylus, a touch screen, a sensor, an interface, a microphone, a wireless communication, a cloud, or the like which may detect input, or any combination thereof.

The pre-process unit 1501 may be configured to pre-process the image data before rendering. In some embodiments of the present disclosure, the pre-process unit 1501 may be a segmentation module, a control module, a storage module, or the like, or any combination thereof.

The storage/rendering unit 1502 may be configured to render and/or store the image data. In some embodiments, the storage/rendering unit 1502 may further include a rendering module, a storage module. Mere way for example, the rendering module and the storage module may be a same module to execute rendering and storage simultaneously. The same module may include a Central Processing Unit (CPU), a Graphics Processing Unit (GPU), an Application-Specific Integrated Circuit (ASIC), an Application-Specific Instruction-Set Processor (ASIP), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

It should be noted that the above description about the image processing system is merely an example according to some embodiments of the present disclosure. Obviously, to those skilled in the art, after understanding the basic principles of image processing system, the form and details of the image processing system may be modified or varied without departing from the principles of the present disclosure. For example, the input/output unit 201 may be any input and/or output systems such as an image detector. For another example, the input/output unit 201 may be omitted for a data processing system. For still another example, the rendering module and the storage module may be the same module or may also be two different ones. The modifications and variations are still within the scope of the present disclosure described above.

Figure 16:
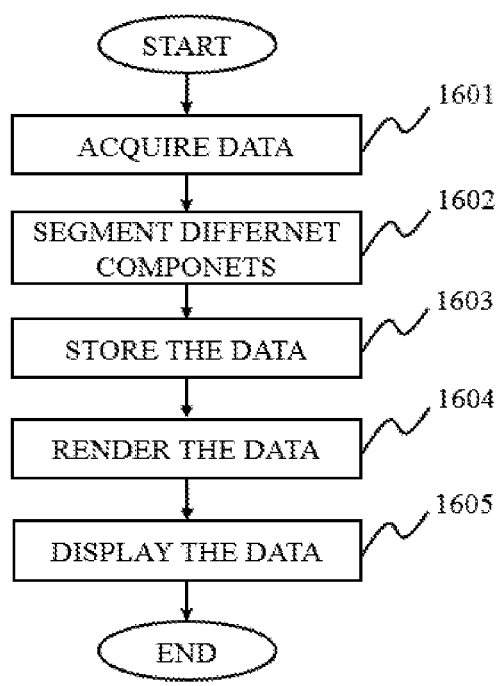
FIG. 16 is a flowchart illustrating a method for image processing according to some embodiments of the present disclosure.

FIG. 16 illustrates a flowchart of an image processing method according to some embodiments of the present disclosure. FIG. 16 is an exemplary embodiment to illustrate the FIG. 14. As shown in FIG. 16, the image processing method may include an acquisition process 1601, a segmentation process 1602, a storage process 1603, a rendering process 1604, and a display process 1605.

In step 1601, data may be acquired. In some embodiments, the data may be information including data, a number, a text, an image, a voice, a force, a model, an algorithm, a software, a program, or the like, or any combination thereof. Merely by way for example, the data acquired in step 1601 may include a data set of a three-dimensional image. The data set of the three-dimensional image may include a voxel. The voxel herein may be the smallest distinguishable unit in the three-dimensional segmentation.

In step 1602, different components may be performed by an identification (include a segmentation) in the data set. In some embodiments, a target region may be determined during an interaction with a user. The target region may be determined by an input information from the user and may also be determined by a given region of the user. In some embodiments of the step 1602, the input information of the user may be imported through an input/output unit. The input/output unit may be a peripheral device including a mouse, a pen, a keyboard, a stylus, a touch screen, a sensor, an interface, a microphone, a wireless communication, a cloud, or the like which may detect input, or any combination thereof. Merely by way for example, the user may depict a boundary of the target region on a display by a mouse or a pen. The target region may be a removable target region, a reserved target region, or their combination.

In some embodiments, a corresponding loading content may be selected according to a demand of a user or a type of an executing task. The executing task may be the removable region, the reserved region, or the like, or any combination thereof. For better understanding the present disclosure, a medical visual field is described as an example of the image processing method. The three-dimensional data set may be a medical scanning data of a subject acquired from any medical imaging system as described elsewhere in the present disclosure. Usually, a portion of air may occupy more than one half of the whole data when executing the Direct Volume Rendering task. In practical applications, the air portion may be removed by means of segmentation step since it is not cared in some embodiments. In some embodiments, the different components in the data set may be identified according to a practical application demand in the VR task. The data set may be divided into an air portion and a non-air portion. The air portion may be regarded as a removable region, the non-air portion may be regarded as a reserved region.

It should be noted that the different components in the data set may not be identified in some embodiments. For example, when executing a Multiple Planar Reconstruction (MPR) task or a Curved Planar Reconstruction (CPR) task, the air portion information may be used to perform an auxiliary diagnosis. The air portion herein may be not removed.

It should be noted that the above description about the segmentation step is merely an example according to some embodiments of the present disclosure. Obviously, to those skilled in the art, after understanding the basic principles of the image processing method, the form and details of the segmentation method may be modified or varied without departing from the principles of the present disclosure. For example, the two embodiments described above may be used in combination. The different three-dimensional rendering task may be distributed to different hardware according to the characteristics of task and the demands of the user. For another example, the air portion and non-air portion described above may be merely an example in the medical visual field. The different components may be other subject including a substance, a tissue, an organ, an object, a specimen, a body, or the like, or any combination thereof. The subjects may be identified and then rendered to reduce resource cost of hardware in the system. The modifications and variations are still within the scope of the present disclosure described above.

In some embodiments, the identification of the different components in the data set may include an identification of information from a voxel. The information may be a one dimensional characteristic, a multi-dimensional characteristic, or the combination thereof. In some embodiments, the characteristic information may be gray level, mean gray level, intensity, texture, color, contrast, brightness, spatial property, or the like, or any combination thereof. In some embodiments, the information may further include a toleration range. The voxels from different components may present a different one dimensional and/or a three-dimensional characteristic. Thus the different components may be segmented or identified by judging whether the feature information is within the range of the same toleration range. Merely by way for example, the toleration range may be a threshold. The voxels whose one dimensional and/or multi-dimensional characteristic within the threshold may be regarded as a same component.

In some embodiments, the identification method may be a segmentation including, e.g., a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the segmentation method may be performed in a manual type, a semi-automatic type or an automatic type as described elsewhere in the present disclosure.

In some embodiments, the three-dimensional image data after the identification may be managed by a corresponding space management algorithm. For example, the image data may be stored through a data structure including an array, a record, a union, a set, a graph, a tree, a class, or the like, or any combination thereof. In some embodiments of the tree data structure, the space management algorithm may include an Octree technology, a K-Dimensional (KD) tree, a Binary Space Partition (BSP) tree, or the like, or any combination thereof.

It should be noted that the above description about the identification method is merely an example according to some embodiments of the present disclosure. Obviously, to those skilled in the art, after understanding the basic principles of the segmentation or identification, the form and details of the segmentation or identification method may be modified or varied without departing from the principles of the present disclosure. For example, the method of identification or data management may be varied but not limited here. The modifications and variations are still within the scope of the present disclosure described above.

In step 1603 illustrated in FIG. 16, the different components of the subject may be stored in different storage modules. In some embodiments, the storage module may include an external storage or an internal storage. In some embodiments, the external storage may include a magnetic storage, an optical storage, a solid state storage, a smart cloud storage, a hard disk, a soft disk, or the like, or any combination thereof. The magnetic storage may be a cassette tape, a floppy disk, etc. The optical storage may be a CD, a DVD, etc. The solid state storage may be a flash memory including a memory card, a memory stick, etc. In some embodiments, the internal storage may be a core memory including a Central Processing Unit (CPU), a Graphics Processing Unit (GPU), a Random Access Memory (RAM), a Read Only Memory (ROM), a Complementary Metal Oxide Semiconductor Memory (CMOS), or the like, or any combination thereof. For better understanding the present disclosure, a CPU memory and a GPU video memory are described as an example. In some embodiments, the whole volume data of the three-dimensional data set may be stored in the CPU memory and the non-air portion may be stored in the GPU video memory.

It should be noted that the above description about the storage method is merely an example according to some embodiments of the present disclosure. Obviously, to those skilled in the art, after understanding the basic principles of the storage, the form and details of the storage method may be modified or varied without departing from the principles of the present disclosure. For example, the whole volume data and the non-air portion may be stored in a same storage module, such as a CPU memory, a GPU video memory, or the like. For another example, the type of storage modules may be changed to any storage as described elsewhere in the present disclosure. The modifications and variations are still within the scope of the present disclosure described above.

In the step 1604 illustrated in FIG. 16, the data in the storage modules may be rendered by a corresponding data processor after receiving an rendering instruction. For illustration purposes, a CPU memory and a GPU video memory may be described in detail. In some embodiments, the image data stored in a memory may be loaded and/or processed by the CPU and the image data stored in a video memory may be loaded and/or processed by the GPU. The GPU may be configured to perform a computing in a VR task to improve the execution efficiency. The CPU may be configured to perform a MPR task or a CPR task for the giant amount of data in the air auxiliary diagnosis.

In some embodiments, the rendering task of the CPU and the GPU may be separated and executed in different control threads in order to balance the load of rendering task and optimize the performance of system. The control threads may be established corresponding to a CPU task queue and a GPU task queue, respectively. The rendering task may be distributed to the CPU task queue or a GPU task queue to execute according to an instruction from the user. In some embodiments, the rendering task of the CPU and the GPU may share a same control thread.

In some embodiments, when executing the VR task, the GPU may execute a complex calculation. At the same time, the resources occupancy rate of the CPU may be low enough to execute a request of multi-user and multi-task simultaneously. When executing the MPR or the CPR task, in order to ensure the execution efficiency and cache consistency, several tasks may be executed in sequence on the premise of limiting the occupancy rate of the CPU. The CPU may support a request of other task at the same time.

It should be noted that the above description about the rendering method is merely an example according to some embodiments of the present disclosure. Obviously, to those skilled in the art, after understanding the basic principles of the rendering, the form and details of the rendering method may be modified or varied without departing from the principles of the present disclosure. In some embodiments, the image rendering task may be executed in some other hardware but not limited the CPU and the GPU. For example, it may be an ASIC, an ASIP, a PPU, a DSP, or the like, or any combination thereof. The modifications and variations are still within the scope of the present disclosure described above.

In step 1605, the data after rendering may be displayed. In some embodiments, a rendering result may be collected and/or transmitted through a unified criterion. For example, the rendering result may be collected through a unified framework and the rendering result may be transmitted to an interface through a unified port. The interface herein may be any displayable device but not limited here. In some embodiments, the rendering result may be collected and/or transmitted through a diverse criterion.

It should be noted that the above description about the data processing method is merely an example according to some embodiments of the present disclosure. Obviously, to those skilled in the art, after understanding the basic principles of the data processing method, the form and details of the data processing method may be modified or varied without departing from the principles of the present disclosure. For example, the image data after identification may be rendered immediately without saving in a storage. For another example, the storage and processor may be the same apparatus and may also be two different apparatuses. For still another example, the image processing method may be modified such as adding a pre-processing step before the identification, adding a post-processing step after the rendering task. The modifications and variations are still within the scope of the present disclosure described above.

For better understanding the present disclosure, some embodiments of an identification may be described in detail below. It should be noted that these embodiments are not intended to limit the scope of the present disclosure. As described elsewhere in the present disclosure, the information for identification may be a one dimensional characteristic, a multi-dimensional characteristic, or the combination thereof. In some embodiments, the characteristic information may be gray level, mean gray level, intensity, texture, color, contrast, brightness, spatial property, or the like, or any combination thereof.

Figure 17:
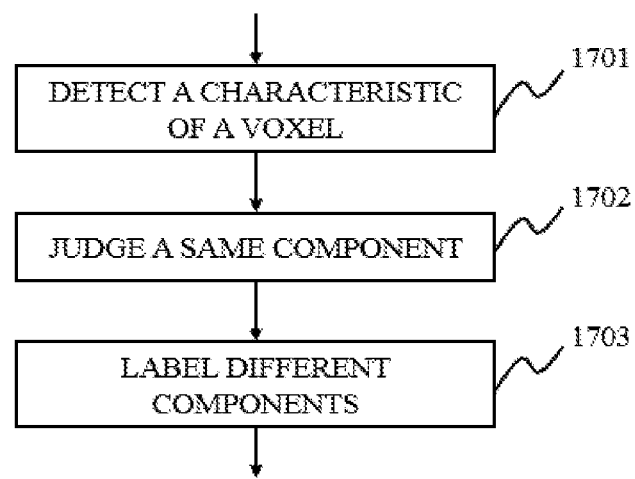
FIG. 17 is a flowchart illustrating an image identification method according to some embodiments of the present disclosure.

FIG. 17 illustrates an image identification method according to some embodiments of the present disclosure. As shown in FIG. 17, an identification process 1602 may further include a characteristic detecting process 1701, a judgment process 1702, and a labeling process 1703. In some embodiments, one or more steps may be omitted or exchanged. In some other embodiments, one or more steps may be executed repeatedly.

In step 1701, a characteristic of a voxel may be detected. For illustration purposes, the characteristic information FIG. 17 may be one dimensional characteristic, e.g., gray level, mean gray level, intensity, texture, color, contrast, brightness, spatial property, or the like, or any combination thereof. For example, the one dimensional characteristic in FIG. 17 is color and spatial property of a voxel. In some embodiments, the color may further be a gray value and the spatial property may further be an arrangement order of the voxel or a position of the voxel in the three dimensional space.

In step 1702, a same component may be judged. In some embodiments, a tolerance range may be set. The tolerance range may be corresponding to the difference of a color value or a position of the voxel. For example, the voxels with an adjacent position and have a color value below the tolerance range may be regarded as belonging to a same component. The voxels with a great difference of color value or a great distance in position which beyond the tolerance range may be more likely to be judged as different tissues. So the data in the three-dimensional image may be identified according to comprehensive comparison of the arrangement orders and color values of the voxels.

In step 1703, the different components may be labeled respectively. In some embodiments of the present disclosure, a same label may be marked on the voxels with adjacent arrangement and color values within a preset tolerance range.

It should be noted that the above description about the FIG. 17 is merely an example according to some embodiments of the present disclosure. Obviously, to those skilled in the art, after understanding the basic principles of the segmentation or identification, the form and details of the segmentation or identification method may be modified or varied without departing from the principles of the present disclosure. For example, the different components may be judged according to other characteristics including gray level, mean gray level, intensity, texture, contrast, brightness, or the like, or any combination thereof. For another example, the identification may be a complex image segmentation as described elsewhere in the present disclosure. The modifications and variations are still within the scope of the present disclosure described above.

In some embodiments of the present disclosure, the different components in the data set may be identified according to a multi-dimensional characteristic information. The multi-dimensional feature information may include providing a pre-determined neighbor region. A voxel and the voxels within the neighbor region may be performed by a statistics to acquire a multi-dimensional characteristic in the statistics.

In some embodiments, the statistics may be based on calculating an information entropy of each voxel. The information entropy may reflect a comprehensive characteristics of a gray information distribution within a certain region near the voxel in a statistical significance. A threshold may be set to compare the difference of the information entropy between the voxel and the voxel near a certain region. If the difference of information entropy is less than the pre-determined threshold, the gray value distributions from different voxels may be considered to be consistent with each other and the two voxels may be regarded as belonging to a same component. On the contrary, the gray value distribution may be considered to be inconsistent if the information entropy difference exceed the preset threshold and the two voxels may be regarded as belonging to different components.

In some embodiments, the statistics may be based on a Gaussian mixture model. The feature of each voxel in the three-dimensional data set may be characterized by using several Gaussian models. In some embodiments, all the voxels in a same region may be fitted by several Gaussian models and their corresponding Gaussian parameters may be acquired. The number of the Gaussian models may be determined according to the characteristic information of the voxel. The Gaussian parameters may include an expectation, a variance, or their combination. In some embodiments, the Gaussian parameters of different voxels may be compared. The voxels whose Gaussian parameters are in a same range may be considered to be a same component.

In some embodiments, the statistics may be based on a feature detection algorithm. For better understanding the present disclosure, a Scale-Invariant Feature Transform (SIFT) is described as an example. The voxels within a same region may be calculated by Gaussian mixture model under different resolutions to acquire a vector set. The voxels may be compared to judge whether they belong to a same component. The embodiments may also be used to some complex scenarios such as identifying some tissues with similar gray values (e.g., a lung and a heart) or some tissues coupled to each other while has different functions (e.g., a liver, a pancreas and a gallbladder). In some embodiments, the statistics may be based on speeded up robust features (SURF), principal components analysis speeded up robust features (PCA-SURF) gradient location and orientation histogram (GLOH), histogram of oriented gradients (HOG), or the like, or any combination thereof.

Figure 18:
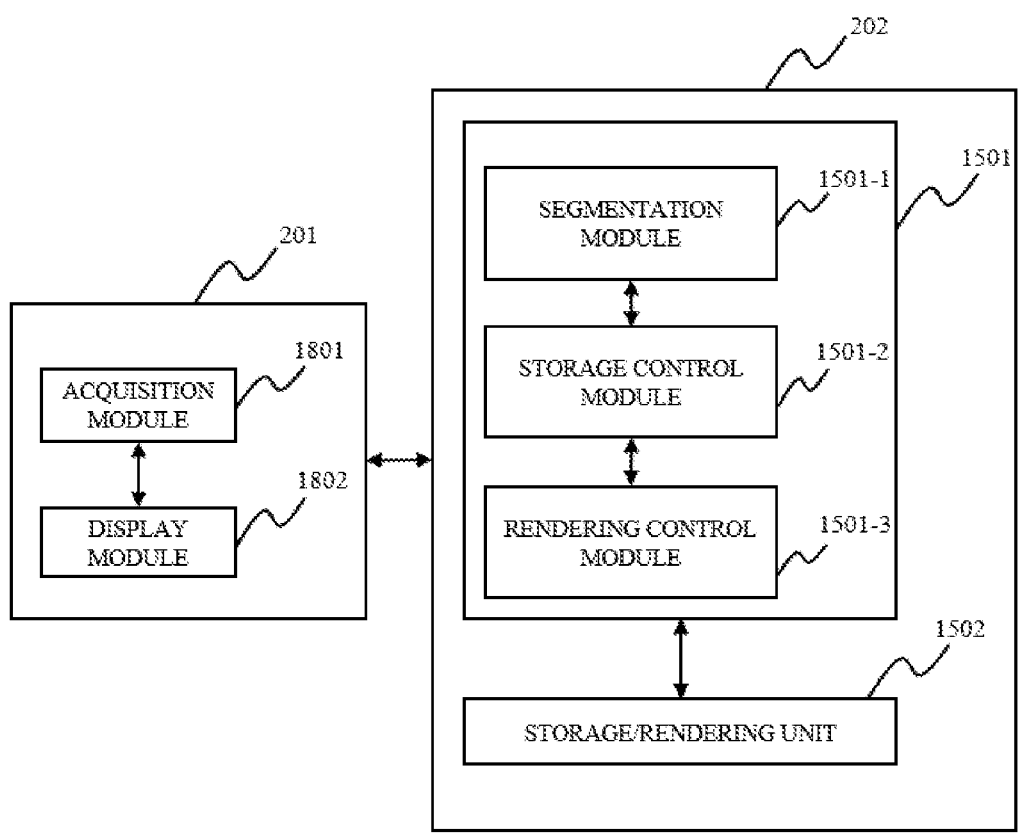
FIG. 18 is a block diagram depicting an image processing system according to some embodiments of the present disclosure.

FIG. 18 illustrates an image processing system according to some embodiments of the present disclosure. FIG. 18 may be seen as an embodiment of the FIG. 15. The image processing system 202 may include a pre-process unit 1501, a storage/rendering unit 1502. The input/output unit 201 may be configured to input image data, input user instructions, output image and/or data, display image, or the like, or any combination thereof. In some embodiments, the input/output unit 201 may include an acquisition module 1801, a display module 1802, etc. The pre-process unit 1501 may be configured to pre-process the image data. In some embodiments, the pre-process unit 1501 may include a segmentation module 1501-1, a storage control module 1501-2, a rendering control module 1501-3, or the like, or any combination thereof. The segmentation module 1501 may be configured to perform an identification on the image data. The storage/rendering unit 1502 may be configured to render and/or store the image data. In some embodiments, the storage/rendering unit 1502 may include a rendering module, a storage module, etc. Mere way for example, the rendering module and the storage module may be an integrated module to execute both rendering and storage. The integrated module may include a CPU, a GPU, or other image processors, or any combination thereof.

In some embodiments, the acquisition module 1801 may be configured to acquire data. The data herein may include a data set, a user instruction, or the like, or any combination thereof. The data set of three-dimensional images may be medical scanning data of a subject as described elsewhere in the present disclosure. The data set herein may include a voxel. The voxel may be the smallest distinguishable unit in the three-dimensional segmentation. The user instruction may include an instruction of rendering, an instruction of control, an instruction of acquisition, an instruction of display, or the like, or any combination thereof. In some embodiments, the display module 1802 may be configured to display the data. The data herein may include data after rendering, data after storage, data after segmentation, data after acquisition, or the like, or any combination thereof. In some embodiments, the segmentation module 1501-1 may be configured to segment or identify different components in the data set. The different components may include a removable region, a reserved region, or other portion, or the combination thereof according to user demands. In some embodiments, the storage control module 1501-2 may be configured to control data of different components to store in different storage modules. In some embodiments, the rendering control module 1501-3 may be configured to control the rendering after receiving a rendering instruction. The rendering instruction may include rendering the data in corresponding storage modules. In some embodiments, the storage/rendering unit 1502 may be configured to store the data, or render the data, or their combination.

It should be noted that the above description about the image processing system is merely an example according to some embodiments of the present disclosure. Obviously, to those skilled in the art, after understanding the basic principles of the image processing system, the form and details of the image processing system may be modified or varied without departing from the principles of the present disclosure. For example, the display module 1802 may be not necessary in some embodiments of the present disclosure. For another example, the control modules of storage/the control modules of rendering may be not necessary in some embodiments of the present disclosure. The modifications and variations are still within the scope of the present disclosure described above.

Figure 19:
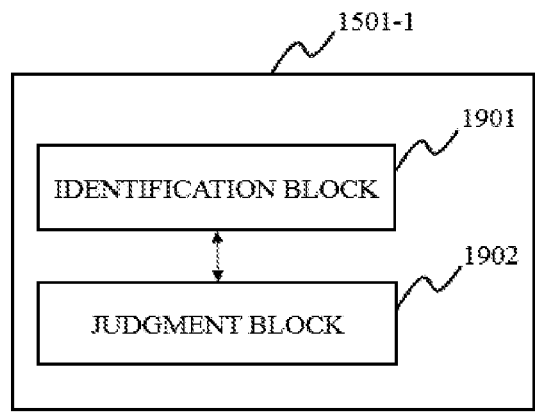
FIG. 19 is a block diagram depicting a segmentation module according to some embodiments of the present disclosure.

In some embodiments, as shown in FIG. 19, the segmentation module 1501-1 may further include an identification block 1901 and a judgment block 1902. In some embodiments, the identification block 1901 may be configured to identify a characteristic information of voxel including a one dimensional characteristic, a multi-dimensional characteristic, or their combination. In some embodiments, the judgment block 1902 may be configured to provide a threshold and judge the characteristic information of the voxels.

Figure 20:
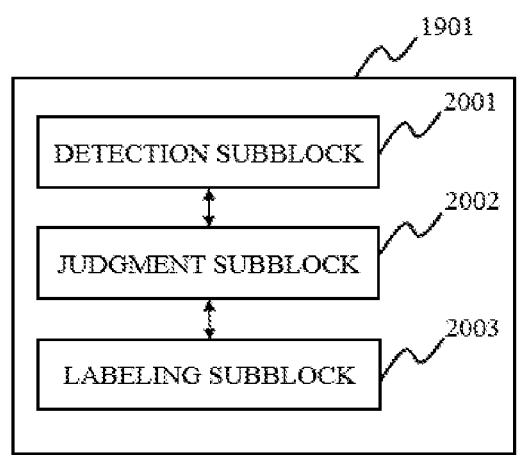
FIG. 20 is a block diagram depicting an identification block according to some embodiments of the present disclosure.

For better understanding the present disclosure, the identification of one dimensional feature information is described as an example of the segmentation module 1501-1. In some embodiments, as shown in FIG. 20, the identification block 1901 may include a detection sub-block 2001, a judgment sub-block 2002, a labeling sub-block 2003. In some embodiments of the identification block 1901, the detection sub-block 2001 may be configured to detect the arrangement order and the color value of the voxels in the data set. In some embodiments, the judgment sub-block 2002 may be configured to judge the voxels of adjacent arrangement and the color value difference within a preset threshold as a same component. In some embodiments, the labeling sub-block 2003 may be configured to label different components respectively.

In some embodiments, the identification module 1901 may further include an acquisition block. The acquisition block may be configured to acquire the multi-dimensional feature information. In some embodiments, the acquisition block may be configured to provide a neighbor region and acquire the multi-dimensional feature information according to statistics based on voxels and voxels within the range of neighborhood region. The statistics herein may include a statistics method based on a Gaussian mixture model, a statistics based on information entropy of the voxel, a statistics method based on time-invariant space-state feature model, or the like, or any combination thereof. The weight in the combination of each statistics method may be varied according to different demands in the combination use in some embodiments of the present disclosure.

In some embodiments, the storage control module 1501-2 may include a first storage control block and a second storage control block. The first storage control block may be configured to load the data set of a three-dimensional image into a CPU memory. The second storage control block may be configured to load the reserved region of the three-dimensional image into a GPU video memory.

In some embodiments, storage/rendering unit 1502 may include a CPU memory, a GPU video memory, a RAM, a ROM, a hardware, a software, a tape, a CD, a DVD, an Application-Specific Integrated Circuit (ASIC), an Application-Specific Instruction-Set Processor (ASIP), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

Figure 21:
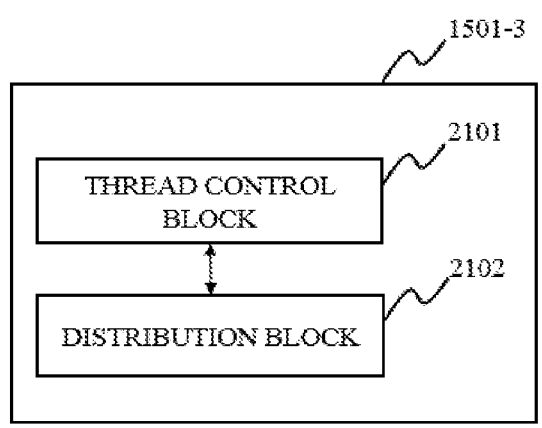
FIG. 21 is a block diagram depicting a rendering control module according to some embodiments of the present disclosure.

As shown in FIG. 21, in some embodiments, the rendering control module 1501-3 may include a thread control block 2101, and a distribution block 2102. The thread control block 2101 may be configured to establish a thread corresponding to the task queue of the CPU and the GPU, respectively. The distribution block 2102 may be configured to analyze a rendering instruction of the user and distribute the rendering task to the task queue of the CPU or the GPU which execute image rendering.

It should be noted that the above description about the image processing system is merely an example according to some embodiments of the present disclosure. Obviously, to those skilled in the art, after understanding the basic principles of the image processing system, the form and details of the image processing system may be modified or varied without departing from the principles of the present disclosure. For example, all or parts of the steps described above may be finished by related hardware controlled by programs. The programs may be stored in any readable storage medium, such as RAM, ROM, disk, CD, or the like, or any combination thereof. For another example, one or more sub-block/block/module/unit may be omitted. The modifications and variations are still within the scope of the present disclosure described above.

Figure 22:
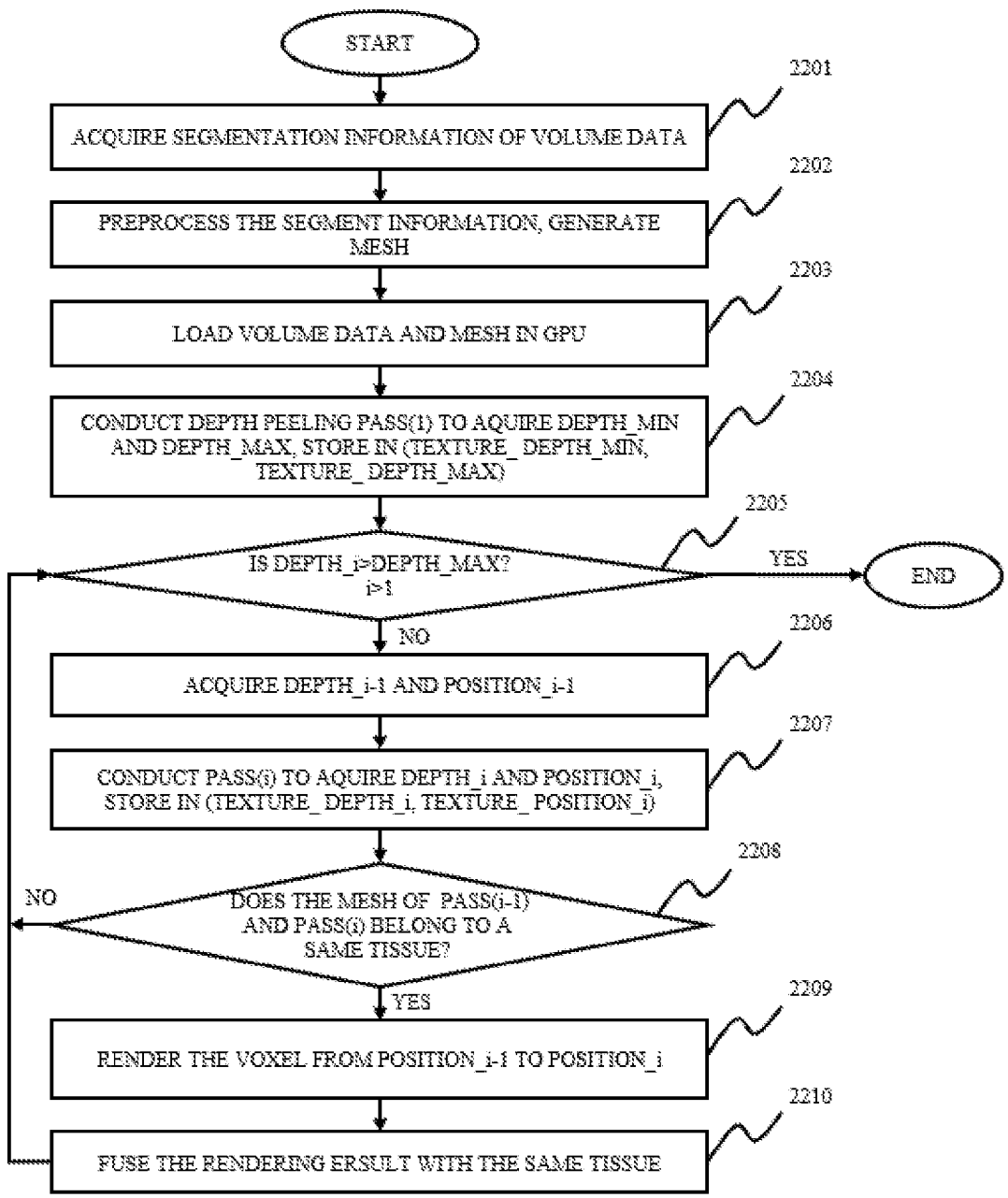
FIG. 22 is a flowchart illustrating a method for image processing according to some embodiments of the present disclosure.

FIG. 22 illustrates a flowchart of an image processing method according to some embodiments of the present disclosure. The image processing method may include acquiring a segmentation information of volume data process, preprocessing the segmentation information, generating mesh data of each organs' boundary information process, loading the mesh data and the volume data in a GPU process, and iterative rendering process.

In step 2201, a segmentation information of a volume data may be acquired. In some embodiments, the acquisition of the segmentation information may include segmenting the volume data into several human tissues and choosing a corresponding rendering strategy based on the segmentation information of different tissues. In some embodiments, the method of a segmentation may include a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the segmentation method may be performed in a manual type, a semi-automatic type or an automatic type.

In step 2202, the segmentation information may be preprocessed and boundary data may be generated. In some embodiments, the boundary data may be a mesh grid data corresponding to boundary structures of each tissue within the volume data. The boundary structure may be a two-dimensional boundary line, a three-dimensional boundary surface, etc. The boundary structure of the mesh grid data may include a triangle or quadrate, or an irregular shape, or any combination thereof. The triangle or quadrate may be formed by connecting three or four corresponding volume data. The mesh grid data may include information e.g., a corresponding coordinate of each point therein, a normal vector of a plane where the grid located, a structure information of an adjacent volume data, or the like, or any combination thereof.

It should be noted that the above description about the segmentation of the volume data and the generation of the mesh data is merely an example according to some embodiments of the present disclosure. Obviously, to those skilled in the art, after understanding the basic principles of the method, the form and details of segmentation and generation may be modified or varied without departing from the principles of the present disclosure. For example, the boundary structure of the mesh grid data may be comprised of other shapes such as a pentagon, a hexagon, or the like, or any combination thereof. For another example, the tissue herein may be not limited to human tissues or organs, other components such as air, water, or the like may be tissues as well. The modifications and variations are still within the scope of the present disclosure described above.

The preprocessing of the segmentation information may include providing an observation point, providing observation light of different directions from the observation point. The observation light may intersect the boundary structure at several intersection points. The intersection points in a same depth may be located in a same depth surface. The depth may be the distance between the intersection point and the observation point.

Figure 23:
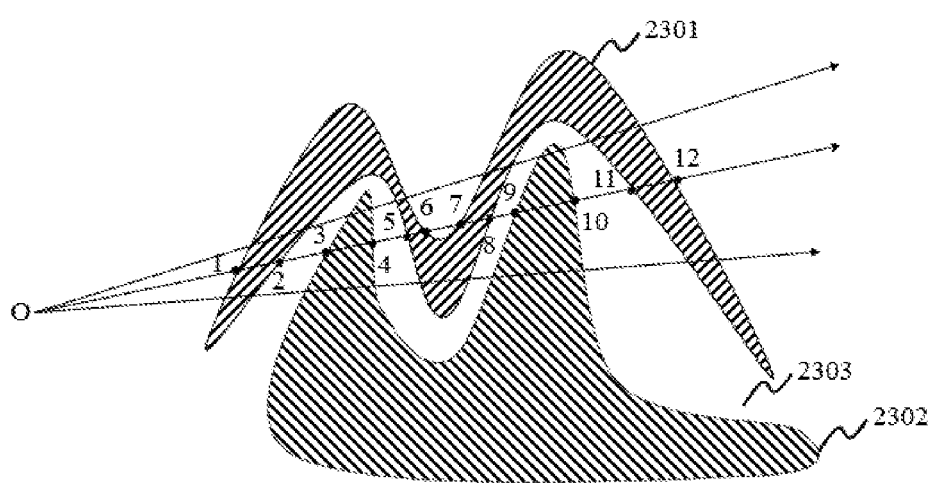
FIG. 23 is an illustration of rendering tissues by way of an iterative rendering method according to some embodiments of the present disclosure.

For better understanding the present disclosure, different tissues transmitted by light may be described as an example. In some embodiments, a region of interest (ROI) may be marked as Mask_ID_1, Mask_ID_2, Mask_ID_3, etc. A region of disinterest may be marked as Mask_ID_Default. As shown in FIG. 23, the tissues may include a tissue 2301, a tissue 2302 and a tissue 2303 which locates therebetween. In some embodiments, the tissue 2301 and tissue 2302 may be regarded as a region of interest and may be marked as Mask_ID_1, Mask_ID_2, respectively. The tissue 2303 of disinterest may be marked uniformly as Mask_ID_default.

As shown in FIG. 23, the light may start from a point O, and passes through the tissues along the directions as shown in the FIG. 23. The light may intersect with the boundaries of the tissue 2301 and the tissue 2302 at the points from number 1 to number 12. Number 1-12 may represent the twelve intersections, respectively. In some embodiments, the intersections 1-12 may be acquired by passing several times based on a Depth Peeling algorithm.

A mesh structure may be generated according to the edge of volume data in a Mask_ID. In some embodiments, the mesh structure may include three/four point coordinates of the triangular/quadrilateral facets, a normal vector of a plane, a Mask_ID information of an adjacent volume data in a three-dimensional space, or the like, or any combination thereof. The adjacent volume data in the three dimension space may volume data which is on the top, bottom, left and right of the present volume data. For better understanding, the intersection point 1 and 2 as shown in FIG. 23 may be described as an example. In some embodiments, the Mask information of a volume data point before the intersection point 1 may be Mask_ID_Default. The Mask information of a volume data point after the intersection point 1 may be Mask_ID_1. The Mask information of a volume data point before the intersection point 2 may be Mask_ID_1. The Mask information of a volume data point after the intersection point 2 may be Mask_ID_Default. The rest may be done in the same manner.

It should be noted that the above description about FIG. 23 is merely an example according to some embodiments of the present disclosure. Obviously, to those skilled in the art, after understanding the basic principles of the method, the form and details of the segmentation may be modified or varied without departing from the principles of the present disclosure. For example, other preprocessing method may be executed to acquire mesh data of the segmentation information. The modifications and variations are still within the scope of the present disclosure described above.

In step 2203, the volume data and the mesh data may be loaded into a GPU to execute a rendering. In some embodiments, the volume data and mesh data may be loaded into the GPU. The mesh data may be processed the Depth Peeling algorithm. The Depth Peeling algorithm may be a multi-slice rendering method based on z-buffer. The rendering of each slice may be based on the depth value of a previous slice. The Depth Peeling algorithm may include Pass of many times. In some embodiments, the first Pass may be marked as Pass (1) and the ith Pass may be marked as Pass (i). A depth information and a position information of the Pass (i) acquired may be marked as Depth_i, Position_i, respectively. The Depth_i and/or the Position_i may be stored in a Texture of a Frame Buffer Object (FBO).

In step 2204-2210, the volume data may be rendered iteratively. The rendering may include acquiring a maximum depth surface and a minimum depth surface. The maximum depth surface may include the intersection points which may be at a farthest boundary surface along the light and in a same curved surface as well. The minimum depth surface may include the intersection points which may be at a nearest boundary surface along the light and in a same curved surface as well. The iterative rendering may be executed from the minimum depth surface to the maximum depth surface. The iterative rendering may end at the maximum depth surface.

The iterative rendering may include judging whether a boundary structure acquired from a current iteration and the boundary structure acquired from the last iteration belong to a same boundary structure. If so, the corresponding volume data may be accessed and rendered according to the position information of the current and the last interaction. If not, the end of the current rendering may be regarded as the start of the next rendering sampling. A boundary structure of the next iteration may be continued to look for. In some embodiments, the access of the position information may include consulting the boundary data, confirming the corresponding tissue type for rendering, choosing a corresponding rendering strategy and a color table.

In step 2204, the Depth Peeling Pass (1) may be executed to acquire a maximum depth (marked as Depth_max) and a minimum depth (marked as Depth_min) of the mesh data. The Depth_max and the Depth_min may be stored in the Texture of the FBO (Texture_Depth_Min, Texture_Depth_Max).

In step 2205, the Pass (i) may be executed to acquire Depth_i. The Depth_i may be compared with the Depth_max. If Depth_i>Depth_max, the iteration may be ended. If not, the step 2206 may be executed.

In step 2206, the depth information Depth_i−1 and position information Position_i−1 may be acquired from Pass (i−1).

In step 2207, the Pass (i) may be executed to acquire Depth_i and Position_i. The Depth_i and the Position_i may be stored in the Texture (Texture_Depth_i, Texture_Depth_i).

In step 2208, the mesh data of the Pass (i) and Pass (i−1) may be judged whether belong to a same tissue. If so, the step 2209 may be executed. If not, it may return to step 2205.

In step 2209, the voxels of the volume data may be accessed from the Position_i−1 as the start to Position_i as the end.

In step 2210, the rendering result may be fused with the last rendering step of the same tissue. Then it may return to the step 2205. In some embodiments, the fusion of the rendering result with the last rendering step of the same tissue may be illustrated by combining the two figures of FIG. 22 and FIG. 23. The Depth Peeling algorithm may be used in the GPU. The depth and position information Point_1 of the intersection point 1 may be acquired according to Pass (1). The depth and position information Point_2 of the intersection point 2 may be acquired according to Pass (2). The Point_1 and Point_2 may be compared, and the intersection point 1 and 2 may belong to a same tissue, marked as Mask_ID_1. So the different rendering strategies may be used from point 1 to point 2, the rendering result may be marked as Result_Mask_ID_1_1_2.

The Point_5 and Point_6 may be acquired according to Pass (5) and Pass (6). The intersection point 5 and 6 may belong to a same tissue, marked as Mask_ID_1. The rendering result may be marked as Result_Mask_ID_1_5_6. The Result_Mask_ID_1_1_2 and Result_Mask_ID_1_5_6 may be fused to acquire a Result_Mask_ID_1_Blend.

Pass (7) and Pass (8) may be executed in a similar way. The Result_Mask_ID_1_7_8 may be fused with the Result_Mask_ID_1_Blend to acquire a new Result_Mask_ID_1_Blend. Similarly, Pass (11) and Pass (12) may executed to acquire the Result_Mask_ID_1_11_12. The Result_Mask_ID_1_11_12 may be fused with the Result_Mask_ID_1_Blend to acquire a new Result_Mask_ID_1_Blend. Finally, the rendering result may be acquired as Result_Mask_ID_1_Blend.

The subsequent Pass (i) may be executed to acquire and store Depth_i and Position_i. The depth value may be compared with the Depth_max. If Depth_i<Depth_max, the Depth_i−1 and the Position_i−1 of the Pass (i−1) in the FBO may be read. The image process method may end until the comparison result is Depth_i>Depth_max. Then the mesh data of Pass (i) and Pass (i−1) may be judged whether belong to a same boundary of a tissue. If so, the voxels of the volume data may be accessed from the Position_i−1 as the start to Position_i as the end. The rendering result may be acquired by different rendering strategies. If not, it may return to the step 2205. In some embodiments of the present disclosure, the rendering strategy may include a direct volume rendering, a volume intensity projection (VIP), a maximum intensity projection (MIP), a minimum intensity projection (Min-IP), a hardware-accelerated volume rendering, an average intensity projection (AIP), or the like, or any combination thereof.

It should be noted that the above description about the iterative rendering is merely an example according to some embodiments of the present disclosure. Obviously, to those skilled in the art, after understanding the basic principles of the method, the form and details of the iterative rendering may be modified or varied without departing from the principles of the present disclosure. For example, the iterative rendering of tissues may be executed without the fusion step. In some embodiments of the present disclosure, one or more steps may be omitted. In some other embodiments, one or more steps may be executed repeatedly. The modifications and variations are still within the scope of the present disclosure described above.

Figure 24:
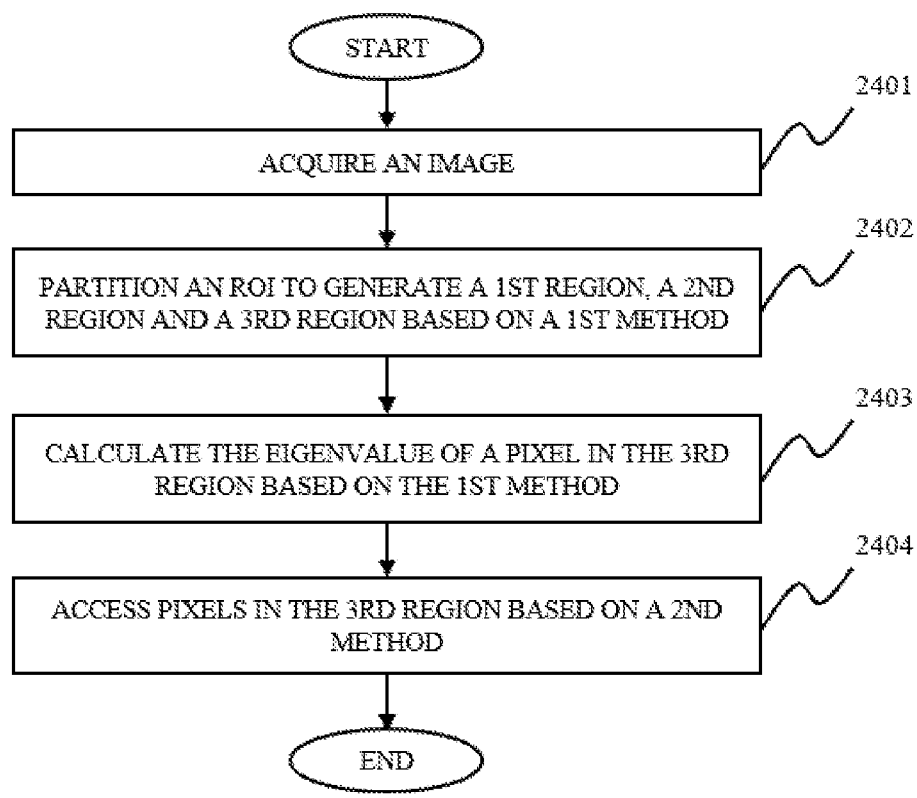
FIG. 24 is a flowchart illustrating a process for post segmentation processing according to some embodiments of the present disclosure.

FIG. 24 is a flowchart illustrating a process of post segmentation processing according to some embodiments of the present disclosure. In step 2401, an image may be acquired. In some embodiments, the image may be a binary image (mask) after a 2D segmentation or a 3D segmentation. The image may be acquired based on techniques including DSA (digital subtraction angiography), CT (computed tomography), CTA (computed tomography angiography), PET (positron emission tomography), X-ray, MRI (magnetic resonance imaging), MRA (magnetic resonance angiography), SPECT (single-photon emission computerized tomography), US (ultrasound scanning), or the like, or a combination thereof. In some embodiments of the present disclosure, multimodal techniques may be used to acquire the volume data. The multimodal techniques may include CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof.

In step 2402, a region of interest (ROI) may be extracted from the image, and the ROI may be partitioned into three regions, a first region, a second region, and a third region. In some embodiments, the first region may be determined as a target tissue (e.g., a bone tissue), merely by way of example, for a binary image, the first region may be constituted by all pixels whose value is 1. The characteristic value of the first region may be denoted by $T_{high}$. The second region may be the boundary region of the target tissue. The characteristic value of the second region may be denoted as $T_{low}$ that is relatively small compared with $T_{high}$. The characteristic value of the third region may be denoted as $T_i$.

It should be noted the method described herein may be used to fill multiple ROIs that that are spaced and needed to be filled separately.

In step 2403, a first method may be used to calculate the characteristic value $T_i$ of a pixel in the third region.

It should be noted that in medical image processing, even for the same tissue, the pixel value may fluctuate in a range. Merely by way of example, the pixel value of a medical image may correlate to the CT value of the tissue. The CT value may be used to indicate the extent of attenuation when the X-ray transverses a tissue. Different tissues may have different CT values than may fluctuate in a range. For example, the CT value of bones may be equal or less than 1000 HU, the CT value of soft tissues may range from 20 to 70 HU, the CT value of water may be 0, or ranging from −10 HU to 10 HU. Therefore, the CT value may be used to determine the type of tissues.

In physics, thermal flows from high temperature field to low temperature field so that thermal equilibrium may be reached. Temperature diffuses fast in the high temperature filed, and diffuses slowly between the high temperature field and a low temperature field. Also, temperature diffuses fast in the same object, and diffuses slowly in different objects. Therefore, by determining the variation of temperature, whether the temperature belongs to the same object or different objects may be determined.

Concerning the first method mentioned in step 2403, the first region may be used to analogy the high temperature field, and has a fixed characteristic value $T_{high}$. The second region may be used to analogy the low temperature filed, and has a fixed characteristic value $T_{low}$. $T_{low}$ may be less than $T_{high}$. In some embodiments of the present disclosure, $T_{high}-T_{low}>100$. Merely by way of example, the characteristic value may be the brightness of a pixel. The characteristic value $T_i$ of each pixel in the third region may be calculated to determine whether the pixel belongs to the target tissue so that the target tissue may be filled.

In step 2404, the pixels of the third region may be assessed based on a second method. Specifically, the characteristic value $T_i$ of the pixels may be assessed. If assess result is positive, the pixels may be extracted for filling the target tissue. If the assess result is negative, the pixels may be assigned to the value of the background.

It should be noted that the flowchart depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure.

Figure 25:
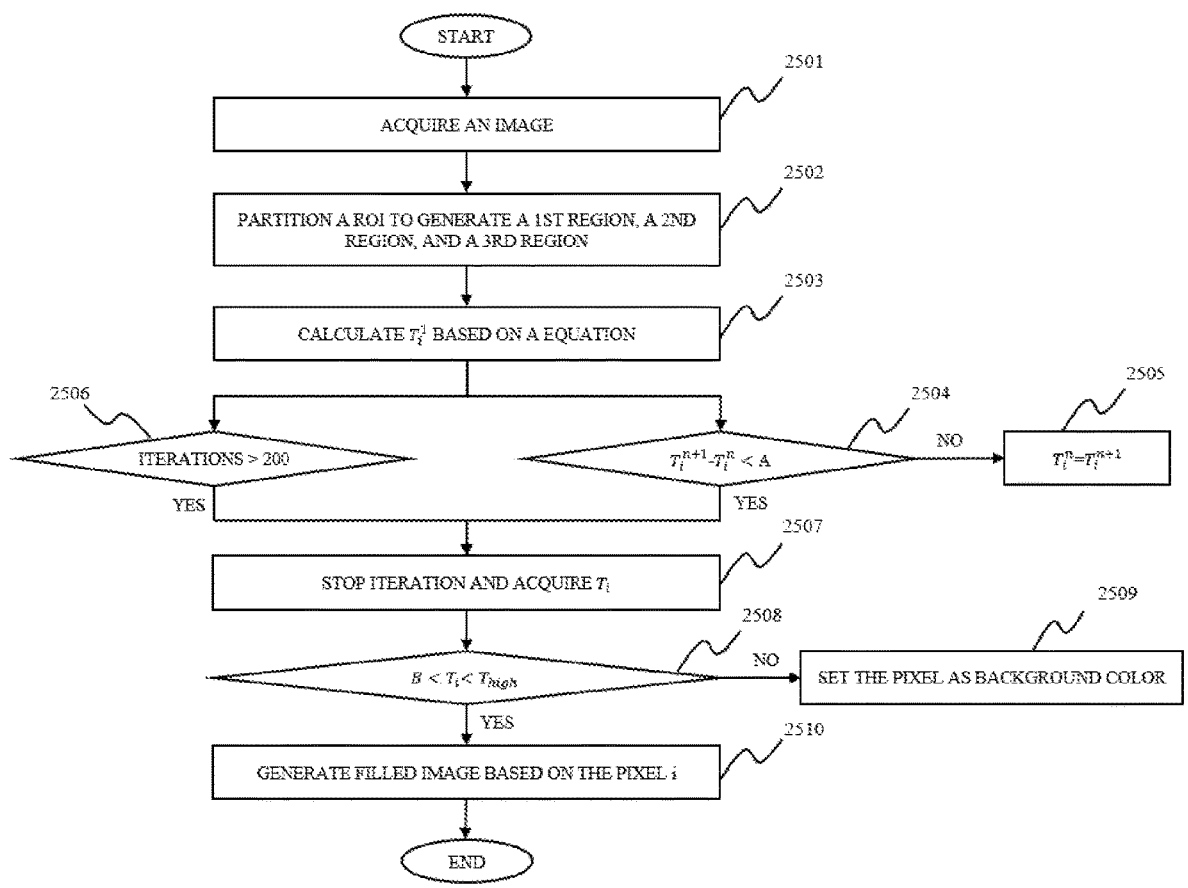
FIG. 25 is a flowchart illustrating a process for post segmentation processing according to some embodiments of the present disclosure.

FIG. 25 is a flowchart illustrating a process of post segmentation processing according to some embodiments of the present disclosure. In step 2501, an image may be acquired. In some embodiments of the present disclosure, the image may be a binary image that is generated based on segmentation methods including a threshold segmentation, a region growing segmentation, a region split and/or merge segmentation, an edge tracing segmentation, a statistical pattern recognition, a C-means clustering segmentation, a deformable model segmentation, a graph search segmentation, a neural network segmentation, a geodesic minimal path segmentation, a target tracking segmentation, an atlas-based segmentation, a rule-based segmentation, a coupled surface segmentation, a model-based segmentation, a deformable organism segmentation, or the like, or any combination thereof. In some embodiments, the segmentation method may be performed in a manual type, a semi-automatic type or an automatic type.

It should be noted that the accuracy requirement of the image in step 2501 may not be high. Coarse segmented images may be filled based on the method provided herein as well.

In step 2502, an ROI may be selected, and the ROI may be partitioned into three regions, a first region, a second region, a third region. The ROI may be selected either manually or automatically. In some embodiments, the ROT may be a region of an image that lacks some information, for example, boundary information.

In some embodiments of the present disclosure, the first region may be the region with high brightness, and the pixel values of the first region may be 1. The second region may be the boundary region that is acquired automatically. The rest may be the third region.

In step 2503, $T_i^1$ may be calculated by:

$$\frac{\partial T_i^{n+1}}{\partial t} = \alpha \Delta T = \alpha \sum_{i=1}^{n}\left(\frac{\partial^2 T_i^n}{\partial x_i^2}\right) \quad \text{(Equation 13)}$$

Where the initial value of $T_i^1$ may be $T_{low}$. A is a constant, as diffusion effects is neglected, in some embodiments, $\alpha$ may be 1.

$$\frac{\partial T_i^{n+1}}{\partial t}$$

is the characteristic value of pixel i in $n+1_{th}$ iteration and t moment. For example, when $T_i^1 = T_{low}$, the characteristic value of pixel i may be $T_{low}$ in $t_1$ moment. $T_i$ may be the characteristic value of pixel i, and i may be a natural number. $T_i^n$ may be the characteristic value of pixel i after the nth iteration. $x_i$ may be the space coordinate of pixel I in the third region. Preferably, $T_i^1$ may be initialized as $T_{low}$.

In some embodiments of the present disclosure, $T_{high}$ of the first region may be defined as 200, and $T_{low}$ of the second region may be defined as 0. The image may be filled based on the calculation of the characteristic value of the third region. In some embodiments of the present disclosure, $T_{high} - T_{low} > 100$.

$T_i^1$ may be iteratively calculated based on an initial value of $T_{low}$.

In step 2504, the difference of the characteristic value in the $n+1_{th}$ iteration and the characteristic value in the nth iteration may be assessed, whether $T^{n+1} - T_n < A$. In some embodiments, $A \leq 10^{-6}$. It should be noted that A may be set based on experience. If the difference is less than A, step 2507 may be performed, and the characteristic value of pixel i may be assigned as $T_i^{n+1}$. Otherwise, step 2505 may be performed, $T_i^n$ may be substituted by $T_i^{n+1}$, and the iterative calculation may continue. The methods for solving equation 13 may include Conjugate gradient method, incomplete Cholesey conjugate gradient algorithm, the strong implicit method, Gauss method, or the like, or any combination thereof.

In step 2505, the number of iterations may assessed. If the number of iterations exceeds 200, the iteration may be terminated and step 2507 may be performed, the characteristic value $T_i$ may be acquired. It should be noted that step 2504 and step 2505 are utilized to determine the convergence of equation 1. In some embodiments of the present disclosure, either step 2504 or step 2505 is satisfied, the iteration may be terminated. In some embodiments, the iteration may be terminated when both step 2504 and step 2505 are satisfied.

In step 2508, the characteristic value $T_i$ may be assessed. If $T_i$ meets $B < T_i < T_{high}$, the pixel corresponding to $T_i$ may be extracted and the region to be filled may be determined. Otherwise, the pixel corresponding to $T_i$ may be assigned to the value of the background of the image in step 2509. Taking the binary image as an example, the pixel may be assigned to a value of 0. It should be noted that threshold B is adjustable. B may be adjusted under different conditions.

In step 2510, a filled image based on the characteristic value $T_i$ may be generated.

It should be noted that the flowchart depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure.

Figure 26:
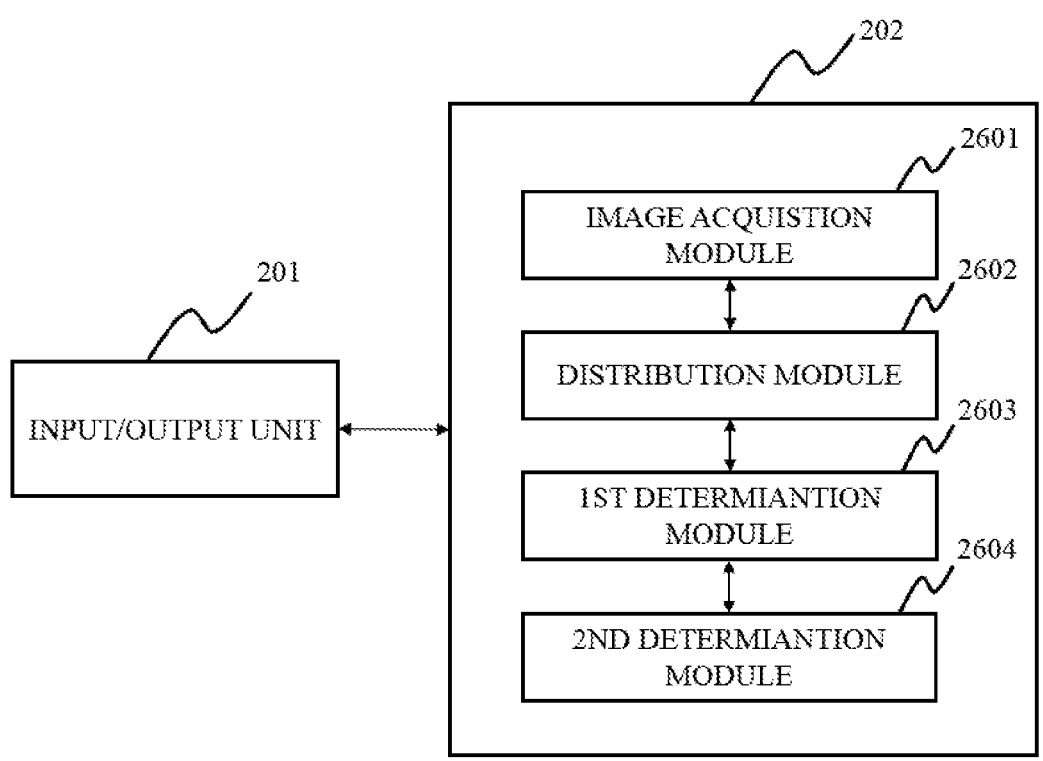
FIG. 26 is a block diagram of an image processing system according to some embodiments of the present disclosure.

FIG. 26 is a block diagram of an image processing system according to some embodiments of the present disclosure. As shown in the figure, the image processing system 202 may include an image acquisition module 2601, a distribution module 2602, a first determination module 2603, and a second determination 2604. The input/output unit 201 may communicate bidirectionally with the image processing system. The communication is described elsewhere in the present disclosure. The image acquisition module 2601 may be configured to acquire images including 2D image, 3D image, binary images generated based the 2D images or 3D images. The distribution module 2602 may be configured to partition an ROI into three regions, a first region, a second region, and a third region. The first determination module 2603 may be configured to calculate the characteristic value $T_i$ of a pixel i in the third region.

In some embodiments of the present disclosure, the first determination module may further include a convergence block and an iteration block (not shown in the figure). The convergence block may be configured to determine the convergence of the characteristic value $T_i$ of the third region. The determination may be based on an equation:

$$\frac{\partial T_i^{n+1}}{\partial t} = \alpha \Delta T = \alpha \sum_{i=1}^{n}\left(\frac{\partial^2 T_i^n}{\partial x_i^2}\right) \quad \text{(Equation 14)}$$

Where the initial value of $T_i^1$ may be $T_{low}$. A is a constant, as diffusion effects is neglected, in some embodiments, α may be 1.

$$\frac{\partial T_i^{n+1}}{\partial t}$$

is the characteristic value of pixel i in $n+1_{th}$ iteration and t moment. For example, when $T_i^1=T_{low}$, the characteristic value of pixel i may be $T_{low}$ in $t_1$ moment. $T_i$ may be the characteristic value of pixel i, and i may be a natural number. $T_i^n$ may be the characteristic value of pixel i after the nth iteration. $x_i$ may be the space coordinate of pixel I in the third region. Preferably, $T_i^1$ may be initialized as $T_{low}$. If $T^{n+1}-T^n<A$, the iteration may be terminated, and the characteristic value Ti of pixel i may be determined. Otherwise, the iteration may continue to proceed. In some embodiments, $A\leq10^{-6}$. It should be noted that A may be set based on experience.

The iteration block may be configured to perform an iteration. In some embodiments, $T_i^1$ may be iteratively calculated based on an initial value of $T_{low}$. If the number of iterations exceeds 200, the iteration may be terminated and the characteristic value $T_i$ may be acquired. The characteristic value $T_i$ of all the pixels in the third region may be acquired based on the method provided herein.

It should be noted that either A of the convergence block or the number of iterations of the iteration block is meet, the first determination module 2603 may terminate the iteration. In some embodiments, the iteration may be terminated when both A of the convergence block and the number of iterations of the iteration block are meet.

A threshold B may be set by the second determination module 2604. It should be noted that B may be either fixed or variable. B may be adjusted to adjust the boundary of a target tissue. In some embodiments, $T_{low}<B<T_{high}$.

It should be noted that the block described above is provided for the purposes of illustration, and not intend to limit the scope of the present disclosure. For persons having ordinary skills in the art, various variations and modifications may be conducted under the teaching the present disclosure. However, those teachings may not depart the protecting scope of the present disclosure. For example, the distribution module 2602 may partition an ROI into more than three regions.

Figure 27:
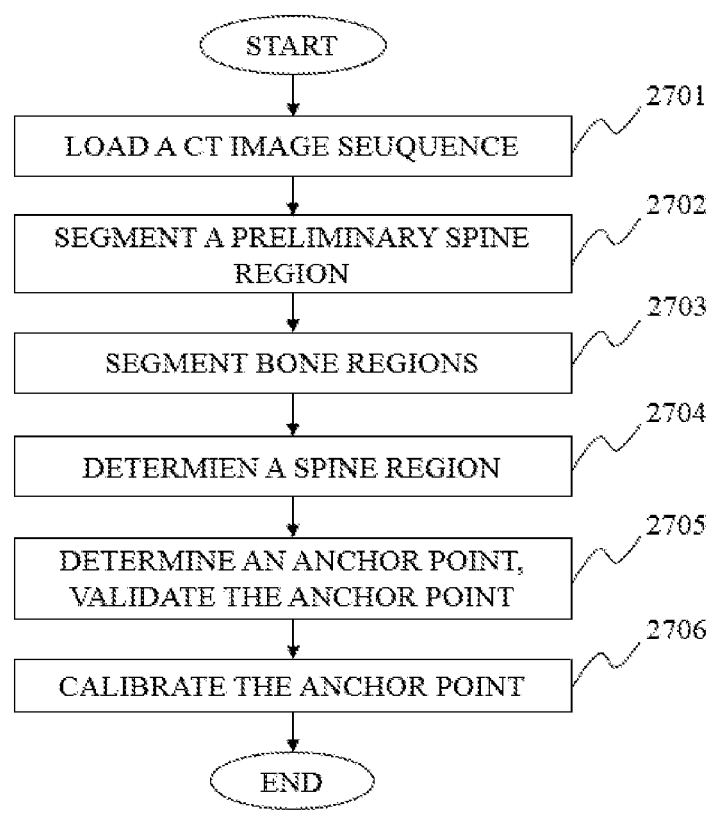
FIG. 27 is a flowchart illustrating a process for spine location according to some embodiments of the present disclosure.

FIG. 27 is a flowchart illustrating a process of spine location according to some embodiments of the present disclosure. In step 2701, a CT image sequence may be loaded. The CT image sequence may comprise a plurality of 2D slices. In some embodiments, the CT image sequence may be generated based on multi-slice spiral CT (MSCT). Merely by way of example, the CT image sequence may be a portal venous phase image sequence, an arterial phase image sequence, etc.

Optionally the CT image sequence may be acquired by techniques including DSA (digital subtraction angiography), CT (computed tomography), CTA (computed tomography angiography), PET (positron emission tomography), X-ray, MRI (magnetic resonance imaging), MRA (magnetic resonance angiography), SPECT (single-photon emission computerized tomography), US (ultrasound scanning), or the like, or a combination thereof. In some embodiments of the present disclosure, multimodal techniques may be used to acquire the volume data. The multimodal techniques may include CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof.

In step 2702, a preliminary spine region may be segmented based on the CT image sequence. Specifically, a preliminary spine region may be segmented in each 2D slice of the CT image sequence. The preliminary spine region may be segmented based on some known information, for example, the direction of a CT scan, the anatomical position of the spine in a human body, etc. In some embodiments of the present disclosure, the preliminary spine region may be segmented based on an x coordinate and a y coordinate. The x coordinate of the preliminary spine region may be [H/4, 7H/8], and the y coordinate of the preliminary spine region may be [W/3, 3 W/4]. W may denote the width of the CT image, and H may denote the height of the CT image.

A preprocessing may be performed on the preliminary spine region to segment bone regions in step 2703. In each 2D slice of the CT image sequence, one or more bone regions may be segmented. In some embodiments of the present disclosure, the preprocessing may include threshold segmentation, region connection, or the like, or any combination thereof. The threshold segmentation may be performed to segment the bone regions. As in a CT image, the grey value of a bone region may be greater than that of surrounding regions. By setting a threshold of grey value, the bone regions may be segmented. The region connection may be performed to connect the bone regions that are not continuous. In some embodiments, an inflation operation may be performed on small regions to connect the small regions that may constitute a big region. Merely by way of example, a morphology algorithm may be used to eliminate small holes and disconnections.

In step 2704, a spine region may be determined. Specifically, a spine region may be determined in each 2D slice of the CT image sequence. In some embodiments of the present disclosure, among the bone regions segmented in step 2703, the bone region having the maximum area may be determined as the spine region.

In step 2705, an anchor point may be determined and validated in every 2D slice of the CT image sequence. In some embodiments of the present disclosure, the midpoint in the toppest row of the spine region determined in step 2740 may be determined as the anchor point. In some embodiments, the coordinate of the anchor point may be donated as $(x_{med}, y_{top})$, where $y_{top}$ may denote the y coordinate of the toppest row, and $x_{med}$ may denote the x coordinate of the midpoint. As spine locates in the central position of a human body, the anchor point may be validated by:

$$M(x_{med}, y_{top}) = \begin{cases} 1, \text{ if } y_{top} > \frac{H}{4} \text{ and } abs\left(x_{med} - \frac{W}{2}\right) < W/4 \\ 0, \text{ otherwise} \end{cases} \quad \text{(Equation 15)}$$

Where $y_{top}>H/4$ may insure that the y coordinate of the anchor point locates in the middle or the lower position, $abs(x_{med}-W/2)$ may be used to control the shift extent of the x coordinate from the central position. The width of the CT image may be denoted by W, while the height of the CT image may be denoted by H. Therefore, if the y coordinate of the anchor point is greater than H/4, and the shift of the x coordinate from the central position is less than H/4, the anchor point may be valid. Otherwise, the anchor point may be determined invalid.

In step 2706, the anchor point of every 2D slice determined in step 2705 may be calibrated. The calibration may include calibrating the anchor points whose coordinate is abnormal, calibrating the anchor points that lack coordinate, etc.

As for calibrating the anchor points whose coordinate are abnormal, two measurements may be defined, $D_m$ and $D_p$. Firstly, the anchor points may be arranged based on the slice number of the 2D slices. In some embodiments, the slice number may be denoted as [0, 1 . . . , N], the number of anchor points may be denoted as M, the coordinate sequence of the anchor points may be denoted as $sp=\{(x_1,y_1,t_1), (x_2,y_2,t_2), \ldots, (x_m,y_m,t_m)\}$, the z coordinate $t_k \in [0, N]$, k=1, 2, . . . M, and when i<j, $t_i<t_j$. Secondly, a sliding window may be defined, the anchor points to be calibrated may be positioned in the sliding windows sequentially. The position mean value of the anchor points $P_{medium}$ may be calculated.

Merely by way of example, the current coordinate may be denoted as $sp_{current}=(x_k,y_k,t_k)$, the size of the sliding window may be denoted as $S_{window}$. The subscript of the starting point in the sliding window may be calculated by:

$$N_1 = \max(k - S_{window}/2, 1) \quad \text{(Equation 16)}$$

The subscript of the ending point in the sliding window may be calculated by:

$$N_2 = \min(N_1 + S_{window} - 1, M) \quad \text{(Equation 17)}$$

The coordinate sequence in the sliding window may be denoted as:

$$P = \{(x_{N1}, y_{N1}, t_{N1}), (x_{N1+1}, y_{N1+1}, t_{N1+1}), \ldots (x_{N2}, y_{N2}, t_{N2})\} \quad \text{(Equation 18)}$$

The mean value $P_{medium}$ may be calculated by:

$$d_i = \Sigma_{k=1}^{S_{window}} \sqrt{(x_i - x_k)^2 + (y_i - y_k)^2} \quad \text{(Equation 19)}$$

$$d_{min} = \min\{d_1, d_2, d_3, \ldots d_{S_{window}}\} \quad \text{(Equation 20)}$$

Where $d_i$ may denote the Euclidean distance sum of the ith anchor point in P and other anchor points, $d_{min}$ may denote the minimum Euclidean distance sum among all the Euclidean distance sums. The coordinate corresponding to $d_{min}$ may be assigned to $P_{medium}$, $$P_{medium} = (x_{(min)}, y_{(min)}) \quad \text{(Equation 21)}$$

$(x_{(min)}, y_{(min)})$ may denote the coordinate corresponding to $d_{min}$.

Thirdly, $D_M$ and $D_P$ may be calculated to calibrate the anchor points. $D_M$ and $D_P$ may be calculated by:

$$D_M = \sqrt{(x_k - x_{(min)})^2 + (y_k - y_{(min)})^2} \quad \text{(Equation 22)}$$

$$D_P = \sqrt{(x_k - x_{pre})^2 + (y_k - y_{pre})^2} \quad \text{(Equation 23)}$$

Where DM may denote the Euclidean distance of current coordinate and the position mean value, DP may denote the Euclidean distance of the current coordinate and the previous coordinate. A threshold TH may be defined to assess DM and DP. If DM<TH and DP<TH, then the current coordinate may be valid. Otherwise, the current coordinate may be substituted by the coordinate of DM if DM is less than DP, wise versa.

As for calibrating the anchor points that lack coordinate, the coordinate may be calculated based on adjacent coordinates. Merely by way of example, the fixed anchor point sequence may be denoted as:

$$sp\_fixed = \{(x_{(1)}, y_{(1)}, t_1), (x_{(2)}, y_{(2)}, t_2), \ldots, (x_{(M)}, y_{(M)}, t_M)\} \quad \text{(Equation 24)}$$

The anchor points that lack coordinate may be denoted as $t \in [0, N]$, and $t \neq t1, t2, \ldots tM$. If the anchor point lacks coordinate locates in the beginning, t<t1, the coordinate may be fixed as $(x_{(1)}, y_{(1)}, t)$; if $t > t_M$, the coordinate may be fixed a $(x_{(M)}, y_{(M)}, t)$.

In some embodiments, if the anchor points that lack coordinate are neither in the beginning nor in the ending, the coordinate may be fixed based on adjacent coordinates. The adjacent anchor points of t are $t_k$ and $t_{k+1}$, the coordinates corresponding to tk and tk+1 are $(x_{(t_k)}, y_{(t_k)}, z_{(t_k)})$ and $(x_{(t_{k+1})}, y_{(t_{k+1})}, z_{(t_{k+1})})$. The coordinate may be fixed by:

$$x_t = x_{(t_k)} + \frac{t - t_k}{t_{k+1} - t_k}(x_{(t_{k+1})} - x_{(t_k)}) \quad \text{(Equation 25)}$$

$$y_t = y_{(t_k)} + \frac{t - t_k}{t_{k+1} - t_k}(y_{(t_{k+1})} - y_{(t_k)}) \quad \text{(Equation 26)}$$

The fixed coordinate may be denoted as $(x_t, y_t, t)$.

It should be noted that the flowchart depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure.

Figure 28:
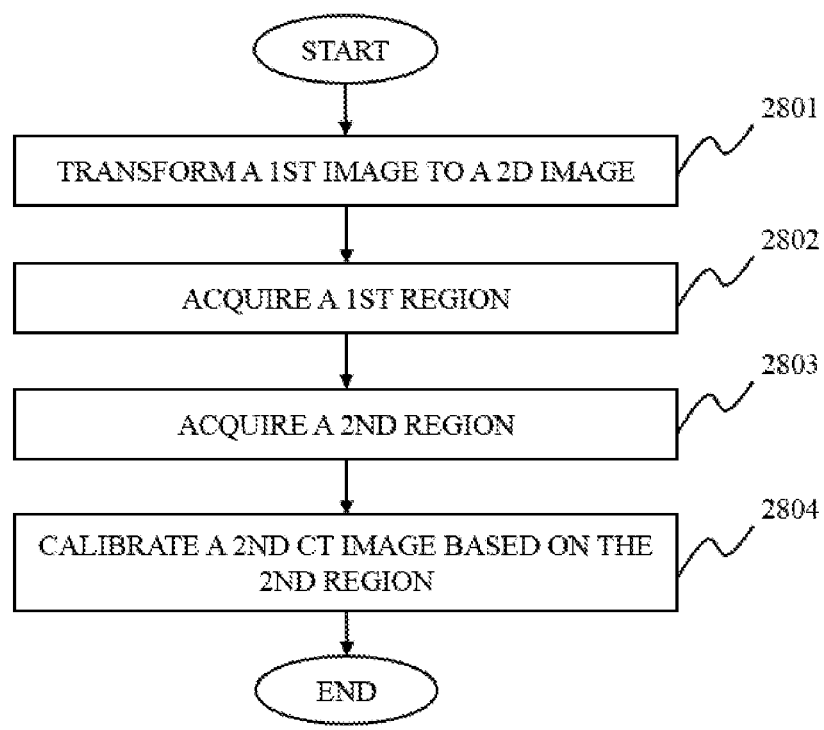
FIG. 28 is a flowchart illustrating a process of 3D image segmentation according to some embodiments of the present disclosure.

FIG. 28 is a flowchart illustrating a process of 3D image segmentation according to some embodiments of the present disclosure. In step 2801, a first image may be transformed into a first 2D image. The pixel values of the 2D image may correspond to those of the first image, for example, correspond to the pixels that have the same spatial position in every 2D slice of the first image. In some embodiments of the present disclosure, the first image may be a binary image that is generated based on segmenting an ROI out of a first CT image. The ROI may be segmented from the first CT image by performing a threshold segmentation. The first CT image may be the original CT image that is generated for diagnosis. Merely by way of example, the first image may comprise a group of 2D slices. Therefore, the pixel values of the 2D image may correspond to those of each 2D slice of the first image spatially.

It should be noted that the first CT image is provided for the purposes of illustration, and not intended to limit the scope of the present disclosure. Optionally, the first CT image may be acquired based on techniques including digital subtraction angiography (DSA), computed tomography (CT), computed tomography angiography (CTA), positron emission tomography (PET), X-ray, magnetic resonance imaging (MRI), magnetic resonance angiography (MRA), single-photon emission computerized tomography (SPECT), ultrasound scanning (US), or the like, or any combination thereof. In some embodiments of the present disclosure, the first CT image may be generated based on multimodal techniques. The multimodal techniques may include CT-MR, CT-PET, CE-SPECT, DSA-MR. PET-MR, PET-US, SPECT-US, TMS (transcranial magnetic stimulation)-MR, US-CT, US-MR, X-ray-CT, X-ray-MR. X-ray-portal, X-ray-US, Video-CT, Vide-US, or the like, or any combination thereof.

The first 2D image may be generated by projecting the first image onto an anatomical plane. The anatomical plane may include a coronal plane, a sagittal plane, a transverse plane, etc. The pixel values of the 2D image may correspond to those of each 2D slice of the first image. Merely by way of example, a pixel value of the 2D image may be a sum of spatially corresponded pixels (e.g., the pixel values that are not 0) of all the 2D slices of the first image. Optionally, the projection of the first image may be based on maximum intensity projection (MIP), temporal maximum intensity projection (tMIP), minimum intensity projection (MiniP), virtual endoscopic display (VED), or the like, or any combination thereof.

In step 2802, a first region may be acquired based on the 2D image. In some embodiments, the first region may be a high brightness region of the 2D image. The first region may be acquired based on techniques including cluster, variable threshold etc.

In step 2803, a second region may be acquired. In some embodiments of the present disclosure, the second region may be acquired based on the region of each 2D slice of the first CT image corresponding to the first region spatially, the high brightness region of the region may be determined as the second region. Merely by way of example, each 2D slice of the first CT image may have a high brightness region that may be determined as a second region, each 2D slice may have a second region.

In step 2804, a second CT image may be calibrated based on the second region. The regions corresponding to the second region of the second CT image may be removed. The second CT image may be acquired after a preliminary segmentation, for example, a lung image after preliminary segmentation. Merely by way of example, the pixel values of the second CT image corresponding to the second region may be set as the pixel values of the background of the second CT image.

It should be noted that in some embodiments of the present disclosure, the second region of the first CT image may be determined as at least part of a skeleton that may lead to a false positive of a diagnosis. By removing the regions of the second CT image corresponding to the second region of the first CT image, the lesion areas of false positive may be reduced effectively.

In some embodiments of the present disclosure, the first CT image may be the original lung scan CT image, and the second CT image may be acquired by performing segmentation on the first CT image. As the chest comprises bone tissues such as spine and rib, the second CT image may comprise skeleton area such as spine area. The skeleton area may cause false positives in diagnosis. By using the method provided herein, the skeleton area of the second CT image may be removed so that diagnosis accuracy may be improved effectively.

It should be noted that the flowchart depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure.

Figure 29:
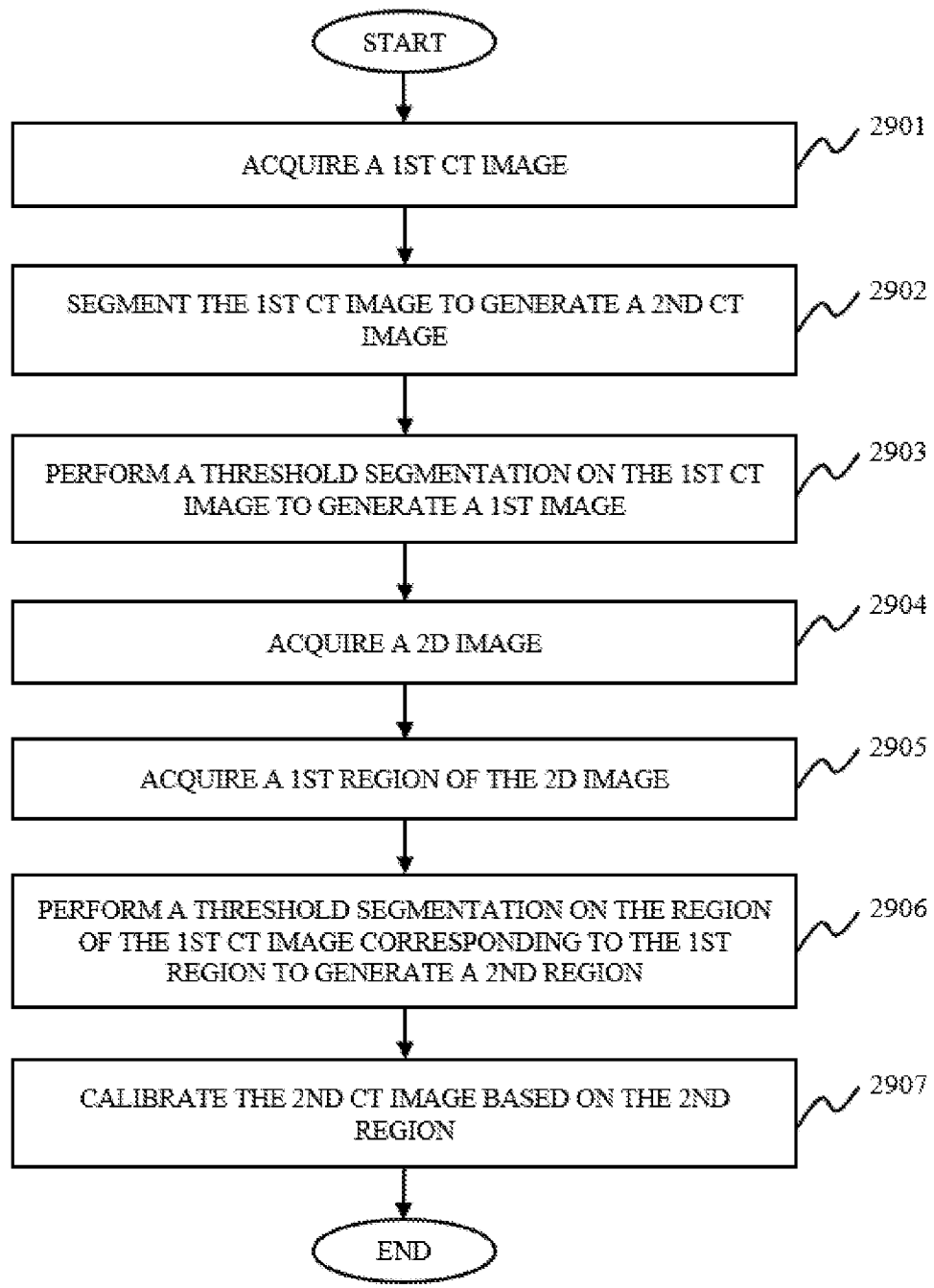
FIG. 29 is a flowchart illustrating a process of 3D image segmentation according to some embodiments of the present disclosure.

FIG. 29 is a flowchart illustrating a process of 3D image segmentation according to some embodiments of the present disclosure. In step 2901, a first CT image may be acquired. In some embodiments, in order to diagnose pulmonary nodules, the first CT image may be acquired by scanning a lung. The scan may be based on a regular CT scan, an enhanced CT scan, etc.

It should be noted that the first CT image is provided for the purposes of illustration, and not intended to limit the scope of the present disclosure. Optionally, the first CT image may be acquired based on techniques including digital subtraction angiography (DSA), computed tomography (CT), computed tomography angiography (CTA), positron emission tomography (PET), X-ray, magnetic resonance imaging (MRI), magnetic resonance angiography (MRA), single-photon emission computerized tomography (SPECT), ultrasound scanning (US), or the like, or any combination thereof. In some embodiments of the present disclosure, the first CT image may be generated based on multimodal techniques. The multimodal techniques may include CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR. X-ray-portal, X-ray-US, Video-CT, Vide-US, or the like, or any combination thereof.

In step 2902, the first CT image may be segmented to generate a second CT image. Merely by way of example, a preliminary segmentation may be performed on the first CT image to generate the second CT image.

In step 2903, a threshold segmentation may be performed on the first CT image to generate a first image. The first image may be a binary image. After the threshold segmentation, a high brightness region of the CT image may be extracted, and the high brightness region may be determined as a skeleton area. In some embodiments of the present, the first image may be a binary image after threshold segmentation. The threshold segmentation may be based on grey value difference of the ROI (e.g., a lung) and the background. When the threshold is determined, the pixels having values greater than the threshold may be determined as the ROI, while the pixels having values less than the threshold may be determined as the background. It should be noted that the threshold may be selected based on experimental data.

In step 2904, a projection may be performed on the first image to generate a 2D image. The first 2D image may be generated by projecting the first image onto an anatomical plane. The anatomical plane may include a coronal plane, a sagittal plane, a transverse plane, etc. The pixel values of the 2D image may correspond to those of each 2D slice of the first image. In some embodiments, a pixel value of the 2D image may be a sum of spatially corresponded pixels of all the 2D slices of the first image. Optionally, the projection of the first image may be based on maximum intensity projection (MIP), temporal maximum intensity projection (tMIP), minimum intensity projection (MiniP), virtual endoscopic display (VED), or the like, or any combination thereof.

Merely by way of example, if the pixel value of the binary image (the first image) ranges from 0 to 1, a pixel value of the 2D image may be a sum of spatially corresponded pixel values of the binary image, the spatially corresponded pixel values may be restricted to 1, or 0, or any combination thereof. As another example, if the pixel values of the binary image (the first image) range from 0 to a value greater than the threshold (e.g., 255), a pixel value of the 2D image may be a sum of spatially corresponded pixel values of the binary image (e.g., CT value).

In step 2905, a first region may be acquired based on the 2D image. The first region may be the region of the 2D image that has the maximum brightness. The first region may be acquired based on techniques including cluster (e.g., Gaussian mixture model), variable threshold etc. In some embodiments of the present disclosure, a number of regions with high brightness (e.g., spine area, pelvic area) may be acquired by using the techniques mentioned above. Under this circumstance, the region among the multiple regions that has the most pixels may be determined as the first region.

In step 2906, a threshold segmentation may be performed on the first CT image to generate a second region. The threshold segmentation may be performed on each 2D slice of the first CT image, specifically, on the region corresponding to the first region. After the threshold segmentation, a second region may be acquired in each 2D slice of the first CT image. The second region in each 2D slice may a high brightness region.

It should be noted that in some embodiments of the present disclosure, the first region may be determined as a rough spine area. The region corresponding to the first region of every 2D slice of the first CT image may be determined as the rough spine area. The threshold segmentation may be performed on the region to determine the real spine area, namely, the second region. It should be noted that the correspondence of the region of every 2D slice of the first CT image and the first region may be a spatial correspondence, merely by way of example, they are corresponded in spatial position. The threshold segmentation is described elsewhere in the present disclosure.

In step 2907, the second CT image may be calibrated based on the second region to acquire a calibrated second CT image. In some embodiments of the present disclosure, the second CT image may have the same size and amount of 2D slices with the first CT image. As every 2D slice of the first CT image may have a second region, the region of a 2D slice of the second CT image corresponding to the second region may be removed. Merely by way of example, to remove the region of the second CT image corresponding to the second region, the pixel values of the region may be configured as those of the background of the second CT image.

It should be noted than the method described in the present disclosure is compatible with that of the art. In some embodiments, the method of the art may be used to perform a preliminary determination of a bone tissue, and the method described in the present disclosure may be used to perform a fine determination of the bone tissue to improve the accuracy of lung segmentation and the diagnosis of pulmonary nodules.

It should be still noted that apart from lung segmentation, the method described herein may be used in the diagnosis of kidney stones so that the false positive may be reduced during the diagnosis.

It should be noted that the flowchart depicted above is provided for the purposes of the illustration, and not intended to limit the scope of the present disclosure. For persons having ordinary skills in the art, various variations and modification may be conducted under the teaching of the present disclosure. However, those variations and modifications may not depart the scope of the present disclosure.

Figure 30:
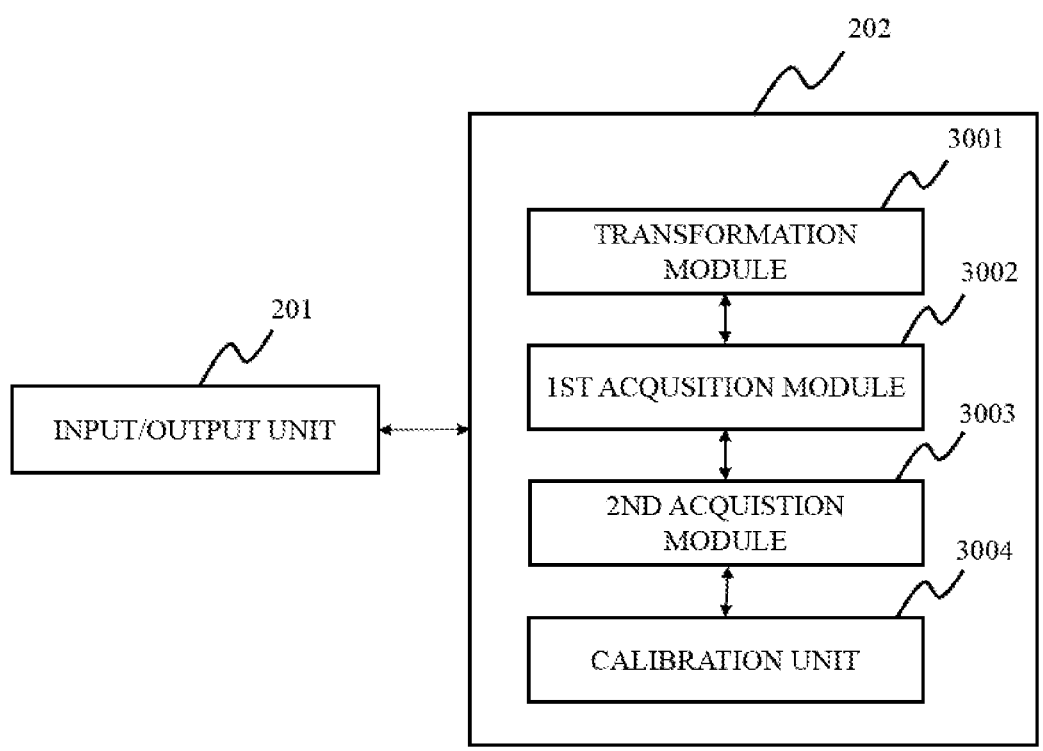
FIG. 30 illustrates a block diagram of an image processing system according to some embodiments of the present disclosure.

FIG. 30 illustrates a block diagram of an image processing system according to some embodiments of the present disclosure. As shown in the figure, the image processing system 202 may include a transformation module 3001, a first acquisition module 3002, a second acquisition module 3003, and a calibration module 3004. The input/output unit 201 may communicate bidirectionally with the image processing system. The communication is described elsewhere in the present disclosure. The transformation module 3001 may be configured to transform a first image into 2D image.

The pixel values of the 2D image may correspond to those of the first image, for example, correspond to the pixels that have the same spatial position in every 2D slice of the first image. In some embodiments of the present disclosure, the first image may be a binary image that is generated based on segmenting an ROI out of a first CT image. The ROI may be segmented from the first CT image by performing a threshold segmentation. The first CT image may be the original CT image that is generated for diagnosis. Merely by way of example, the first image may comprise a group of 2D slices. Therefore, the pixel values of the 2D image may correspond to those of each 2D slice of the first image spatially.

The first acquisition module 3002 may be configured to acquire a first region. The first region may be acquired based on the 2D image. In some embodiments, the first region may be a high brightness region of the 2D image. The first region may be acquired based on techniques including cluster, variable threshold etc.

The second acquisition module 3003 may be configured to acquire a second region. The second region may be acquired based on the first CT image. In some embodiments of the present disclosure, the second region may be acquired based on the region of each 2D slice of the first CT image corresponding to the first region spatially, the high brightness region of the region may be determined as the second region. Merely by way of example, each 2D slice of the first CT image may have a high brightness region that may be determined as a second region, each 2D slice may have a second region.

The calibration module 3004 may be configured to calibrate a second CT image based on the second region. The regions corresponding to the second region of the second CT image may be removed. The second CT image may be acquired after a preliminary segmentation, for example, a lung image after preliminary segmentation. Merely by way of example, the pixel values of the second CT image corresponding to the second region may be set as the pixel values of the background of the second CT image. After the calibration, a calibrated second CT image may be acquired. The calibration module 3004 may further include a pixel reset block (now shown in the figure) that may be configured to set the pixel values of the second CT image corresponding to the second region as the pixel values of the background of the second CT image.

It should be noted that the block described above is provided for the purposes of illustration, and not intend to limit the scope of the present disclosure. For persons having ordinary skills in the art, various variations and modifications may be conducted under the teaching the present disclosure. However, those teachings may not depart the protecting scope of the present disclosure. For example, the image processing system 202 may further include a determination module that may be configured to determine a high brightness region that has the most pixels as the first region.

For illustration purposes, some image processing embodiments about a hepatic artery segmentation will be described below. It should be noted that the hepatic artery segmentation embodiments are merely for better understanding and not intended to limit the scope of the present disclosure.

Figure 31:
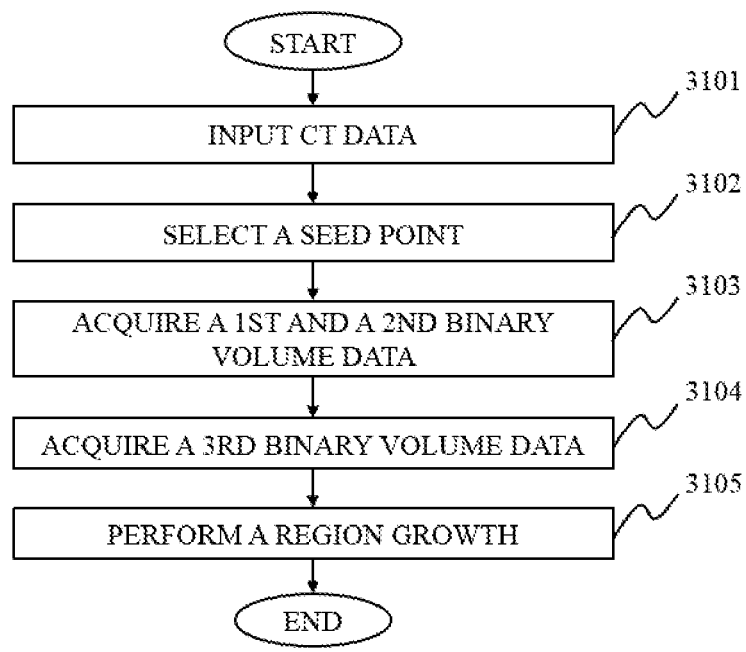
FIG. 31 is a flowchart illustrating a method for hepatic artery segmentation according to some embodiments of the present disclosure.

FIG. 31 is a flowchart illustrating a hepatic artery segmentation method according to some embodiments of the present disclosure. In step 3101, a CT data may be entered. The CT data may be information including data, a number, a text, an image, a voice, a force, a model, an algorithm, a software, a program, or the like, or any combination thereof. In an exemplary embodiment, the CT data may be a CT image and a corresponding liver mask. While in other embodiments, the CT data may be other information. It should be noted that the CT data is merely for illustration purposes, the data from other medical imaging system as described elsewhere in the present disclosure may also be applicable to the hepatic artery segmentation method.

In step 3102, a seed point of the hepatic artery may be selected, searched or positioned. The seed point selecting method may be manual or automatic. The seed point may be selected by a criterion. The selecting criterion may include judging whether a point (a pixel or a voxel) is in a certain grayscale range or evenly spaced on a grid or a square.

In step 3103, a first and second binary volume data may be generated based on the seed point selected in step 3102. In some embodiments, the first binary volume data may include a backbone and a rib connected therewith. The second binary volume data may include a backbone, a rib connected therewith and a hepatic artery. The first and second binary volume data may be generated by an image segmentation method. The segmentation method may be any one as described elsewhere in the present disclosure.

In step 3104, a third binary volume data may be generated. In some embodiments, the third binary volume data may be acquired by removing a part same with the first binary volume data from the second binary volume data.

In step 3105, the hepatic artery segmentation result may be generated through a 3D region growing in the third binary volume data based on the seed point selected in step 3102.

It should be noted that the above embodiments are for illustration purposes and not intended to limit the scope of the present disclosure. For persons having ordinary skill in the art, the image processing system may be variable, changeable, or adjustable based on the spirits of the present disclosure. In some embodiments, the hepatic artery may also be post-processed after the 3D region growing. The post-processing method may be any one as described elsewhere in the present disclosure. However, those variations, changes and modifications do not depart from the scope of the present disclosure.

For better illustration purposes, FIG. 32 will be described in detail as an exemplary embodiment of a hepatic artery segmentation based on a CT image. It should be noted that the image is not limited to a CT image but may also be applicable to other medical system. The other medical system may include Digital Subtraction Angiography (DSA), Magnetic Resonance Imaging (MRI), Magnetic Resonance Angiography (MRA), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. It also should be noted that the image processing method is not limited to a hepatic artery and may also be applicable to other subjects including an organ, a texture, a region, an object, a lesion, a tumor, etc. Merely by way for example, the subject may include a head, a breast, a lung, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof.

Figure 32:
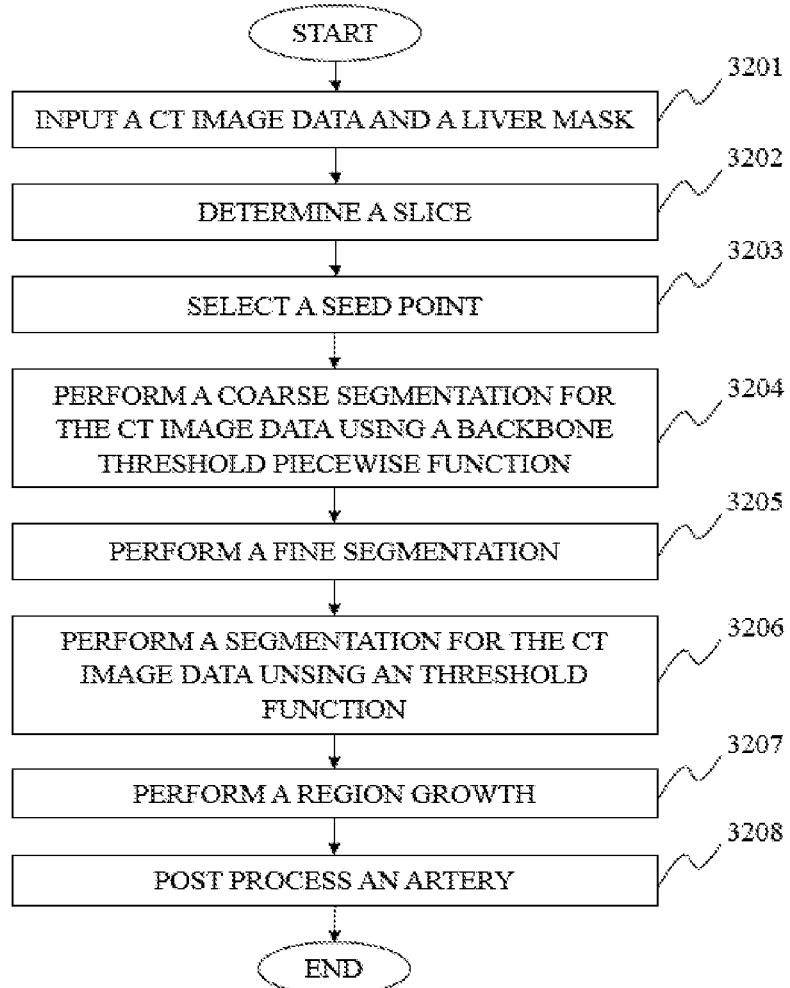
FIG. 32 is a flowchart illustrating a method for hepatic artery segmentation according to some embodiments of the present disclosure.

As described in FIG. 32, a hepatic artery CT image data and its corresponding liver mask may be acquired in step 3201. Other information may also be input in this step as described elsewhere in the present disclosure. Then a seed point of the hepatic artery may be selected. The seed point selecting process may be divided into step 3202 and step 3203. For illustration purposes, the seed point selecting process will be described in detail by an example of processing a hepatic artery CT image of N slices and its corresponding liver mask.

In step 3102, a slice for seed point selecting may be determined based on the hepatic sequence data of the image. The number of the slice may be a one or more. For illustration purposes, an example of determining a slice for selecting the seed point may be described in detail below:

a) A starting slice and an ending slice of a liver may be searched from the liver mask and written as Ls and Le, respectively. In this step, the maximum area MaxArea of a single liver slice may also be searched.

b) A starting slice and an ending slice of a seed point of the hepatic artery may be searched and written as Vs and Ve, respectively. Vs is the first slice whose liver area is no less than MaxArea/2 when comparing a liver area from Ls to Le in the liver mask slice by slice. Ve is the last slice whose liver area is no less than MaxArea/2 when comparing a liver area from Ls to Le in the liver mask slice by slice.

When Area($i$)≥MaxArea/2($i=Ls,Ls+1, \ldots ,Le$),Vs=$i$;  (Equation 27)

When Area($i$)≥MaxArea/2($i=Le,Le-1, \ldots ,Ls$),Vs=$i$.  (Equation 28)

Wherein Area(i) may be the liver area of slice i in the liver mask.

In step 3203, the hepatic artery CT data may be selected and segmented slice by slice from Vs to Ve. A connected region whose circular degree is no less than 0.7 may be searched. A connected region with the minimax area among the connected regions above may be determined as an artery, and the centroid thereof may be determined as a seed point. For illustration purposes, an example of determining a seed point may be described in detail below:

a) The CT image data of slice i (i∈[Vs, Ve]) may be selected and performed by the following process in turn till a seed point is selected and a CT value thereof is calculated.

b) A segmentation may be performed based on an empirical value Tev and a coarse binary image including the hepatic artery target may be generated. In some embodiments, the Tev is a CT value chosen from 70 to 110, i.e., 70≤Tev≤110.

c) A open computation in morphology may be performed on the result from step b) and a tiny connection in the image may be broken.

d) A connected region whose area is small than Ta or bigger than Tb may be removed from the target region. In some embodiments, Ta may be a value chosen from 200 to 300 and Tb may be a value chosen from 1000 to 1200, i.e., 200≤Ta≤300 and 1000≤Tb≤2000.

e) A target region for selecting a seed point may be determined. The starting row and the ending row of the target region may be written as Rs and Re, respectively. The starting column and the ending column of the target region may be written as Cs and Ce, respectively. The starting row and the ending row of the selecting region may be written as Rs' and Re', respectively. The starting column and the ending column of the selecting region may be written as Cs' and Ce', respectively. For illustration purposes, an exemplary embodiment of determining a seed point selecting region will be described in detail below:

e1) The starting row and the ending row of the target region may be searched perpendicularily and horizontally in the binary image.

e2) The center of the target region P (cX, cY) may be determined according to the equations below:

$$cX = \frac{Re - Rs}{2}, \qquad \text{(Equation 29)}$$

$$cY = \frac{Ce - Cs}{2}. \qquad \text{(Equation 30)}$$

e3) The starting row and the ending row of the selecting region may be determined by using a offset. The offset may be used to expand the selecting scope and it may increase along with the increasing of number of the failure selecting slices. The equations to calculate the selecting region may be below:

$$Rs' = cX - \left(\frac{Re - Rs}{4} + \frac{\text{offset}}{2}\right), \qquad \text{(Equation 31)}$$

$$Re' = cX + \left(\frac{Re - Rs}{4} + \frac{\text{offset}}{2}\right), \qquad \text{(Equation 32)}$$

$$Cs' = cY - \frac{Ce - Cs + \text{offset}}{4}, \qquad \text{(Equation 33)}$$

$$Ce' = cY + \frac{Ce - Cs + \text{offset}}{4}. \qquad \text{(Equation 34)}$$

f) A connected region whose circular degree is no less than 0.7 (i.e., Cd≥0.7) in the selecting region may be searched out. The connected region with the minimax area among the connected regions above may be determined as an artery, and the centroid thereof may be determined as a seed point. If there was no such a seed point, it may enter into a next searching.

A CT value of the seed point may be calculated after steps a) to f). The calculating method may include choosing a mean value of an n×n square whose center is the seed point. In some embodiments, n may be any natural number such as 3, 5, etc.

Step 3204 and step 3205 may be used to generate a first binary volume data. The first binary volume data may include a backbone and a rib connected therewith. The first binary volume data may be generated by a threshold segmentation based on the CT value of the seed point. The threshold segmentation may use a piecewise function below:

$$f(t) = \begin{cases} T1, & t < a \\ T2, & a \leq t < b \\ T3, & b \leq t \end{cases} \qquad \text{(Equation 35)}$$

Wherein t is the CT value of the seed point. Symbol a and b is an upper limit and a lower limit of a CT value in the segmentation, respectively. T1, T2 and T3 may be the pre-determined segmentation threshold. Note that the piecewise function type and its parameters may be variable according to specific implementation scenarios.

In step 3204, a coarse segmentation may be performed on the original CT image data. The result after step 3204 may be a bone binary volume data including a bone and other tissue. In step 3205, the bone binary volume data may be subdivided and re-segmented through a sequence slice superposition strategy. The result after step 3205 may be a first binary volume data including a backbone and a rib connected therewith. For illustration purposes, an example of generating the first binary volume data of step 3205 may be described in detail below:

a) A starting row and an ending row in perpendicular direction in the target region of each slice within the bone binary volume data may be searched.

b) The sequence slices of the bone binary volume data may be subdivided into several regions. All parts including a backbone and a rib connected therewith in each slice may be segmented by using a sequence slice superposition strategy. Merely by way for example, the sequence slices may be subdivided into four region slice, written as [1, Ls], [Ls+1, Sz], [Sz+1, Le], respectively. Wherein Ls and Le are the starting slice and the ending slice of a liver, respectively. Sz is the slice that include the seed point. N is the number of slices of the original CT image data. Each region slice may be performed by the following steps:

b1) Assume that the starting slice and the ending slice of the region slice is Lm and Ln, respectively. The superposition starting slice dL may be assigned as Lm. The initial count value may be Count=0. The region slice that already with superposition may be written as preA and its area may be preSA.

b2) Staring with Lm, the slice i may be chosen in turn to determine its selecting scope for a backbone area. The starting row and the ending row of this target region may be written as Rps and Rpe, respectively. The height and width of the binary image may be written as Height and Width, respectively. Then starting row Rps', ending row Rpe', starting column Cps', and ending column Cpe' of the backbone area may be calculated by the equations below:

$$Rps' = \frac{Rps + Rpe}{2} + 20, \qquad \text{(Equation 36)}$$

$$Rpe' = \text{Height}, \qquad \text{(Equation 37)}$$

$$Cps' = \frac{\text{Width}}{2} - 20, \qquad \text{(Equation 38)}$$

$$Cpe' = \frac{\text{Width}}{2} + 20. \qquad \text{(Equation 39)}$$

b3) A connected region in the backbone selecting scope may be searched and the area SA of the connected region may be calculated. If SA is no less than an area pre-determined value AreaSize, the count value may be added with 1 and it then enter into a next slice's searching. Otherwise it may enter into a next slice's searching directly. In some embodiments, the AreaSize may any value chosen from 300 to 600, i.e., 300≤AreaSize≤600.

b4) If the count value is no less than a pre-determined slice number SliceSize, the data from the superposition slice dL to i maybe superimposed. The mean value of the starting row and ending row in the target region of the superimposing slices may be calculated. Then the row range of the backbone in the superposition image may be calculated according to step b2).

b5) A connected region in the backbone within the superimposing image may be searched and the area SB of the connected region may be calculated. IfPreSA−SB>DifSize (500≤DifSize≤800), the PreSA may be regarded as the region of the backbone and a rib connected therewith from dL to the slice i. Otherwise the present superposition image may be regarded as the region of the backbone and a rib connected therewith from the dL to the slice i. In these embodiments, the PreSA may be updated by SB, i.e., PreSA=SB, dL=i+1, and Count=0.

b6) A sequence slice without processing may be superimposed directly then. The connected region in the superposition image may be regarded as the region of the backbone and a rib connected therewith.

c) The result from step b) may be expanded by one or more pixels or voxels in the perpendicular direction to reduce the interference in 3D region growing process. In some embodiments, the number of the pixels or voxels may be any natural number, such as 2 or 3.

In step 3206, a second binary volume data including a backbone, a rib connected therewith and a hepatic artery may be generated. The generating method may be a threshold segmentation for hepatic artery based on the CT value of the seed point. The threshold segmentation may use a piecewise function below:

$$f(t) = \begin{cases} T4, & t < c \\ T5, & c \leq t < d \\ T6, & d \leq t \end{cases} \quad \text{(Equation 40)}$$

Wherein t is the CT value of the seed point. Symbol c and d is an upper limit and a lower limit of a CT value in the segmentation, respectively. T4, T5 and T6 may be the pre-determined segmentation threshold. Note that the piecewise function type and its parameters may be variable according to specific implementation scenarios.

It should be noted that the above embodiments are for illustration purposes and not intended to limit the scope of the present disclosure. For persons having ordinary skill in the art, the image processing method may be variable, changeable, or adjustable based on the spirits of the present disclosure. In some embodiments, the order of generating the first binary volume data and the second binary volume data may be changed. For example, the second binary volume data may be generated before the first binary volume data or they may be at the same time. However, those variations, changes and modifications do not depart from the scope of the present disclosure.

Then a third binary volume data may be generated. In some embodiments, the third binary volume data may be acquired by removing a part same with the first binary volume data from the second binary volume data.

In step 3207, the hepatic artery segment result may be generated through a 3D region growing in the third binary volume data based on the seed point. The region growing may refer to any embodiments as described elsewhere in the present disclosure. Merely by way for example, some embodiments for region growing may be performed by judging whether a point (a pixel or voxel) belong to the same connected region with the seed point.

After step 3207, a hepatic artery image may be generated. The image may be output or saved according to specific implementation scenarios.

Step 3208 is a post-processing for the hepatic artery image generated from step 3201 to 3207. The post-processing method may be any one as described elsewhere in the present disclosure. For illustration purposes, an exemplary embodiment of repairing the artery may be described in detail below and not intended to limit the scope of the present disclosure.

1. According to the original CT image data, the mean value AM of CT value in the hepatic artery image may be calculated.

2. A connected region which is marked as an artery in each slice may be regarded as a seed point set. According to the property of local CT value, a 3D region growing may be performed. For illustration purposes, an example of step 2 may be described in detail below:

a) A connected region which is marked as an artery in each slice may be searched row by row and the mean value M of CT value in the connected region may be calculated.

b) Each point in the connected region may be regarded as a seed point and a region growing may be performed based on the seed point. When a point doesn't be marked as a target point and its CT value satisfy a requirement, it may be stopped to grow. In some embodiments, the requirement of a CT value may be no less than $\alpha \cdot M$ and no bigger than $\beta \cdot M$. Symbol $\alpha$ is a lower limit control coefficient whose value may satisfy a requirement, e.g., $0.9 \leq \alpha \leq 1$. Symbol $\beta$ is an upper limit control coefficient whose value may satisfy a requirement, e.g., $1 \leq \beta \leq 1.05$.

3. According to property of local and overall CT value, an edge of the connected region which is marked as an artery may be performed by a threshold segmentation to repair the artery. For illustration purposes, an example of step 3 may be described in detail below:

a) Each slice which is marked as an artery may be traversed by a unit of n×n square. Each square may include a point which is marked as an artery, or a point without the mark, or their combination. When the number of the point with mark and the point without mark in one square are both bigger than $n \cdot n/3$, a mean value T of CT value of the point with and without mark may be calculated.

b) The point without mark may be segmented by a threshold of MaxT and the point whose CT value is no less than MaxT may be marked as an artery. In some embodiments, MaxT may be the maximum of T and $\gamma \cdot AM$. Symbol $\gamma$ is an edge expanding control coefficient which is no bigger than 1.

c) The step a) and step b) may be repeated till the artery become replete. The number of repetition may be set according to specific implementation scenarios. For example, the number of repetition may be 3, 4, 5, etc.

4. The tiny breach may be connected by a closed computation in morphology.

It should be noted that the above embodiments are for illustration purposes and not intended to limit the scope of the present disclosure. For persons having ordinary skill in the art, the image processing method may be variable, changeable, or adjustable based on the spirits of the present disclosure. In some embodiments, the steps may be added, deleted, exchanged, replaced, modified, etc. For example, the sub-steps in each step may have no such specific boundaries and they may be integrated. For another example, the order of the steps in the image processing may be changed, e.g., the generation of the first and second binary volume data may be in a random order. For still another example, some steps such as the post-processing may be deleted. However, those variations, changes and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++,C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A system for segmenting a nodule region from a lung image, comprising;
  a storage device storing a set of instructions; and
  at least one processor in communication with the storage device, wherein when executing the instructions, the at least one processor is configured to cause the system to:
  obtain the lung image having one or more nodules, the lung image including a plurality of slices;
  identify a slice from the plurality of slices;
  determine a long axis on the identified slice of the lung image based on a user input, the long axis traversing an abnormal region of the slice;
  determine a region of interest (ROI) based on the long axis;
  perform a coarse segmentation in the ROI of the lung image to obtain a target region in the lung image, the target region including a central region and a boundary region;
  perform a fine segmentation on the boundary region of the lung image to obtain a parting segmentation region, the fine segmentation including classifying and labelling each voxel in the boundary region; and
  fuse the central region and the parting segmentation region to obtain the nodule region,
  wherein to perform a coarse segmentation on the ROI of the lung image to obtain a target region in the lung image, the at least one processor is configured to cause the system further to:
  perform a first filtering on the ROI to obtain a first filtered image;
  perform a first region growing on the first filtered image to obtain a dynamic segmentation region;
  determine a gray-scale histogram of the ROI to obtain a histogram vector image;
  perform a second region growing on the histogram vector image to obtain a static segmentation region; and
  fuse the dynamic segmentation region and the static segmentation region to obtain the target region.

2. The system of claim 1, wherein the at least one processor is configured to cause the system further to:
   post-process the nodule region by performing image smoothing on the nodule region.

3. The system of claim 1, wherein the boundary region surrounds the central region.

4. The system of claim 1, wherein the boundary region has a shape of an annulus.

5. The system of claim 1, wherein to identify a slice from the plurality of slices of the lung image, the at least one processor is configured to cause the system further to:
   identify, among the plurality of slices, a slice including a maximum cross-section of ground-glass nodules.

6. The system of claim 1, wherein the ROI is a cube having a diagonal of a length of the long axis.

7. The system of claim 1, wherein the first filtering includes a mean filtering, and wherein to perform a first region growing on the first filtered image to obtain a dynamic segmentation region, the at least one processor is configured to cause the system further to:
   obtain one or more first initial thresholds;
   perform one or more iterations, each of the one or more iterations including performing the first region growing on the first filtered image with one or more first thresholds based on a first seed point to obtain a first intermediate segmentation region, the first seed point including a point of the long axis, the one or more first thresholds including the first initial thresholds or first updated thresholds determined in a previous iteration;
   assessing a first ratio of a first length of the long axis covered by the first intermediate segmentation region to a length of the long axis based on a first threshold ratio; and
   easing the one or more first thresholds to obtain the first updated thresholds to be used in a next iteration if the first ratio is smaller than the first threshold ratio; and
   determine the dynamic segmentation region by performing, based on the one or more first thresholds, the first expansion operation on the first intermediate segmentation region.

8. The system of claim 1, wherein to perform a second region growing on the histogram vector image to obtain a static segmentation region, the at least one processor is configured to cause the system further to:
   obtain one or second initial thresholds;
   perform one or more iterations, each of the one or more iterations including performing the second region growing on the histogram vector image with one or more second thresholds based on a second seed point to obtain a second intermediate segmentation region, the second seed point including a point of the long axis, the one or more second thresholds including the second initial thresholds or second updated thresholds determined in a previous iteration;
   assessing a second ratio of a second length of the long axis covered by the second intermediate segmentation region to a length of the long axis based on a second threshold ratio; and
   easing the one or more second thresholds to obtain the second updated thresholds used in a next iteration if the second ratio is smaller than the second threshold ratio; and
   determine the static segmentation region by performing, based on the one or more second thresholds, the second expansion operation on the second intermediate segmentation region.

9. The system of claim 1, wherein the central region includes an overlapping region of the dynamic segmentation region with the static segmentation region, and the boundary region includes a region located inside the dynamic segmentation region but outside the static segmentation region.

10. The system of claim 1, wherein to perform a fine segmentation on the boundary region of the lung image to obtain a parting segmentation region, the at least one processor is configured to cause the system further to:
    perform a second filtering on the ROI to obtain a feature vector image including a plurality of feature vectors, a window of the second filter being proportional to the length of the long axis;
    combine the feature vector image with predetermined weights of the plurality of feature vectors to obtain a linear discriminant analysis (LDA) probability field image;
    perform a third region growing on the LDA probability field image to obtain a labeling region with labels of classifiers; and
    obtain the parting segmentation region by fusing the labeling region with the boundary region.

11. The system of claim 10, wherein to perform a second filtering on the ROI to obtain a feature vector image, the at least one processor is configured to cause the system further to:
    perform the second filtering on the ROI to obtain a plurality of second filtered images; and
    combine the plurality of second filtered images to obtain the feature vector image.

12. The system of claim 10, wherein to perform a third region growing on the LDA probability field image to obtain a labeling region with labels of classifiers, the at least one processor is configured to cause the system further to:
    obtain one or more third initial thresholds;
    perform one or more iterations, each of the one or more iterations including performing the third region growing on the LDA probability field image with one or more third thresholds based on a third seed point to obtain a third intermediate segmentation region, the third seed point including a point of the long axis, the one or more third thresholds including the third initial thresholds or third updated thresholds determined in a previous iteration;
    assessing a third ratio of a third length of the long axis covered by the third intermediate segmentation region to a length of the long axis based on a third threshold ratio;
    easing the one or more third thresholds to obtain the third updated thresholds used in a next iteration if the third ratio is smaller than the third threshold ratio; and
    determine the labeling region with labels of classifiers by performing, based on the one or more third thresholds, a third expansion operation on the third intermediate segmentation.

13. The system of claim 10, wherein the second filtering includes at least one of Butterworth filter, gradient filter, Gabor filter, Volterra filter, Hessian filter, Chebyshev filter, Bessel filter, Elliptic filter, Constant k filter, m-derived filter, or filter based on histogram.

14. A method implemented on a computing device which has at least one processor and a storage device for segmenting a nodule region from a lung image, comprising:
    obtaining, by the at least one processor, the lung image having one or more nodules, the lung image including a plurality of slices;

identifying a slice from the plurality of slices;

determining, by the at least one processor, a long axis on the identified slice of the lung image based on a user input, the long axis traversing an abnormal region of the slice;

determining, by the at least one processor, a region of interest (ROI) based on the long axis;

performing, by the at least one processor, a coarse segmentation in the ROI of the lung image to obtain a target region in the lung image, the target region including a central region and a boundary region;

performing, by the at least one processor, a fine segmentation on the boundary region of the lung image to obtain a parting segmentation region, the fine segmentation including classifying and labelling each voxel in the boundary region; and fusing, by the at least one processor, the central region and the parting segmentation region to obtain the nodule region, wherein performing, by the at least one processor, the coarse segmentation in the ROI of the lung image to obtain the target region in the lung image comprises:

performing a first filtering on the ROI to obtain a first filtered image;

performing a first region growing on the first filtered image to obtain a dynamic segmentation region:

determining a gray-scale histogram of the ROI to obtain a histogram vector image:

performing a second region growing on the histogram vector image to obtain a static segmentation region; and fusing the dynamic segmentation region and the static segmentation region to obtain the target region.

15. The method of claim 14, wherein the boundary region surrounds the central region.

16. The method of claim 14, wherein the boundary region has a shape of an annulus.

17. The method of claim 14, wherein identifying a slice from the plurality of shoes of the lung image includes:

identifying; among the plurality of slices, a slice including a maximum cross-section of around-class nodules.

18. The method of claim 14, wherein the ROI is a cube having a diagonal of a length of the long axis.

19. A non-transitory computer readable medium comprising executable instructions that, when executed by a computing device, cause the computing device to:

obtain the lung image having one or more nodules, the lung image including a plurality of slices;

identify a slice from the plurality of slices;

determine a long axis on the identified slice of the lung image based on a user input, the long axis traversing an abnormal region of the shoe;

determine a region of interest (ROI) based on the long axis;

perform a coarse segmentation in the ROI of the lung image to obtain a target region in the lung image, the target region including a central region and a boundary region;

perform a fine segmentation on the boundary region of the lung image to obtain a parting segmentation region, the fine segmentation including classifying and labelling each voxel in the boundary region; and fuse the central region and the parting segmentation region to obtain the nodule region, wherein to perform the coarse segmentation on the ROI of the lung image to obtain the target region in the lung image, the executable instructions, when executed by the computing device, cause the computing device to further to:

perform a first filtering on the ROI to obtain a first filtered image;

perform a first region growing on the first filtered image to obtain a dynamic segmentation region:

determine a gray-scale histogram of the ROI to obtain a histogram vector image;

perform a second region growing on the histogram vector image to obtain a static segmentation region; and fuse the dynamic segmentation region and the static segmentation region to obtain the target region.

* * * * *